(12) United States Patent
Ishiguro

(10) Patent No.: US 9,103,988 B2
(45) Date of Patent: Aug. 11, 2015

(54) LIQUID-CRYSTAL DISPLAY DEVICE

(75) Inventor: Makoto Ishiguro, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 530 days.

(21) Appl. No.: 13/512,563

(22) PCT Filed: Nov. 29, 2010

(86) PCT No.: PCT/JP2010/071759
§ 371 (c)(1),
(2), (4) Date: May 29, 2012

(87) PCT Pub. No.: WO2011/065586
PCT Pub. Date: Jun. 3, 2011

(65) Prior Publication Data
US 2012/0236235 A1    Sep. 20, 2012

(30) Foreign Application Priority Data

Nov. 30, 2009   (JP) .................. 2009-272819
Aug. 11, 2010   (JP) .................. 2010-180138

(51) Int. Cl.
G02F 1/1335      (2006.01)
G02B 5/30        (2006.01)
G02F 1/13363     (2006.01)

(52) U.S. Cl.
CPC ............ G02B 5/3033 (2013.01); G02B 5/3083 (2013.01); G02F 1/13363 (2013.01); G02F 2203/03 (2013.01); G02F 2413/11 (2013.01)

(58) Field of Classification Search
None
See application file for complete search history.

(56) References Cited

U.S. PATENT DOCUMENTS 6,650,390 B2   11/2003   Sakamoto et al.
7,951,430 B2    5/2011   Sugiyama et al.
(Continued)

FOREIGN PATENT DOCUMENTS

JP   2001249350 A   9/2001
JP   2003-156743 A  5/2003
(Continued)

OTHER PUBLICATIONS

International Preliminary Report on Patentability from the International Bureau issued on Jun. 14, 2012 in International Application No. PCT/JP2010/071760.
(Continued)

*Primary Examiner* — Wen-Ying P Chen
(74) *Attorney, Agent, or Firm* — Jean C. Edwards, Esq.; Edwards Neils PLLC

(57) ABSTRACT

Disclosed is a liquid-crystal display device wherein the total of $Rth_{rear}(\lambda)$ and $Rth_{front}(\lambda)$ is within a range capable of compensating $\Delta nd(\lambda)$ in the black state; and the total scattering intensity of the front-side substrate satisfies the following formula (0); and the front-member scattering intensity, and the total scattering intensity of the rear-side substrate, and $Rth_{front}(\lambda)$ and $Rth_{rear}(\lambda)$ satisfy following relationship (1) or (2): (0) The front-member scattering intensity $\leq 1/38000$, (1) The rear-member scattering intensity > The front-member scattering intensity, and $Rth_{front}(\lambda) > Rth_{rear}(\lambda)$, (2) The rear-member scattering intensity < The front-member scattering intensity, and $Rth_{front}(\lambda) < Rth_{rear}(\lambda)$.

23 Claims, 1 Drawing Sheet

(56) References Cited

U.S. PATENT DOCUMENTS

| | | |
|---|---|---|
| 8,049,850 B2 | 11/2011 | Sugiyama et al. |
| 8,184,244 B2 * | 5/2012 | Ueda et al. |
| 2001/0019392 A1 | 9/2001 | Sakamoto et al. |
| 2003/0086041 A1 | 5/2003 | Watanabe et al. |
| 2006/0164580 A1 | 7/2006 | Ueda et al. |
| 2007/0029550 A1 | 2/2007 | Yoshida et al. |
| 2008/0158488 A1 | 7/2008 | Yanai et al. |
| 2009/0051856 A1 | 2/2009 | Sugiyama et al. |
| 2009/0096966 A1 | 4/2009 | Umemoto et al. |
| 2009/0122243 A1 | 5/2009 | Sugiyama et al. |
| 2009/0128743 A1 | 5/2009 | Akao et al. |
| 2009/0153784 A1 | 6/2009 | Kiya |
| 2009/0207347 A1 | 8/2009 | Shimizu et al. |
| 2010/0053521 A1* | 3/2010 | Do et al. .................. 349/119 |
| 2010/0220272 A1 | 9/2010 | Ohashi et al. |
| 2010/0231830 A1 | 9/2010 | Hirakata et al. |
| 2011/0058131 A1 | 3/2011 | Ishiguro |
| 2011/0128473 A1 | 6/2011 | Ishiguro |

FOREIGN PATENT DOCUMENTS

| | | | |
|---|---|---|---|
| JP | 2005-003733 A | 1/2005 |
| JP | 2005-099499 A | 4/2005 |
| JP | 2005-258004 A | 9/2005 |
| JP | 2006-184640 A | 7/2006 |
| JP | 2006-241293 A | 9/2006 |
| JP | 2006234848 A | 9/2006 |
| JP | 2007-047202 A | 2/2007 |
| JP | 2007-133379 A | 5/2007 |
| JP | 2007164125 A | 6/2007 |
| JP | 2007171577 A | 7/2007 |
| JP | 2007-212603 A | 8/2007 |
| JP | 4015840 B2 | 9/2007 |
| JP | 2007279083 A | 10/2007 |
| JP | 2008-015307 A | 1/2008 |
| JP | 2009-093166 A | 4/2009 |
| JP | 2009-098667 A | 5/2009 |
| JP | 2009-139967 A | 6/2009 |
| JP | 2009-204851 A | 9/2009 |
| JP | 2008216416 A | 9/2009 |
| JP | 2009-258640 A | 11/2009 |
| WO | WO 2006/070936 A1 | 7/2006 |
| WO | WO 2006/093346 A1 | 9/2006 |

OTHER PUBLICATIONS

International Preliminary Report on Patentability from the International Bureau issued on Jun. 14, 2012 in International Application No. PCT/JP2010/071761.

Non-Final Office Action from USPTO issued on Jan. 30, 2014 in U.S. Appl. No. 13/512,562.

Official Action issued by the Japanese Patent Office on Oct. 22, 2013 in connection with Japanese Patent Application No. 2010-070128.

Office Action issued by JPO on Jul. 23, 2013 in connection with corresponding Japanese Patent Application No. 2010-070128.

* cited by examiner

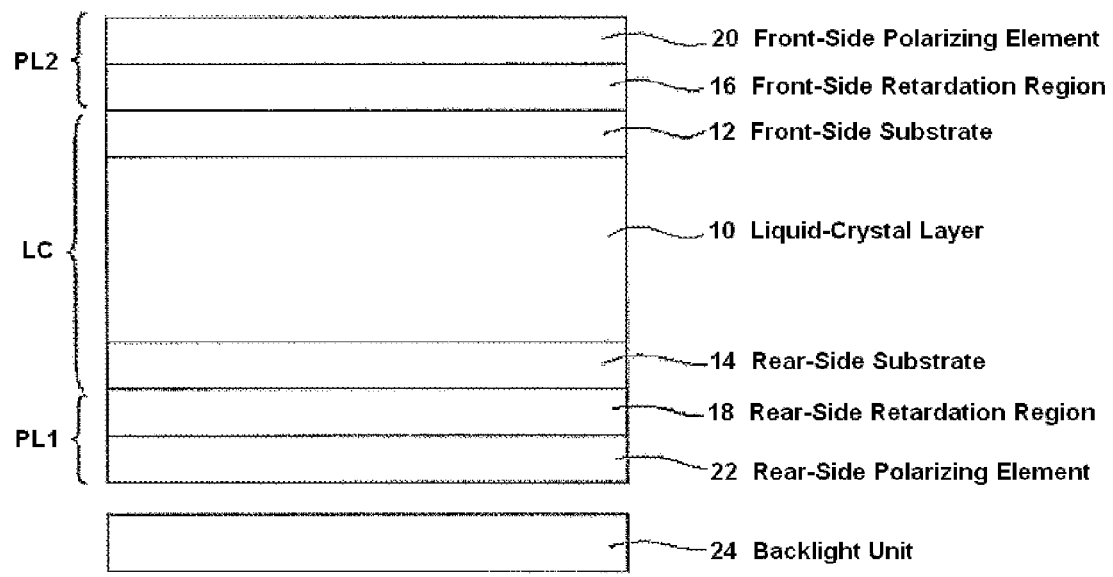

LIQUID-CRYSTAL DISPLAY DEVICE

CROSS-REFERENCE TO RELATED APPLICATIONS

The present invention is a 35 U.S.C. 371 National Stage Entry of PCT/JP2010/071759, filed Nov. 29, 2010, which claims priority from Japanese Patent Application Nos. 2009-272819, filed on Nov. 30, 2009, and 2010-180138 filed on Aug. 11, 2010, the contents of all of which are herein incorporated by reference in their entirety.

TECHNICAL FIELD

The present invention relates to a technique of improving the front contrast ratio of liquid-crystal display device.

BACKGROUND ART

These days elevation of the contrast ratio (CR) in liquid-crystal display (LCD) devices is being promoted. In particular, a VA-mode liquid-crystal display device has the advantage that CR in the normal-line direction (hereinafter referred to as "front CR", and "front CR" may be generally called also as "on-axis contrast ratio") is high as compared with that in other modes (e.g., IPS, TN and OCB modes), and various studies and developments (for example, for reduction in the line thickness of black matrix, for removal of rib to control the tilt angle of liquid crystal (ribless technology), for improvement of TFT array and electrode slit) are now made for further enhancing the advantage. As a result, in these 6 years, the front CR in VA-mode liquid-crystal display devices has increased from about 400 to about 8000, or by about 20 times. The front CR is an important property that is to be the index of image sharpness, and a VA-mode LCD is characterized by high front CR and is now the mainstream of LCD panels.

On the other hand, in liquid-crystal display devices, it is important that not only the front CR is high but also the panel secures a broad viewing angle (that is, CR in oblique directions (hereinafter this may be referred to as "viewing angle CR") is high), and that the panel is free from color shift in oblique directions. For improving the viewing angle characteristics of liquid-crystal display devices, in general, a retardation film is arranged on the front side and the backside of the liquid-crystal cell.

For example, in a VA-mode liquid-crystal display device, in general, a retardation film is disposed each one on the front side and on the rear side, thereby sharing the retardation necessary for viewing angle compensation to each one to compensate the viewing angle on the panel. There are known an embodiment where a film having the same retardation is disposed both on the front side and on the rear side (hereinafter this may be referred to as "both-sides retardation film type"); and an embodiment where an inexpensive film such as a plain TAC film or the like is disposed on any of the front side or the rear side, and a film having a large retardation is disposed on the other side (hereinafter this may be referred to as "one-sides retardation film type").

The former embodiment is advantageous in that one and the same retardation film can be used; and the latter embodiment is advantageous in that a popular film can be used on one side.

As described in the above, in general, a retardation film is used in a liquid-crystal display device for viewing angle compensation of the device; however, heretofore, it has been considered that the retardation property of the film would not contribute toward the front CR at all. It is known that the optical axis misalignment and the haze of the retardation film may lower the front CR of liquid-crystal display device; and it has been considered that, for improving the front CR of liquid-crystal display device, the optical axis misalignment of the retardation film is solved and the haze thereof is lowered (for example, JP-A 2009-139967). Heretofore, it has been found that the light diffusive film to be disposed for viewing angle enlargement is one factor of lowering the front CR; and for preventing the front CR reduction, it is proposed to control the property of the light diffusive film (for example, JP-A 2009-93166).

Japanese Patent 4015840 discloses that, when an optical compensatory film of which retardation-difference between the front direction and the oblique direction is small is disposed between the color filter substrate and the polarizing element in an OCB-mode liquid-crystal display device, then the oblique incident light may be scattered by the color filter, which can prevent the front contrast ratio from lowering. However, the effect of reducing lowering in the front contrast ratio by the use of such an optical compensatory film of which the retardation difference between the front direction and the oblique direction is small could be expected in the case where the retardation film and the polarizing element are disposed so that the slow axis of the retardation film and the transmission axis of the polarizing element are neither parallel nor orthogonal to each other (for example, they cross at 45 degrees), for example, in the case of an OCB-mode liquid-crystal display device; but the effect could not be expected in the case where the retardation film and the polarizing element are disposed so that the slow axis of the retardation film and the transmission axis of the polarizing element are parallel or orthogonal to each other, for example, in the case of a VA-mode liquid-crystal display device. Further, such an optical compensatory film of which retardation-difference between the oblique direction and the front direction is small may be not prepared easily; and the production process and the material for preparing such a film are limited. In recent liquid-crystal display devices showing high-contrast ratio, a low-scattering color filter is built in already, and therefore, the effect of further improving the front contrast ratio of the liquid-crystal display devices showing high-contrast ratio could not be expected for them.

SUMMARY OF INVENTION

The present inventor has variously investigated the front CR of liquid-crystal display devices, and has found that retardation of the retardation film for viewing angle compensation, which has heretofore been said to have no influence on the front CR, could have some influence on the front CR. The inventor has found that the influence is remarkable especially on liquid-crystal cells capable of achieving high contrast ratio (for example, at least 1500). As far as the present inventor knows, it may be said that nothing has been proposed relating to the technical idea of optimizing retardation of a retardation film, used for viewing angle compensation of a liquid-crystal display device, in relation to the front CR of the device.

Specifically, one object of the present invention is to further improve the front contrast ratio of a liquid-crystal display device having high-contrast ratio.

Accordingly, an object of the present invention is to provide a liquid-crystal display device capable of realizing suitable viewing angle compensation and capable of having a remarkably improved front contrast ratio, and to provide a process for producing the liquid-crystal display device.

The means for achieving the above object are as follows.

[1] A liquid-crystal display device comprising:
a front-side polarizing element,
a rear-side polarizing element,
a liquid-crystal cell disposed between the front-side polarizing element and the rear-side polarizing element,
a front-side retardation region composed of one or more retardation layers disposed between the liquid-crystal cell and the front-side polarizing element, and
a rear-side retardation region composed of one or more retardation layers disposed between the liquid-crystal cell and the rear-side polarizing element, wherein:
the liquid-crystal cell comprises a liquid-crystal layer, and a pair of a front-side substrate and a rear-side substrate to hold the liquid-crystal layer therebetween;
the total of retardation along the thickness-direction of the rear-side retardation region at a wavelength λ nm in a visible light region, $Rth_{rear}(\lambda)$, and retardation along the thickness-direction of the front-side retardation region at the wavelength λ, $Rth_{front}(\lambda)$ is within a range capable of compensating $\Delta nd(\lambda)$ in a black state of the liquid-crystal layer (wherein d means the thickness (nm) of the liquid-crystal layer, $\Delta n(\lambda)$ means the refractivity anisotropy at a wavelength λ nm of the liquid-crystal layer, and $\Delta nd(\lambda)$ means the product of $\Delta n(\lambda)$ and d);
the total scattering intensity of the front-side substrate and all the members formed on the front-side substrate (hereinafter this is referred to as "front-member scattering intensity") satisfies the following formula (0); and
the front-member scattering intensity, and the total scattering intensity of the rear-side substrate and all the members formed on the rear-side substrate (hereinafter this is referred to as "rear-member scattering intensity"), and $Rth_{front}(\lambda)$ and $Rth_{rear}(\lambda)$ satisfy following relationship (1) or (2):

The front-member scattering intensity≤1/38000,   (0)

The rear-member scattering intensity>The front-member scattering intensity, and $Rth_{front}(\lambda) > Rth_{rear}(\lambda)$,   (1)

The rear-member scattering intensity<The front-member scattering intensity, and $Rth_{front}(\lambda) < Rth_{rear}(\lambda)$;   (2)

in the formulae (0) to (2), the front-member scattering intensity and the rear-member scattering intensity each are the difference between the reciprocal of the contrast ratio of the substrate and all the members formed on the substrate, as measured by the use of a polarizing plate 2 of a combination of a high-retardation film and a polarizing element, "the member CR(front 2)" and "the member CR(rear 2)", and the reciprocal of the contrast ratio thereof, as measured by the use of a polarizing plate 1 of a combination of a low-retardation film and a polarizing element, "the member CR(front 1)" and "the member CR(rear 1)", respectively; and these are computed according to the following formulae, respectively:

The front-member scattering intensity={1/The member CR(front 2)}−{1/The member CR(front 1)}, The rear-member scattering intensity={1/The member CR(rear 2)}−{1/The member CR(rear 1)}.

[2] The liquid-crystal display device of [1], satisfying formula (1).

[3] The liquid-crystal display device of [2], further satisfying following relational formula (3):

{The rear-member scattering intensity}/{The front-member scattering intensity}≥1.4.   (3)

[4] The liquid-crystal display device of [2] or [3], wherein the rear-side substrate has a color filter layer thereon.

[5] The liquid-crystal display device of any one of [2]-[4], wherein the rear-side substrate is an array substrate having a black matrix to partition pixels provided with a color filter layer; and the front-side substrate is a counter substrate disposed to face the array substrate.

[6] The liquid-crystal display device of any one of [2]-[5], wherein retardation along the thickness-direction at a wavelength of 550 nm of the rear-side retardation region, Rth(550) satisfies:

0 nm≤|Rth(550)|≤300 nm.

[7] The liquid-crystal display device of any one of [2]-[6], wherein retardation in plane at a wavelength of 550 nm of the rear-side retardation region, Re(550) satisfies:

0 nm≤Re(550)≤100 nm.

[8] The liquid-crystal display device of any one of [2]-[7], wherein retardation along the thickness-direction at a wavelength of 550 nm of the front-side retardation region, Rth (550) satisfies:

0 nm≤|Rth(550)|≤300 nm.

[9] The liquid-crystal display device of any one of [2]-[8], wherein retardation in-plane at a wavelength of 550 nm of the front-side retardation region, Re(550) satisfies:

0 nm≤Re(550)≤100 nm.

[10] The liquid-crystal display device of any one of [2]-[9], wherein the front-side retardation region is composed of two films, the two films are film A and film B, the film A is disposed closer to the liquid-crystal cell than the film B, the film A satisfies following formula (4), the film B satisfies following formulae (5) and (6), and the transmission axis of the front-side polarizing element and the slow axis of the film B are orthogonal or parallel to each other:

|$Re_{film\ A}(550)$|≤100 nm,   (4)

|$Re_{film\ B}(550)$|≥50 nm,   (5)

0.05≤Nz≤3,   (6)

in formula (4), $Re_{film\ A}(550)$ means retardation in-plane of the film A at a wavelength of 550 nm; in formula (5), $Re_{film\ B}(550)$ means retardation in-plane of the film B at a wavelength of 550 nm; in formula (6), $Re_{film\ B}(550)$ means retardation in-plane of the film B at a wavelength of 550 nm, $Rth_{film\ B}(550)$ means retardation along the thickness-direction of the film B at a wavelength of 550 nm, and Nz= $Rth_{film\ B}(550)/Re_{film\ B}(550)+0.5$.

[11] The liquid-crystal display device of any one of [2]-[10], wherein Rth of the rear-side retardation region and/or the front-side retardation region has the reversed wavelength characteristics in a visible light region or is constant without any dependency on the wavelength in a visible light region.

[12] The liquid-crystal display device of any one of [2]-[11], wherein the color filter has Rth, and Rth of the color filter has the reversed wavelength characteristics in a visible light region or is constant without any dependency on the wavelength in a visible light region.

[13] The liquid-crystal display device of any one of [1]-[12], wherein the rear-side retardation region and/or the front-side retardation region is formed of a cellulose acylate film or comprises a cellulose acylate film.

[14] The liquid-crystal display device of any one of [1]-[12], wherein the rear-side retardation region and/or the front-side retardation region is formed of an acryl-base polymer film or comprises an acryl-base polymer film.

[15] The liquid-crystal display device of [13], wherein the rear-side retardation region and/or the front-side retardation region is formed of an acryl-base polymer film comprising an acryl-base polymer having at least one unit selected from lactone ring units, maleic anhydride units and glutaric anhydride units, or comprises the acryl-base polymer film.

[16] The liquid-crystal display device of any one of [1]-[15], wherein the rear-side retardation region and/or the front-side retardation region is formed of a cyclic olefin-base polymer film or comprises a cyclic olefin-base polymer film.

[17] The liquid-crystal display device of any one of [1]-[16], wherein the rear-side retardation region and/or the front-side retardation region is formed of one biaxial polymer film or comprises one biaxial polymer film.

[18] The liquid-crystal display device of any one of [1]-[17], wherein the rear-side retardation region and/or the front-side retardation region comprises one uniaxial polymer film.

[19] The liquid-crystal display device of [4] or [5], wherein retardation along the thickness-direction of the color filter, $Rth_{CF}(550)$, and retardation along the thickness-direction of the rear-side retardation region, $Rth_{rear}(550)$ satisfy the following formula:

$$|Rth_{CF}(550)+Rth_{rear}(550)| \leq 90 \text{ nm}.$$

[20] The liquid-crystal display device of any one of [1]-[19], which is a VA-mode liquid-crystal display device.

[21] The liquid-crystal display device of any one of [1]-[20], which comprises a backlight unit sequentially emitting independent three primary colors and which is driven according to a field sequential driving system.

[22] A process for producing a liquid-crystal display device comprising a front-side polarizing element, a rear-side polarizing element, a liquid-crystal cell disposed between the front-side polarizing element and the rear-side polarizing element, a front-side retardation region composed of one or more retardation layers disposed between the liquid-crystal cell and the front-side polarizing element, and a rear-side retardation region composed of one or more retardation layers disposed between the liquid-crystal cell and the rear-side polarizing element; the process comprising:

a first step of preparing a liquid-crystal cell which comprises a liquid-crystal layer and a pair of a front-side substrate and a rear-side substrate to hold the liquid-crystal layer therebetween, and in which the scattering intensity of the front-side substrate and all the members formed on the substrate (hereinafter this is referred to as "the front-member scattering intensity") satisfies the following formula (0):

$$\text{The front-member scattering intensity} \leq 1/38000; \quad (0)$$

a second step of comparing the front-member scattering intensity of the liquid-crystal cell prepared in the first step with the scattering intensity of the rear-side substrate and all the parts formed on the rear-side substrate (hereinafter this is referred to as "the rear-member scattering intensity");

a third step of determining retardation $Rth_0(\lambda)$ along the thickness-direction at a wavelength $\lambda$, necessary for compensation of $\Delta nd(\lambda)$ in the black state of the liquid-crystal cell prepared in the first step (wherein d means the thickness of the liquid-crystal layer (nm), $\Delta n(\lambda)$ means the refractivity anisotropy at a visible light wavelength $\lambda$ nm of the liquid-crystal layer, and $\Delta nd(\lambda)$ means the product of $\Delta n(\lambda)$ and d); and a forth step of, on the basis of the magnitude relation between the rear-member scattering intensity and the front-member scattering intensity obtained in the second step, distributing the value of $Rth_0(\lambda)$, necessary for viewing angle compensation in the black state of the liquid-crystal cell, into retardation along the thickness-direction at a wavelength $\lambda$ of the front-side retardation region and into the rear-side retardation region, $Rth_{front}(\lambda)$ and $Rth_{rear}(\lambda)$, respectively;

wherein the front-member scattering intensity and the rear-member scattering intensity each are the difference between the reciprocal of the contrast ratio of the substrate and all the members formed on the substrate, as measured by the use of a polarizing plate 2 of a combination of a high-retardation film and a polarizing element, "the member CR(front 2)" and "the member CR(rear 2)", and the reciprocal of the contrast ratio thereof, as measured by the use of a polarizing plate 1 of a combination of a low-retardation film and a polarizing element, "the member CR(front 1)" and "the member CR(rear 1)", respectively; and these are computed according to the following formulae, respectively:

The front-member scattering intensity={1/The member CR(front 2)}−{1/The member CR(front 1)}, The rear-member scattering intensity={1/The member CR(rear 2)}−{1/The member CR(rear 1)}.

[23] The process of [22], wherein, the second step is carried out for determining as to which of following relational formulae (1) and (2) is satisfied:

the rear-member scattering intensity>the front-member scattering intensity,     (1)

the rear-member scattering intensity<the front-member scattering intensity,     (2)

and in accordance with the result, in the fourth step, if relational formula (1) is satisfied, $Rth_0(\lambda)$ is distributed into $Rth_{front}(\lambda)$ and $Rth_{rear}(\lambda)$ respectively so that the relation of $Rth_{front}(\lambda) > Rth_{rear}(\lambda)$ is satisfied, and if relation formula (2) is satisfied, $Rth_0(\lambda)$ is distributed into $Rth_{front}(\lambda)$ and $Rth_{rear}(\lambda)$ respectively so that the relation of $Rth_{front}(\lambda) < Rth_{rear}(\lambda)$ is satisfied.

According to the invention, it is possible to further improve the front contrast ratio of a liquid-crystal display device having high-contrast ratio.

And according to the invention, it is possible to provide a liquid-crystal display device capable of realizing suitable viewing angle compensation and capable of having a remarkably improved front contrast ratio, and to provide a process for producing the liquid-crystal display device.

BRIEF DESCRIPTION OF THE DRAWINGS

FIG. 1 is a schematic cross-sectional view of one example of the liquid-crystal display device of the invention.

The meanings of the reference numerals in the drawing are as follows:
10 Liquid-Crystal Layer
12 Front-Side Substrate
14 Rear-Side Substrate
16 Front-Side Retardation Region
18 Rear-Side Retardation Region
20 Front-Side Polarizing Element
22 Rear-Side Polarizing Element
24 Backlight Unit
LC Liquid-Crystal Cell
PL1 Rear-Side Polarizer
PL2 Front-Side Polarizer

MODE FOR CARRYING OUT THE INVENTION

The invention is described in detail hereinunder. Note that, in this patent specification, any numerical expressions in a style of "... to ..." will be used to indicate a range including the lower and upper limits represented by the numerals given before and after "to", respectively.

At first, the terms used in the description will be explained.
(Retardation, Re and Rth)

In this description, Re(λ) and Rth(λ) are retardation in plane (nm) and retardation along the thickness direction (nm), respectively, at a wavelength of λ. Re(λ) is measured by applying light having a wavelength of λ nm to a sample such as a film in the normal direction thereof, using KOBRA 21ADH or WR (by Oji Scientific Instruments). The standard wavelength of KOBRA is 590 nm.

When a sample to be analyze by a monoaxial or biaxial index ellipsoid, Rth(λ) of the film is calculated as follows.

Rth(λ) is calculated by KOBRA 21ADH or WR based on six Re(λ) values which are measured for incoming light of a wavelength λ nm in six directions which are decided by a 10° step rotation from 0° to 50° with respect to the normal direction of a sample film using an in-plane slow axis, which is decided by KOBRA 21ADH, as an tilt axis (a rotation axis; defined in an arbitrary in-plane direction if the film has no slow axis in plane); a value of hypothetical mean refractive index; and a value entered as a thickness value of the film.

In the above, when the film to be analyzed has a direction in which the retardation value is zero at a certain tilt angle, around the in-plane slow axis from the normal direction as the rotation axis, then the retardation value at the tilt angle larger than the tilt angle to give a zero retardation is changed to negative data, and then the Rth(λ) of the film is calculated by KOBRA 21ADH or WR.

Around the slow axis as the tilt angle (rotation angle) of the film (when the film does not have a slow axis, then its rotation axis may be in any in-plane direction of the film), the retardation values are measured in any desired tilted two directions, and based on the data, and the estimated value of the mean refractive index and the inputted film thickness value, Rth may be calculated according to the following formulae (X) and (XI):

$$Re(\theta) = \left[nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}}\right] \times \frac{d}{\cos\left(\sin^{-1}\left(\frac{\sin(-\theta)}{nx}\right)\right)} \quad (X)$$

$$Rth = \left(\frac{nx + ny}{2} - nz\right) \times d \quad (XI)$$

wherein Re(θ) represents a retardation value in the direction tilted by an angle θ from the normal direction; nx represents a refractive index in the in-plane slow axis direction; ny represents a refractive index in the in-plane direction perpendicular to nx; and nz represents a refractive index in the direction perpendicular to nx and ny. And "d" is a thickness of the sample.

When the sample such as a film to be analyzed is not expressed by a monoaxial or biaxial index ellipsoid, or that is, when the film does not have an optical axis, then Rth(λ) of the film may be calculated as follows:

Re(λ) of the film is measured around the slow axis (judged by KOBRA 21ADH or WR) as the in-plane tilt axis (rotation axis), relative to the normal direction of the film from −50 degrees up to +50 degrees at intervals of 10 degrees, in 11 points in all with a light having a wavelength of λ nm applied in the tilted direction; and based on the thus-measured retardation values, the estimated value of the mean refractive index and the inputted film thickness value, Rth(λ) of the film may be calculated by KOBRA 21ADH or WR.

In the above-described measurement, the hypothetical value of mean refractive index is available from values listed in catalogues of various optical films in Polymer Handbook (John Wiley & Sons, Inc.). Those having the mean refractive indices unknown can be measured using an Abbe refract meter. Mean refractive indices of some major optical films are listed below:

cellulose acylate (1.48), cycloolefin polymer (1.52), polycarbonate (1.59), polymethylmethacrylate (1.49) and polystyrene (1.59).

KOBRA 21ADH or WR calculates nx, ny and nz, upon enter of the hypothetical values of these mean refractive indices and the film thickness. Base on thus-calculated nx, ny and nz, Nz=(nx−nz)/(nx−ny) is further calculated.

In this description, the values of Re(λ) and Rth(λ) such as Re(450), Re(550), Re(630), Rth(450), Rth(550) and Rth(630) are computed from the data of Re and Rth measured with a measuring device at three or more different wavelengths (e.g., λ=479.2, 546.3, 632.8 or 745.3 nm). Concretely, the measured values are approximated by the Cauchy's formula (up to the 3rd term, Re=A+Ba/λ²+C/λ⁴) to determine the values A, B and C. In that manner, the data of Re and Rth at a wavelength of λ are replotted, from which Re(λ) and Rth(λ) at the wavelength λ may be thereby determined.

In this description, the "slow axis" of the retardation film and others means the direction in which the refractive index is the largest. The "visible light region" is from 380 nm to 780 nm. Unless otherwise specifically indicated in this description, the measurement wavelength is 550 nm.

In this description, it should be so interpreted that the numerical data, the numerical range and the qualitative expression (for example, expression of "equivalent", "equal" or the like) indicating the optical properties of the constitutive members such as the retardation region, the retardation film, the liquid-crystal layer and others shall be the numerical data, the numerical range and the qualitative properties including generally acceptable errors regarding the liquid-crystal display device and the constitutive members thereof.

In this description, a retardation film means a self-supporting film disposed between a liquid-crystal cell and a polarizing element (irrespective of the level of retardation). The retardation film is synonymous with a retardation layer. The retardation region is a generic term for one or more layers of a retardation film disposed between a liquid-crystal cell and a polarizing element.

In this description, "front side" means the display panel side; and "rear side" means the backlight side. The subscripts "front" and "rear" added to "Re(λ)" or "Rth(λ)" indicate Re or Rth of a front-side retardation region and a rear-side retardation region respectively. Δnd(λ) means the product of Δn(λ) and d wherein d means the thickness (nm) of the liquid-crystal layer, and Δn(λ) means the refractivity anisotropy at a wavelength λ nm of the liquid-crystal layer.

In this description, the "front side" means the panel side; and the "rear side" means the backlight side. In this description, the "front" means the normal direction to the panel face; and the "front contrast ratio (CR)" means the contrast ratio computed from the white brightness and the black brightness measured in the normal direction to the panel face; and the "viewing angle contrast ratio (CR)" means the contrast ratio computed from the white brightness and the black brightness measured in the oblique directions inclined from the normal direction relative the panel face (for example, in the direction defined at an azimuth direction of 45 degrees and a polar angle direction of 60 degrees relative to the panel face).

The liquid-crystal display device of the invention is described hereinunder with reference to the drawing.

FIG. 1 is a schematic cross-sectional view of one example of the liquid-crystal display device of the invention. The liquid-crystal display device of FIG. 1 comprises a front-side polarizing element 20, a rear-side polarizing element 22, a liquid-crystal cell LC disposed between the front-side polarizing element 20 and the rear-side polarizing element 22, a front-side retardation region 16 composed of one or more retardation layers as disposed between the liquid-crystal cell LC and the front-side polarizing element 20, and a rear-side retardation region 18 composed of one or more retardation layers as disposed between the liquid-crystal cell LC and the rear-side polarizing element 22.

The liquid-crystal cell LC comprises a liquid-crystal layer 10 and a pair of a front-side substrate 12 and a rear-side substrate 16 between which the liquid-crystal layer is sandwiched. The front-side retardation region 16 and the rear-side retardation region 18 have retardation that contributes toward viewing angle compensation, or that is, the total of retardation along the thickness-direction of the front-side retardation region 16, $Rth_{front}(\lambda)$ and retardation along the thickness-direction of the rear-side retardation region 18, $Rth_{rear}(\lambda)$ is within a range capable of compensating $\Delta nd(\lambda)$ in a black state of the liquid-crystal layer 10.

One feature of the liquid-crystal display device of the invention resides in that the magnitude relation in retardation along the thickness-direction between the front-side retardation region 18 and the rear-side retardation region 16 disposed on and below the liquid-crystal cell LC, $Rth_{front}(\lambda)$ and $Rth_{rear}(\lambda)$ is determined depending on the magnitude relation in the scattering intensity between the front-side substrate 12 and the rear-side substrate 14 of the liquid-crystal cell LC.

In existing liquid-crystal display devices, on the assumption that the total of $Rth_{front}(\lambda)$ and $Rth_{rear}(\lambda)$ is within a range capable of compensating retardation $\Delta nd(\lambda)$ in the black state of retardation of the liquid-crystal cell, usually, the value of $\Delta nd(\lambda)$ is distributed equally into $Rth_{front}(\lambda)$ and $Rth_{rear}(\lambda)$ or, in terms of productivity or the like, the value of $\Delta nd(2)$ is distributed unequally into $Rth_{front}(\lambda)$ and $Rth_{rear}(\lambda)$ so that $Rth_{rear}(\lambda)$ is higher than $Rth_{front}(\lambda)$. Recently, however, regarding the liquid-crystal cell, only when the color filter layer is taken as one example, the particle size of the pigment to be used in forming the RGB color layer has become much reduced and the multiple light scattering to occur inside the liquid-crystal cell is thereby remarkably reduced, which results in further improving the contrast ratio. The present inventor's investigations have found that, in such a high-contrast ratio liquid-crystal cell, the polarization state of the light having come into the liquid-crystal cell would not be lost by scattering therein and may have some influence on the front contrast ratio. It is to be noted that the front contrast ratio greatly depends on the light leakage in the black state. When the brightness in the black state is lower, then the front contrast ratio is higher. Regarding the influence of retardation of the retardation film disposed outside the liquid-crystal cell on the front CR, heretofore, nothing has been investigated in the art, so far as the present inventor knows.

On the other hand, regarding the front-side substrate and the rear-side substrate constituting a liquid-crystal cell, the members disposed on the surface thereof (on the liquid-crystal layer-side surface) are not the same between the two; and an array member and a color filter member that are strong scattering factors are separately disposed on the surface of any one substrate. There is known a color filter-on-array structure (COA) in which the two are disposed on one substrate, and in the liquid-crystal cell of the type, the scattering intensity significantly differs between the rear-side substrate and the front-side substrate. For example, when a polarized light comes in a liquid-crystal cell, the polarized light may scatter in different directions owing to different scattering factors in the liquid-crystal cell; however, as described in the above, it is considered that, in the liquid-crystal cell to achieve a high front CR, the scattered light, caused by the above-mentioned member formed on the substrate surface (liquid-crystal layer-side surface), would still maintain the same polarization state same as that before the scattering. When a polarized light that is in a polarization state greatly differing from the extinction point to be absorbed by the absorption axis of the front-side polarizing element could be scattered more largely, then the front CR would be reduced more; while on the other hand, even though the polarized light of which the polarization state is near the extinction point is scattered, its influence on the front CR reduction is small. Accordingly, of the front-side substrate and the rear-side substrate, the degree of scattering at the substrate on which a larger number of members to be scattering factors are disposed would be greater, and therefore, when the polarization state of the light reaching the substrate is near the extinction point, then the front CR reduction by the scattered light could be reduced. The polarization state of the polarized light to reach the rear-side substrate is determined by $Rth_{rear}(\lambda)$ of the rear-side retardation region through which the light have passed previously, and the polarization state of the polarized light to reach the front-side substrate is determined by $Rth_{front}(\lambda)$ of the rear-side retardation region and $\Delta nd(\lambda)$ of the liquid-crystal layer in the black state; and in consideration of the fact that the total value of $Rth_{front}(\lambda)$ and $Rth_{rear}(\lambda)$ is within in a range capable of compensating retardation, $\Delta nd(\lambda)$, in the black state of the liquid-crystal cell, it may be said that the polarization state of the polarized light to reach the front-side substrate could be determined by $Rth_{front}(\lambda)$ of the front-side retardation region. In the present invention, the magnitude relation in retardation along the thickness-direction between the front-side retardation region 16 and the rear-side retardation region 18 disposed on and below the liquid-crystal cell LC respectively, $Rth_{front}(\lambda)$ and $Rth_{rear}(\lambda)$, and the magnitude relation in the scattering intensity between the front-side substrate 12 and the rear-side substrate 14 of the liquid-crystal cell LC satisfy following formula (1) or (2), and therefore, the scattering of the light in the polarization state greatly differing from the extinction point is reduced, and as a result, the front CR is thereby improved. The effect is remarkable in a liquid-crystal cell which satisfies following formula (0) or in which the scattering intensity of the front-side substrate is low, or that is, in the liquid-crystal cell in which the front-side substrate has a high contrast ratio.

Concretely, in the liquid-crystal display device of the invention, the total scattering intensity of the front-side substrate and all the members formed on the front-side substrate (hereinafter this may be referred to as "the front-member scattering intensity") satisfies following formula (0), and the front-member scattering intensity, and the total scattering intensity of the rear-side substrate and all the members formed on the rear-side substrate (hereinafter this may be referred to as "the rear-member scattering intensity"), and $Rth_{front}(\lambda)$ and $Rth_{rear}(\lambda)$ satisfy following relationship (1) or (2):

The front-member scattering intensity $\frac{1}{38000}$, (0)

The rear-member scattering intensity>The front-member scattering intensity, and $Rth_{front}(\lambda)>Rth_{rear}(\lambda)$ (1)

The rear-member scattering intensity<The front-member scattering intensity, and $Rth_{front}(\lambda)>Rth_{rear}(\lambda)$, (2)

In the above formulae (0) to (2), the front-member scattering intensity and the rear-member scattering intensity each are the difference between the reciprocal of the contrast ratio of the substrate and all the members formed on the substrate, as measured by the use of a polarizing plate 2 of a combination of a high-retardation film and a polarizing element, "the member CR(front 2)" and "the member CR(rear 2)", and the reciprocal of the contrast ratio thereof, as measured by the use of a polarizing plate 1 of a combination of a low-retardation film and a polarizing element, "the member CR(front 1)" and "the member CR(rear 1)", respectively; and these are computed according to the following formulae, respectively:

The front-member scattering intensity={1/The member CR(front 2)}−{1/The member CR(front 1)}, The rear-member scattering intensity={1/The member CR(rear 2)}−{1/The member CR(rear 1)}.

The wavelength λ at which $\Delta nd(\lambda)$, $Rth_{front}(\lambda)$ and $Rth_{rear}(\lambda)$ satisfy the above-mentioned relations may be good to fall within a visible light region of from 380 nm to 780 nm. In general, it is desirable that these factors satisfy the above relations at around 550 nm or so that is the center wavelength in the range.

Regarding the high-retardation film and the low-retardation film for use in the above measurement, in the relative relationship between the two films, the former is one having higher Rth, and the latter is one having lower Rth. The same shall apply to Re, and preferably, the former has a higher Re and the latter has a lower Re. In the invention, use of a film having same retardation as that of retardation films practically used in liquid-crystal display devices could reflect the significant difference in practical use, and from this viewpoint, it is desirable that a film having Rth(550) of 210 nm and Re(550) of 60 nm is used as the high-retardation film and a film having Rth(550) of 0 nm and Re(550) of 0 nm is as the low-retardation film in the above measurement. However, use of films that differ from each other in Re and Rth by ±10 nm or so in the measurement could produce the same results.

The light source for use in the measurement is not specifically defined, and any one not having high directionality may be used. For example, a light source having a brightness in oblique directions (for example, in three direction at polar angle of 45 degrees and at an azimuth angle of 0 degree, 45 degree or 90 degrees) of 0.6 or so (for example, from 0.55 to 0.65), relative to the front brightness thereof of 1, may be used here. Ordinary light sources generally used as backlight in liquid-crystal display devices could satisfy the characteristics.

The member CR(front 2) and the member CR(front 1) are the member contrast ratio of the front-side substrate each measured by the use of the above-mentioned high-retardation film and low-retardation film; and the member CR(rear 2) and the member CR(rear 1) are the member contrast ratio of the rear-side substrate each measured by the use of the above-mentioned high-retardation film and low-retardation film. The "member contrast ratio" is meant to indicate the total contrast ratio of the substrate and any members formed on the substrate. Examples of the members include all members of color filter, black matrix, array member (TFT array, etc.), projection on substrate, common electrode, slit, etc.

The concrete measurement method is as follows:

First, two substrates, or that is the front-side substrate and the rear-side substrate to form each liquid-crystal cell are separated from each other to the individual front-side substrate and rear-side substrate; and if desired, each substrate is washed with water or ethanol.

A polarizing plate 2 is prepared by sticking a high-retardation film to both surfaces of a polarizing film; and a polarizing plate 1 is prepared by sticking a low-retardation film to both surfaces of a polarizing film; and two such polarizing plates 2 and two such polarizing plates 1 are prepared.

On a light source generally used in a liquid-crystal display device, the polarizing plate 2 or the polarizing plate 1 is disposed; the front-side substrate or the rear-side substrate prepared by disassembling the liquid-crystal cell is, as fitted to a rotary stage (for example, SGSP-120YAW, by Sigma Koki) or the like, disposed on it, in parallel thereto with a predetermined distance (for example, 2 mm) as spaced from the polarizing plate 2 or the polarizing plate 1 on the light source. In this, the TFT array wiring and the black matrix lattice pattern on the substrate are made to correspond to the polarization axis of the polarizing plate 2 or 1. Further on it, the same polarizing plate 2 or 1 as the above, as fitted to the rotary stage in such a manner that the distance between the polarizing plates could be a predetermined distance (for example, 52 mm). Using an indicator (for example, TOPCON's BM5A) in a dark room, the brightness in the black and white states of display in the normal line direction is measured. From the data thus measured by the use of the polarizing plates 2 and 1, the front contrast ratio A (white brightness/black brightness) is computed. The polarizing plate is rotated, and the lowest brightness is the brightness in the black state; and the polarizing plate is further rotated by 90 degrees, and the brightness in that direction is the brightness in the white state.

Next, in the above-mentioned embodiments, the front-side substrate or the rear-side substrate is removed, and in this condition, the brightness in the black and white states of display of the polarizing plate 2 or 1 alone is measured. From the data measured in use of the polarizing plate 2 or 1, the front contract B is computed.

To remove the influence of the front contrast ratio B of the polarizing plate on the front contrast ratio A, the part contrast ratio (CR) is computed according to the following formula:

The member CR=1/(1/the front contrast ratio A−1/the front contrast ratio B).

According to the above-mentioned method, the member CR(front 2), the member CR(front 1), the member CR(rear 2) and the member CR(rear 1) are determined. Based on the data, the corresponding values are assigned to the following formulae, and the front-member scattering intensity and the rear-member scattering intensity are computed.

The front-member scattering intensity={1/the member CR(front 2)}−{1/the member CR(front 1)}.

The rear-member scattering intensity={1/the member CR(rear 2)}−{1/the member CR(rear 1)}.

The front member scattering intensity and the rear member scattering intensity each indicate the degree of polarized light scattering at the front substrate and at the rear substrate, respectively; and the larger value means a larger scattering degree.

In the embodiment that satisfies the above (1), the rear-member scattering intensity is larger than the front-member scattering intensity, and $Rth_{front}(\lambda)$ is larger than $Rth_{rear}(\lambda)$. In this embodiment, an array substrate and/or a color filter that are large scattering factors are disposed on the rear-side substrate. For example, in a COA-structured liquid-crystal cell, the rear-member scattering intensity may be larger than the front-member scattering intensity. In this embodiment, the scattering caused by the rear-side substrate members is large; however, $Rth_{rear}(\lambda)$ of the rear-side retardation region that governs the polarization state of the incident light to reach the rear-side substrate is small, and the value of $Rth(\lambda)$ for compensating Δnd(λ) of the liquid-crystal layer in the black state is greatly distributed into $Rth_{front}(\lambda)$ of the front-side retardation region. As a result, the polarized light is greatly scattered by the rear-side substrate members, and even though the polarization state could be kept as such, it is near to the polarization state at the extinction point and the lowering in the front CR owing to scattering could be thereby reduced.

In the embodiment that satisfies the above (2), the rear-member scattering intensity is smaller than the front-member scattering intensity, and $Rth_{front}(\lambda)$ is smaller than $Rth_{rear}(\lambda)$. In this embodiment, a color filter and the like that are large scattering factors may be disposed on the front-side substrate. In an ordinary liquid-crystal cell, a color filter layer is on the front-side substrate, and this increases the scattering intensity, and further, in case where the array of the array substrate disposed on the rear-side substrate is micropatterned, the rear-member scattering intensity may be smaller than the front-member scattering intensity. In this embodiment, the scattering caused by the front-side substrate members is large; however, $Rth_{front}(\lambda)$ of the front-side retardation region that governs the polarization state of the incident light to reach the front-side substrate is small, and the value of Rth(λ) for compensating Δnd(λ) of the liquid-crystal layer in the black state is greatly distributed into $Rth_{rear}(\lambda)$ of the rear-side retardation region. As a result, the polarized light is greatly scattered by the front-side substrate members, and even though the polarization state could be kept as such, it is near to the polarization state at the extinction point and the lowering in the front CR owing to scattering could be thereby reduced.

The present inventor's investigations have found that the above effect could be remarkable only when the formula (0), the front-member scattering intensity ⅟38000 is satisfied. This is verified by Examples given hereunder. Mainstream liquid crystal cells have a color filter on the front-side substrate thereof, and none of liquid-crystal cell products having such a structure now available on the market satisfies the above formula (0).

For satisfying the formula (0), the members of the front-side substrate may be subjected to a high-contrast treatment; and for example, when a color filter layer is disposed on the front-side substrate, for example, treatment for micropatterning of the black matrix, that for particle refining of pigment for use in color filter and others may be necessary.

Satisfying the formula (0) means that the contrast ratio of the front substrate is high; and using the front substrate having the high contrast ratio may improve the contrast ratio of the entire liquid crystal cell.

On the assumption that the polarized light running into a liquid-crystal cell could maintain its polarization state even after scattered by the inner members, the effect of the invention may be explained with the trajectory of the polarized light on a Poincare sphere. On the other hand, heretofore, it is not considered that, when a polarized light is scattered, the light could not keep the polarization state; and therefore, the fact that the effect of the invention that has solved the problem of front CR reduction owing to light scattering inside a liquid-crystal cell could be explained with the trajectory of a polarized light on a Poincare sphere may be unpredictable.

The effect of the invention may be obtained without any dependency on the mode of the liquid-crystal display device. The appropriate value of Δnd(λ) of liquid-crystal layer in the black state varies depending on the mode of display devices. Therefore, in accordance with the mode, the total of $Rth_{rear}(\lambda)$ and $Rth_{front}(\lambda)$ is determined, and the value of $Rth_0(\lambda)$ is distributed into $Rth_{rear}(\lambda)$ and $Rth_{front}(\lambda)$, depending on the scattering intensity of the rear-side substrate members and the front-side substrate members. In this way, the effect of the invention can be attained.

For example, the range of Δnd(λ) in the black state of a VA-mode or TN-mode liquid-crystal layer, and the range of $Rth_0(\lambda)$ that is necessary for the optical compensation are shown in the following Table. However, the data in the following Table are for exemplification, and the exemplified data are not limitative. In the following Table, the wavelength λ is 550 nm.

|  | Δnd(550) of liquid crystal layer in black state | Range of $Rth_0(550)$ necessary for optical compensation |
| --- | --- | --- |
| VA-mode | 250 nm-370 nm | 150 nm-500 nm |
| TN-mode | 300 nm-500 nm | 200 nm-600 nm |

The effect of increasing the front contrast ratio of the invention may be further improved by controlling the angle profile of the outgoing light from backlight. Concretely, use of a backlight having a higher light-collecting ability increases the absolute value of the front contrast ratio, whereby the increase in the front CR absolute value indicating the effect of the invention is also increased. The light-collection index is represented by, for example, the ratio of the outgoing light intensity at the front, I(0°) to the outgoing light intensity at a polar angle of 45 degrees, I(45°), I(0°)/I(45°); and the larger value indicates a backlight having a higher light-collecting ability. As the backlight having a high light-collecting ability, preferred is arrangement of a prism film having a light-collecting function (prism layer) between a diffusive film and a liquid-crystal panel. The prism film acts to collect the light that has been emitted through the light-emitting face of a light guide plate and has been diffused by a diffusive film, in the effective display area of a liquid-crystal panel with high efficiency. A liquid-crystal display device with an ordinary direct-lighting backlight built therein comprises, for example, a liquid-crystal panel comprising a transparent substrate, a color filter sandwiched between polarizing plates, and a liquid-crystal layer on the upper part thereof, and comprises a backlight disposed on the lower side. US 3M's trade name, Brightness Enhancement Film (BEF) is a typical example. BEF is a film comprising unit prisms each having a triangular cross section, as periodically disposed in one direction, in which the prism has a larger size (pitch) than the wavelength of light. BEF collects the "off-axis" light and redirects or recycles it "on-axis" toward viewers. There are known many patent publications such as JP-B 1-37801, JP-A 6-102506 and JP-T 10-506500 that disclose employment of such a brightness controlling part having a recurring array structure of prisms, such as typically BEF, in displays.

For enhancing the light-collecting ability, also preferred is use of a lens array sheet. The lens array sheet has a lens surface that comprises plural unit lenses formed to have a convex profile and disposed two-dimensionally at a predetermined pitch. A preferred embodiment of the lens array sheet is so designed that the side thereof opposite to the lens surface is a flat surface and a light-reflective layer to reflect light in the non-light-collecting region of the lens is formed on the flat surface. Also preferred is a lens array sheet that has a lenticular lens surface with plural convex-shaped cylindrical lenses disposed in parallel to each other at a predetermined pitch, wherein the side opposite to the lens surface is a flat surface and the flat surface has, as formed thereon, a light-reflective layer to reflect lengthwise-direction stripe light in the non-light-collection region of the convex-shaped cylindrical lenses. In addition, also usable are, for example, a lenticular lens array sheet where unit lenses each composed of a cylindrical curved surface are disposed in one direction in the surface thereof, and a lens array sheet where unit lenses each having a circular, rectangular, hexagonal or the like bottom shape and composed of a dome-like curved surface are two-dimensionally disposed in the surface thereof. These lens array sheets are described in JP-A 10-241434, 2001-201611, 2007-256575, 2006-106197, 2006-208930, 2007-213035, 2007-41172, etc., and these are incorporated herein by reference.

The invention is also effective in an embodiment of a display where the color reproduction region is enlarged by controlling the going-out light spectrum from the backlight and the transmission spectrum through the color filter. Concretely, as the backlight, preferably employed is a white backlight for which a red LED, a green LED and a blue LED are combined for color mixing. Also preferably, the half-value width of the peak of the light emitted by the red LED, the green LED and the blue LED is small. Of LED, the half-value wavelength width is 20 nm or so and is small as compared with that of CCFL; and when the peak wavelength of R (red) is 610 nm or more, that of G (green) is 530 nm and that of B (blue) is 480 nm or less, then the color purity of the light source itself can be increased.

It is reported that, except the peak wavelength of LED, when the spectral transmittance of a color filter is minimized as much as possible, then the color reproducibility can be further improved and the NTSC ratio can have a characteristic of 100%. For example, this is described in JP-A 2004-78102. In a red color filter, the transmittance at the peak position of green LED and blue LED is preferably small; in a green color filter, the transmittance at the peak position of blue LED and red LED is preferably small; and in a blue color filter, the transmittance at the peak position of red LED and green LED is preferably small. Concretely, the data of the transmittance are all at most 0.1, more preferably at most 0.03, even more preferably at most 0.01. Regarding the relationship between backlight and color filter, for example, a description is given in JP-A 2009-192661, which may be incorporated herein by reference.

Also preferred is use of a laser light source as the backlight for enlarging the color reproduction region. Preferably, the peak wavelength of the red, green and blue laser light sources is from 430 to 480 nm, from 520 to 550 nm, and from 620 to 660 nm, respectively. Regarding the laser light source serving as a backlight, a description is given in JP-A 2009-14892, which may be incorporated herein by reference.

In the following, the embodiment that satisfies the above formula (1) is described in detail.

In the embodiment satisfying the formula (1), rear part scattering intensity>front part scattering intensity, and preferably, rear part scattering intensity/front part scattering intensity is at least 1.4, more preferably at least 1.6, even more preferably at least 1.8. In an embodiment having a color filter on the front side that is the mainstream in the art at present, the ratio of rear part scattering intensity/front part scattering intensity is from 0.2 to 1.3 or so. From the viewpoint of the effect, there is no specific limitation on the uppermost range. One example of the liquid-crystal cell that satisfies this characteristic is a COA-structured liquid-crystal cell. In an ordinary COA-structured liquid-crystal cell, the rear part scattering intensity/front part scattering intensity would be from 2.0 to 50 or so. "COA" is an abbreviation of color filter-on-array, and a structure where a color filter is formed on an active matrix substrate is referred called a COA structure. The COA-structured liquid-crystal display device in this description may have a black matrix, in which the position of the black matrix may be on the front-side substrate or a rear-side substrate; however, for attaining a high front CR, the black matrix is preferably positioned between the rear-side polarizing element and the liquid-crystal layer in the device. The black matrix may be substituted with a TFT array light-shielding layer. In any case, the effect of enhancing the front contrast ratio indicated by the present patent can be attained. At first, the COA structure is only for forming a color film on an ordinary TFT substrate, but these days in general, in the structure, a pixel electrode is formed on the color film, and via a small hole called a contact hole, the pixel electrode is connected to TFT for improving the display characteristics. The invention is applicable to any of these types. In the COA structure, the thickness of the color filter layer is larger than that of the ordinary-type color filter layer (1 to 2 µm or so), and is generally from 2 to 4 µm or so. This is for the purpose of preventing the parasitic capacity to form between the edge of the pixel electrode and the wiring. The thickness of the color filter layer that the liquid-crystal display device of the invention has is preferably from 2 to 4 µm, to which, however, the invention is not limited. In production of a COA-structured liquid-crystal cell, the pixel electrode on the color filter must be patterned, therefore requiring resistance to etchant and peelant. For this purpose, a color filter material (coloring photosensitive composition) of which the thickness is controlled to be thick is used, but a two-layered constitution of color filter layer formed of an ordinary color filter material+overcoat layer may be employed. In the invention, any such constitution is employable.

The COA structure is described further in JP-A 2005-99499, 2005-258004, 2005-3733, and in JP-A 2007-240544, 2004-163979, and in the invention, any constitution is employable.

Even a non-COA-structured liquid-crystal cell having a color filter layer on the rear-side substrate can also satisfy rear part scattering intensity>front part scattering intensity and rear part scattering intensity/front part scattering intensity≥1.4. One example is an embodiment where the contrast ratio of the color filter is high. One example of a high-contrast ratio color filter is a color filter comprising a pigment having a smaller particle size than that of the pigment in ordinary CF. Examples of the method for forming a high-contrast ratio color filter comprising a pigment includes the following two methods.

(i) A method where pigment particles are mechanically grinding into finer particles using a disperser such as a sand mill, a roll mill or a ball mill, and this is described in detail, for example, in JP-A 2009-144126, which may be incorporated herein by reference.

(ii) A method where a pigment is dissolved in a solvent and then reprecipitated to prepare fine pigment particles, and this is described in detail in, for example, JP-A 2009-134178.

Also proposed is a method of forming a high-contrast ratio color filter with dye in place of pigment. This is described in detail in JP-A 2005-173532, which may be incorporated herein by reference.

Using the color filter described in these patent publications, even an ordinary constitution could provide a liquid-crystal cell that satisfies rear part scattering intensity>front part scattering intensity, and rear part scattering intensity/front part scattering intensity≥1.4.

Not only the front CR but also the front color tone in the black state (front blackness) is an important display characteristic of a liquid-crystal display device. The present inventor's investigations have revealed that, in this embodiment, when the retardation (Re and Rth) of the rear-side retardation region has reversed wavelength dispersion characteristics of such that the retardation is greater at a longer wavelength in the visible light region, then the color shift to a specific color of the front blackness can be reduced. The reason may be considered to be the same as that for the light leakage in the front direction in a liquid-crystal display device described in the above. Specifically, when the reversed wavelength dispersion characteristics of the retardation in the rear-side retardation region are stronger, then the wavelength dependency of the elliptic polarization of the light running obliquely into the liquid-crystal display device from the light source (backlight) could be reduced with the result that the wavelength-dependent light leakage level could be thereby reduced and the color shift to a specific color of the front blackness could also be reduced.

In this embodiment, the rear-side retardation region is made to have a lower retardation than the front-side retardation region and the former is made to have reversed wavelength dispersion characteristics, whereby the front CR can be improved and the front color shift in the black state can be reduced.

More concretely, in this embodiment, where the rear-side retardation region is made to have a low retardation and have reversed wavelength dispersion characteristics, the front color shift in the black state can be reduced more, as compared with that in the other embodiment where the rear-side retardation region also has a low retardation but has regular wavelength dispersion characteristics. In the latter embodiment, somewhat bluish color shift is observed, but in the former embodiment, bluish color shift is seen little. On an u'v' chromaticity diagram, black requires that v' is 0.375 or more. On the u'v' chromaticity diagram, bluish color shift in the black state means reduction in the value v'. In the former embodiment, v' can reach 0.38 or more.

In this embodiment, the retardation of the rear-side retardation region and that of the front-side retardation region are not specifically defined, so far as they satisfy the above formula (1). Depending on the mode of the liquid-crystal cell to be used in the device and on $\Delta nd(\lambda)$ of the liquid-crystal layer in the black state, Rth of the rear-side retardation region and that of the front-side retardation region satisfying $Rth_{front}(\lambda) > Rth_{rear}(\lambda)$ can be determined. In this embodiment, for example, so far as the above-mentioned relational formula is satisfied at a wavelength $\lambda = 550$ nm, the difference between the $Rth_{front}(550)$ and the $Rth_{rear}(550)$ is preferably from 10 to 590 nm, more preferably from 50 to 550 nm, even more preferably from 100 to 500 nm. When the Rth difference is less than the above range, the effect would be insufficient; but on the other hand, in order that the different is over the above range, much limitation should be given to the film production conditions (in point of the type of the additive, the draw ratio in stretching, etc.), and this may be often unfavorable from the viewpoint of production latitude.

In the embodiment, preferably, Rth of the rear-side retardation region and that of the front-side retardation region are defined within the range satisfying the following formula:

$$0 \text{ nm} \le |R\text{th}(550)| \le 300 \text{ nm}.$$

In addition, in the embodiment, Re of the rear-side retardation region and that of the front-side retardation region are preferably defined within the range satisfying the following formula:

$$0 \text{ nm} \le Re(550) \le 100 \text{ nm}.$$

One example of the invention is a VA-mode liquid-crystal display device. In the embodiment of the VA-mode liquid-crystal display device, when Rth of the rear-side retardation region satisfies the following formula (I), then a remarkable effect of retarding reduction of the front CR can be achieved.

$$|R\text{th}(550)| \le 90 \text{ nm} \quad \text{(I)}$$

The rear-side retardation may have a single layer structure or may be a laminate of two or more layers. In the embodiment where the region has a single layer structure, the layer preferably satisfies the formula (I); and in the embodiment where the region is a laminate of at least two layers, the laminate preferably satisfies the above formula (I) as a whole.

The front side retardation region may also be a single layer structure or a laminate composed of two or more layers. Preferably, $Rth_{front}$ of the front-side retardation region is on a level capable of compensating $\Delta nd$ of the liquid-crystal layer in the black state, along with $Rth_{rear}$ of the rear-side retardation region. As shown in the above Table, $\Delta nd(550)$ of the VA-mode liquid-crystal layer is from 250 nm to 370 nm, and generally from 280 to 350 nm or so. Combinations of the front-side retardation region and the rear-side retardation region suitable for compensation of $\Delta nd(\lambda)$ are described in various patent publications, for example, Japanese Patents 3282986, 3666666 and 3556159, which may be incorporated herein by reference. From this viewpoint, the front-side retardation region preferably satisfies the following formulas (III) and (IV):

$$30 \text{ nm} \le Re(550) \le 90 \text{ nm} \quad \text{(III)}$$

$$150 \text{ nm} \le R\text{th}(550) \le 300 \text{ nm} \quad \text{(IV)}$$

For satisfying the above-mentioned characteristics, the front-side retardation region may be formed of one or more biaxial polymer films, or may comprise one or more biaxial polymer films. Further, the front-side retardation region may comprise one or more uniaxial polymer films.

$\Delta nd$ of a VA-mode liquid-crystal cell is generally from 280 to 350 nm or so, and this is for increasing as much as possible the transmittance in the white state. On the other hand, when $\Delta nd$ is less than 280 nm, the white brightness may decrease slightly along with the reduction in $\Delta nd$, but since the cell thickness d is small, the liquid-crystal display device can be excellent in rapid responsibility. In case where the rear-side retardation region has a low retardation, then the light leakage in the front direction is reduced and, as a result, the characteristic feature of the invention of attaining a high front CR is effective in any liquid-crystal display devices having different $\Delta nd(550)$.

In one embodiment of the invention, the rear-side retardation region (18 in FIG. 1) satisfies the following formula (II):

$$|Re(550)| \le 20 \text{ nm} \quad \text{(II)}$$

Even when a retardation film having a high Re is disposed on the rear side, the effect of the invention is attained so far as Rth satisfies the above-mentioned formula (I). On the other hand, in case where a retardation film having Re in some degree is disposed on the rear side, strict axial alignment would be necessary in relation to the optical axis of other parts such as the absorption axis of the rear-side polarizing element, etc. Preferably, the rear-side retardation region has a low Re and satisfies the above-mentioned formula (II) as a whole, as facilitating axial alignment in incorporating one or more retardation films to be the rear-side retardation region in the liquid-crystal display device.

Another advantage of the invention is reduction in "circular unevenness". "Circular unevenness" is a phenomenon of circular light leakage to occur in a liquid-crystal panel in the black state after exposed to a high-temperature/high-humidity atmosphere. Its detail is described in JP-A 2007-187841.

One reason is because the backlight-side liquid-crystal cell substrate (that is, rear-side substrate 14 in FIG. 1) is warped when exposed to a high-temperature/high-humidity atmosphere. In this embodiment, since retardation of the rear-side retardation region is small, warping of the substrate, if any, would have little influence on retardation. Further in the liquid-crystal cell of the COA structure, a color filter is also disposed in addition to the array part on the rear-side substrate, and the substrate is therefore hardly warped even under heat, and as a result, circular unevenness can be reduced.

One example of this embodiment is a VA-mode liquid-crystal display device where the rear-side retardation region (18 in FIG. 1) satisfies the formula (Ia):

$$|Rth(550)| \leq 20 \text{ nm.} \tag{Ia}$$

When the formula (Ia) is satisfied, the circular unevenness may be reduced more.

From the viewpoint of the circular unevenness, the thickness of the retardation film disposed in the rear-side retardation region (18 in FIG. 1) is preferably smaller; and concretely, the thickness is preferably from 2 to 100 μm or so, more preferably from 2 to 60 μm or so, even more preferably from 2 to 40 μm or so.

In case where the part inside the liquid-crystal cell such as the color filter layer also has retardation along the thickness-direction, preferably, retardation along the thickness-direction of the color filter layer, $Rth_{CF}$ is taken into consideration in determining $Rth_{rear}$ of the rear-side retardation region. More preferably, the above formula (I) satisfies the following formula (I') with $Rth_{CF}$ taken into consideration, $$|Rth_{CF} + Rth_{rear}| \leq 90 \text{ nm,} \tag{I'}$$

and the above formula (Ia) satisfies the following formula (I'a), $$|Rth_{CF} + Rth_{rear}| \leq 20 \text{ nm.} \tag{I'a}$$

It is presumed that $Rth_{CF}(550)$ of the color filter layer would be developed by binder alignment or pigment molecule packing.

As described above, by adjusting Δnd(550) of the VA-mode liquid crystal cell to the range of from about 280 nm to about 350 nm, it is possible also to improve the transmittance in the white state. In the embodiment wherein the rear-side retardation region satisfies formula (Ia), for improving also the viewing angle CR, the front-side retardation region preferably satisfies following formulas (IIIa) and (IVa):

$$30 \text{ nm} \leq Re(550) \leq 90 \text{ nm} \tag{IIIa}$$

$$180 \text{ nm} \leq Rth(550) \leq 300 \text{ nm;} \tag{IVa}$$

and in the embodiment having the VA-mode liquid crystal cell whose Δnd(550) is from about 280 nm to about 350 nm, the front-side retardation region preferably satisfies following formulas (IIIa-1) and (IVa-1):

$$50 \text{ nm} \leq Re(550) \leq 75 \text{ nm} \tag{IIIa-1}$$

$$200 \text{ nm} \leq Rth(550) \leq 300 \text{ nm;} \tag{IVa-1}$$

and more preferably satisfies following formulas (IIIa-2) and (Iva-2):

$$50 \text{ nm} \leq Re(550) \leq 75 \text{ nm} \tag{IIIa-2}$$

$$220 \text{ nm} \leq Rth(550) \leq 270 \text{ nm.} \tag{IVa-2}$$

In terms of retardation-film producibility, practically, the embodiments employing the retardation film satisfying Rth (550)≤230 nm are preferable. This is because, usually, for preparing any retardation film having high retardation, stretching with a high stretching ratio may be carried out; and is because stretching with a higher stretching ratio may cause breaking more frequently.

From this viewpoint, in the embodiment wherein the rear-side retardation region satisfies formula (Ia), for also improving the viewing angle CR, the front-side retardation region preferably satisfies following formulas (IIIA) and (IVa):

$$30 \text{ nm} \leq Re(550) \leq 90 \text{ nm} \tag{IIIa}$$

$$180 \text{ nm} \leq Rth(550) \leq 300 \text{ nm;} \tag{IVa}$$

and in the embodiment wherein Δnd(550) of the VA-mode liquid crystal cell is equal to or smaller than 280 nm, the front-side retardation region more preferably satisfies following formulas (IIIa-3) and (Iva-3):

$$50 \text{ nm} \leq Re(550) \leq 80 \text{ nm} \tag{IIIa-3}$$

$$180 \text{ nm} \leq Rth(550) \leq 280 \text{ nm;} \tag{Iva-3}$$

and even more preferably satisfies following formulas (IIIa-4) and (Iva-4):

$$50 \text{ nm} \leq Re(550) \leq 80 \text{ nm} \tag{IIIa-4}$$

$$180 \text{ nm} \leq Rth(550) \leq 230 \text{ nm.} \tag{Iva-4}$$

Another example of the embodiment is a VA-mode liquid crystal display device having the rear-side retardation region (indicated with 18 in FIG. 1) satisfying following formula (Ib):

$$20 \text{ nm} < |Rth(550)| \leq 190 \text{ nm.} \tag{Ib}$$

In the embodiment wherein the rear-side retardation region satisfies formula (Ib), for also improving the viewing angle CR, it is not necessary to use any retardation film having so large retardation as the front-side retardation region because the rear-side retardation region may share retardation required for improving the viewing angle. Namely, according to the embodiment wherein the rear-side retardation region satisfies formula (Ib), it is possible to obtain not only the effect of the invention but also improvement of the viewing angle with good producibility.

In the embodiment wherein the rear-side retardation region satisfies formula (Ib), for also improving the viewing angle, the front-side retardation region preferably satisfies formulas (IIIb) and (IVb):

$$30 \text{ nm} \leq Re(550) \leq 90 \text{ nm} \tag{IIIb}$$

$$150 \text{ nm} \leq Rth(550) \leq 270 \text{ nm;} \tag{IVb}$$

and in the embodiment wherein Δnd(550) of the VA-mode liquid crystal cell is from about 280 nm to about 350 nm, the front-side retardation region more preferably satisfies following formulas (IIIb-1) and (IVb-1):

$$50 \text{ nm} \leq Re(550) \leq 80 \text{ nm} \tag{IIIb-1}$$

$$170 \text{ nm} \leq Rth(550) \leq 270 \text{ nm;} \tag{IVb-1}$$

and even more preferably satisfies following formulas (IIIb-2) and (IVb-2):

$$50 \text{ nm} \leq Re(550) \leq 80 \text{ nm} \tag{IIIb-2}$$

$$170 \text{ nm} \leq Rth(550) \leq 230 \text{ nm.} \tag{IVb-2}$$

And in the embodiment wherein Δnd(550) of the VA-mode liquid crystal cell is equal to or smaller than 280 nm, the front-side retardation region more preferably satisfies following formulas (IIIb-3) and (IVb-3):

$$60 \text{ nm} \leq Re(550) \leq 90 \text{ nm} \tag{IIIb-3}$$

$$150 \text{ nm} \leq Rth(550) \leq 250 \text{ nm;} \tag{IVb-3}$$

and more preferably satisfies following formulas (IIIb-4) and (IVb-4):

$$60 \text{ nm} \leq Re(550) \leq 90 \text{ nm} \quad \text{(IIIb-4)}$$

$$150 \text{ nm} \leq R\text{th}(550) \leq 230 \text{ nm}. \quad \text{(IVb-4)}$$

In FIG. 1, all or a part of the rear-side retardation region 18 and the front-side retardation region 16 may function as a protective film for the rear-side polarizing element 22 and the front-side polarizing element 20, respectively. Though not shown in FIG. 1, the rear-side polarizing element 22 may additionally have any functional film such as protective film, antifouling film, antireflection film, antiglare film, antistatic film or the like on the surface thereof facing the backlight 24; and similarly, the front-side polarizing element may additionally have any functional film such as protective film, antifouling film, antireflection film, antiglare film, antistatic film or the like on the panel-side surface thereof.

As described in the above, in a system where one side shares a large retardation for optical compensation, heretofore, the film having a large retardation is generally disposed on the rear side; however, it is considered that, in case where the high-retardation film is disposed on the front side, as in the present invention, the yield of polarizing plate may increase. The reason is described below.

The high-retardation film requires a step of stretching it at a high draw ratio, and therefore, its width could hardly be broadened, as compared with inexpensive films not requiring many additives in their production, or that is, so-called plane TAC (triacetyl cellulose film having Re of from 0 to 10 nm and Rth of from 30 to 80 nm), or low-retardation films. In ordinary liquid-crystal display devices, a wide liquid-crystal cell is used, and in general, the absorption axis of the front-side polarizing element is disposed in the horizontal direction (in the width direction) while the absorption axis of the rear-side polarizing element is disposed in the vertical direction (in the length direction). Further, in industrial-scale mass-production, the polarizing element and the retardation film are stuck together generally in a roll-to-roll system. Taking the matter into consideration that the polarizer produced according to the method is stuck to the liquid-crystal cell, it is recommended to arrange the high-retardation film on the front side for efficiently using the width direction of the polarizing plate, or that is, the production yield is increased. In case where a low-retardation film is disposed on the rear side as in the present invention, the film can be readily prepared as a wide film, and it can be combined with a wide polarizing element to further increase the production yield. As a result, an amount of the polarizing plate to be wasted may be reduced.

This is described with reference to concrete numerical data. In general, the width of a retardation film is 1100 mm, 1300 mm, 1500 mm, 2000 mm or 2500 mm; and the thickness of the film is about 25 μm, 40 μm or 80 μm. The length of the roll of the film is about 2500 m or 4000 m. On the other hand, regarding the panel size of a VA-mode liquid-crystal display device for application to TV, the panel size may be 20 inches, 32 inches, 40 inches, 42 inches, 52 inches or 68 inches. As one example, 42-inch panels most popularly released at present are discussed here. The 42-inch panel (standard 4:3) has a panel width of 853 mm (42-inch wide panel 16:9 has 930 mm), and a panel height of 640 mm (42-inch wide panel has 523 mm). In a conventional ordinary system where a high-retardation film is disposed on the rear side, only one retardation film for panel could be taken from a retardation film having, for example, a width of 1300 mm or 1500 mm in the width direction thereof. However, in the embodiment of the present invention, a high-retardation film is disposed on the front side, and therefore, even a retardation film having a width of, for example, 1300 mm or 1500 mm could be so cut that the height of the thus-cut film piece corresponding to the height of the panel size could be in the width direction of the film, or that is, retardation films for two panels can be taken in the width direction, and the producibility may be doubled. The TV size is increasing year by year, and for example, a 65-inch (standard) TV has a panel width of 991 mm and a panel height of 1321 mm. In conventional ordinary rear-side arrangement in such a wide-view TV, even a wide-sized 2000-mm film could give only one retardation film for one panel in the width direction. Contrary to this, in the front-side arrangement as in the embodiment of the present invention, the film can give retardation films for two panels in the width direction. Further, a 68-inch (wide-view) TV has a panel width of 1505 mm and a panel height of 846 mm, for which about doubled productivity can be expected similarly.

In the invention, the liquid crystal display device may be driven in a field-sequential driving mode. According to the field-sequential driving mode, the liquid-crystal cell may have no color filter. The field-sequential driving mode liquid-crystal cell is described in detail in JP-A 2009-42446, 2007-322988, and Japanese Patent 3996178, which are incorporated herein by reference. In the field-sequential driving mode, used are independent backlight units that sequentially emit lights of three primary colors. Preferred are backlight units each provided with LED as the light source; and for example, preferably used are backlight units each provided with an LED element emitting any of three colors of red, green and blue.

The VA-mode liquid-crystal display device of one embodiment of the invention can be driven in any mode, concretely in any mode of MVA (Multi-Domain Vertical Alignment), PVA (Patterned Vertical Alignment), OP (Optical Alignment) or PSA (Polymer-Sustained Alignment). The details of these modes are described in JP-A 2006-215326, and JP-T 2008-538819. The optical alignment mode and the PSA mode realize high front contrast ratio. The advantage of the invention is more remarkable in a high-contrast panel.

Various members which can be used in the VA-mode liquid crystal display device, which is an embodiment of the invention, are described in detail below.

1. Rear-Side and Front-Side Retardation Regions

According to the invention, one or two or more retardation layers as a whole, which are disposed between the rear-side polarizing element and the liquid crystal cell, are called "rear-side retardation region". Preferably, Rth(550) of the rear-side retardation region satisfies the following formula:

$$0 \text{ nm} \leq |R\text{th}(550)| \leq 300 \text{ nm}$$

and/or Re(550) of the rear-side retardation region satisfies the following formula:

$$0 \text{ nm} \leq Re(550) \leq 100 \text{ nm}.$$

In the embodiment satisfying the above formula (1), preferably, the rear-side retardation region more satisfies the above formula (I) as a whole; and more preferably, it satisfies the above formula (II) as a whole.

In an embodiment, preferably, the rear-side retardation region satisfies the above formula (Ia); and more preferably, it satisfies the following formulas:

$$0 \text{ nm} \leq Re(550) \leq 20 \text{ nm and } |R\text{th}(550)| \leq 120 \text{ nm};$$

even more preferably, it satisfies the following formulas:

$$0 \text{ nm} \leq Re(550) \leq 10 \text{ nm and } |R\text{th}(550)| \leq 10 \text{ nm};$$

and even much more preferably, it satisfies the following formulas:

$$0 \text{ nm} \leq Re(550) \leq 5 \text{ nm and } |Rth(550)| \leq 5 \text{ nm}.$$

In another embodiment, the rear-side retardation region satisfies the above formula (Ib), more preferably, it satisfies the following formulas:

$$0 \text{ nm} \leq Re(550) \leq 20 \text{ nm and } 20 \text{ nm} \leq |Rth(550)| \leq 90 \text{ nm};$$

even more preferably, it satisfies the following formulas:

$$0 \text{ nm} \leq Re(550) \leq 10 \text{ nm and } 30 \text{ nm} \leq |Rth(550)| \leq 90 \text{ nm};$$

and even much more preferably, it satisfies the following formulas:

$$0 \text{ nm} \leq Re(550) \leq 10 \text{ nm and } 40 \text{ nm} \leq |Rth(550)| \leq 80 \text{ nm}.$$

According to the invention, one or two or more retardation layers as a whole, which are disposed between the front-side polarizing element and the liquid crystal cell, are called "front-side retardation region". Preferably, Rth(550) of the front-side retardation region satisfies the following formula:

$$0 \text{ nm} \leq |Rth(550)| \leq 300 \text{ nm}$$

and/or Re(550) of the front-side retardation region satisfies the following formula:

$$0 \text{ nm} \leq Re(550) \leq 100 \text{ nm}.$$

In the embodiment satisfying the above formula (1), the front-side retardation region satisfies the above formulas (III) and (IV); and in the embodiment wherein the rear-side retardation region satisfies the above formula (Ia), preferably, the front-side retardation region satisfies the above formulas (IIIa) and (IVa).

Especially, in the embodiment wherein Δnd(550) of the VA-mode liquid crystal cell is from about 280 nm to about 350 nm, more preferably, the front-side retardation region satisfies the above formulas (IIIa-1) and (IVa-1); even more preferably, and it satisfies the above formulas (IIIa-2) and (IVa-2). On the other hand, in the embodiment wherein Δnd (550) of the VA-mode liquid crystal cell is equal to or smaller than 280 nm, more preferably, the front-side retardation region satisfies the above formulas (IIIa-3) and (IVa-3); even more preferably, and it satisfies the above formulas (IIIa-4) and (IVa-4). In the embodiment wherein the rear-side retardation region satisfies the above formula (Ib), preferably, the front-side retardation region satisfies the above formulas (IIIb) and (IVb). Especially, in the embodiment wherein Δnd (550) of the VA-mode liquid crystal cell is from about 280 nm to about 350 nm, more preferably, the front-side retardation region satisfies the above formulas (IIIb-1) and (IVb-1); even more preferably, and it satisfies the above formulas (IIIb-2) and (IVb-2). On the other hand, in the embodiment wherein Δnd(550) of the VA-mode liquid crystal cell is equal to or smaller than 280 nm, more preferably, the front-side retardation region satisfies the above formulas (IIIb-3) and (IVb-3); even more preferably, and it satisfies the above formulas (IIIb-4) and (IVb-4). However, as described above, the invention is not limited to the embodiment employing a VA-mode.

The materials of one or more layers constituting the rear-side or front-side retardation region are not limited. The retardation region satisfying the above formulas (I) and (II) or the above formulas (III) and (IV) can be constituted by one or more biaxial films or by plural uniaxial films such as any combination of C-plate and A-plate; and of course, The retardation region satisfying the above formulas (I) and (II) or the above formulas (III) and (IV) can be also constituted by any combination of one or more biaxial films and one or more uniaxial films. In terms of saving the cost, preferably, at least one of the rear-side and front-side retardation regions is constituted by a single film, and more preferably, both are constituted by a single film respectively.

Another preferable embodiment of the front-side retardation region is composed of two films, film A and film B. Film A is disposed closer to the liquid crystal cell than Film B. Film A satisfies following formula (4), film B satisfies following formulae (5) and (6). This embodiment is excellent in compensation of the viewing angle characteristics. In this embodiment, the transmission axis of the front-side polarizing element and the slow axis of film B are orthogonal or parallel to each other: It is to be noted that the term "orthogonal" or "parallel" includes generally acceptable errors in the technical field of the invention and that the term includes acceptable errors within ±3°, more specifically.

$$|Re_{film\ A}(550)| \leq 100 \text{ nm (more preferably,} \\ |Re_{film\ A}(550)| \leq 60 \text{ nm)}, \tag{4}$$

$$|Re_{film\ B}(550)| \geq 50 \text{ nm (more preferably,} \\ |Re_{film\ B}(550)| \geq 100 \text{ nm)}, \tag{5}$$

$$0.05 \leq Nz \leq 3 \text{ (more preferably, } 0.3 \leq Nz \leq 1.5). \tag{6}$$

In formula (4), $Re_{film\ A}(550)$ means retardation in-plane of the film A at a wavelength of 550 nm; in formula (5), $Re_{film\ B}(550)$ means retardation in-plane of the film B at a wavelength of 550 nm; in formula (6), $Re_{film\ B}(550)$ means retardation in-plane of the film B at a wavelength of 550 nm, $Rth_{film\ B}(550)$ means retardation along the thickness-direction of the film B at a wavelength of 550 nm, and $Nz = Rth_{film\ B}(550)/Re_{film\ B}(550) + 0.5$.

In formulas (4)-(6), the positive or negative sign added to Re(550) of the two films, films A and B, is for indicating the relation between the slow axis of the film and the transmissive axis of the polarizing film, and the positive sign was added to Re(550) when the slow axis was along with the transmissive axis of the polarizing film.

In any of the above-described embodiments, the wavelength dispersion characteristics of retardation in-plane (Re) of the rear-side and front-side retardation regions preferably becomes larger at a longer wavelength, that is, Re of the rear-side and front-side retardation regions preferably shows the reversed wavelength dispersion characteristics. Namely, Re of the rear-side and front-side retardation regions preferably satisfies Re(450)<Re(550)<Re(630). This is because, using the retardation region in which Re exhibits the reversed wavelength dispersion characteristics, the optical properties may be optimized in all of visible-light wavelength region if the optical properties are optimized at the center wavelength of the visible light, about 550 nm.

The effect caused by retardation of the rear-side retardation region exhibiting the reversed-dispersion characteristics is improvement in the front black state (reduction in the front bluish tone in the black state); and, on the other hand, the effect caused by retardation of the front-side retardation region exhibiting the reversed-dispersion characteristics is improvement in the viewing angle characteristics such as improvement in viewing angle CR and improvement in the viewing angle color (reduction in the color variation in the oblique direction in the black state).

For obtaining the higher front CR, internal haze of the retardation film(s) constituting the rear-side or front-side retardation region is preferably equal to or smaller than 0.5, more preferably equal to or smaller than 0.3, and even more preferably equal to or smaller than 0.2.

In this description, the film haze may be measured as follows: According to JIS K-6714, a film sample having a size of 40 mm×80 mm is prepared, and analyzed with a haze meter (NDH-2000, by Nippon Denshoku Industry) in an environment at 25 degrees Celsius and 60% RH, thereby measuring the haze of the film.

The rear-side or front-side retardation region may be formed of a retardation film alone or formed of a lamination of two or more films. And the materials thereof are not limited as far as it satisfies the above-described properties. For example, one or two or polymers may be selected from the group consisting of a cellulose acylate, a polycarbonate-base polymer, a polyester-base polymer such as polyethylene terephthalate or polyethylene naphthalate, an acrylic-base polymer such as polymethylmethacrylate, or a styrene-base polymer such as polystyrene or an acrylonitrile-styrene copolymer (AS resin) may be used. Polyolefin such as polyethylene or polypropylene, a polyolefin-base polymer such as an ethylene-propylene copolymer, a vinyl chloride-base polymer, an amide-base polymer such as nylon or aromatic polyamide, an imido-base polymer, a sulfone-base polymer, a polyether sulfone-base polymer, polyetherether ketone-base polymer, a polyphenylensulfide-base polymer, a vinylidene chloride-base polymer, a vinyl alcohol-base polymer, a vinyl butyral-base polymer, an acrylate-base polymer, a polyoxymethylene-base polymer, an epoxy-base polymer, and a polymer containing a mixture of the above polymers, and are used as a major ingredient for preparing the retardation film constituting the rear-side or front-side retardation region satisfying the above-described properties.

As a retardation film satisfying the formulas (I) and (II) alone or a lamination of two or more films satisfying the formulas (I) and (II) as a whole, or a retardation film satisfying the formulas (II) and (IV), cellulose acylate-base, acryl-base polymer, and cycloolefin-base polymer films are preferable.

Cellulose Acylate-Base Film:

In the description, the term "cellulose acylate-base film" means a film containing any cellulose acylate(s) as a major ingredient (50 mass % or more with respect to the total mass of all ingredients). The cellulose acylate(s) which can be used for preparing the film is a compound in which hydrogen atom(s) of hydroxy group in the cellulose acylate is substituted with an acyl group. The cellulose acylate is a compound in which hydrogen atom(s) of hydroxy group in the cellulose acylate is substituted with an acyl group; and the acyl group having from 2 (acetyl) to 22 carbon atoms may be used as the substituent. Regarding the cellulose acylate which can be used in the invention, the substitution degree of hydroxy group in cellulose is especially not limited. The degree of substitution (degree of acylation) can be obtained by measuring the binding degree of acetic acid and/or $C_3$-$C_{22}$ aliphatic acid to hydroxy(s) in cellulose and then calculating the measured values(s). The measuring may be carried out according to ASTM の D-817-91.

The substitution degree of the cellulose acylate which can be used as a material of the retardation film(s) constituting the retardation region is especially not limited, and is preferably from 2.30 to 3.00. The reversed-dispersion characteristics of the cellulose acylate-base film may be prepared by controlling the substitution degree or using any retardation enhancer, which is described in JP-A 2009-63983 or the like.

The cellulose acylate is preferably cellulose acetate, and may have any acyl group other than acetyl in place of acetyl or together with acetyl. Among these, cellulose acylates having at least one acyl selected from the group consisting of acetyl, propionyl and butyryl is preferable; and cellulose acylates having at least two selected from the group consisting of acetyl, propionyl and butyryl is more preferable. And cellulose acylates having acetyl and propionyl and/or butyryl are even more preferable; and the cellulose acylates having the substitution degree of acetyl of from 1.0 to 2.97 and the substitution degree of propionyl and/or butyryl of from 0.2 to 2.5 are even much more preferable.

The mass-averaged polymerization degree of the cellulose acylate to be used for preparing the retardation film constituting the retardation region is preferably from 200 to 800, and more preferably from 250 to 550. The number-averaged molecular weight of the cellulose acylate to be used for preparing the retardation film constituting the retardation region is preferably from 70000 to 230000, more preferably from 75000 to 230000, and even more preferably from 78000 to 120000.

Examples of the cellulose acylate(s) which can be used for preparing the film satisfying the formula (Ia) include those described in JP-A 2006-184640, [0019]-[0025].

The cellulose acylate-base film to be used as a part of the retardation region or as the retardation region itself is preferably prepared according to a solution casting method. In this method, a solution (dope) which is prepared by dissolving cellulose acylate in an organic solvent is used for forming the film. When at least one additive is used, the additive may be added to a dope in any step during preparing the dope.

In preparing the cellulose acylate-base film for the front-side retardation region, any retardation enhancer is preferably used, and in preparing the cellulose acylate-base film for the rear-side retardation region, any retardation enhancer may be used. Examples of the retardation enhancer which can be used in the invention include rod-like or discotic compounds and positive-birefringence compounds. Examples of the rod-like or discotic compound include compounds having at least two aromatic rings, and are preferably used as a retardation enhancer. An amount of the rod-like compound is preferably from 0.1 to 30 parts by mass, and more preferably from 0.5 to 20 parts by mass with respect to 100 parts by mass of the polymer ingredients including cellulose acylate. An amount of the discotic compound is preferably from 0.05 to 20 parts by mass, more preferably from 0.1 to 15 parts by mass, and much more preferably from 0.1 to 10 parts by mass with respect to 100 parts by mass of the cellulose acylate.

The discotic compound is more excellent than the rod-like compound in terms of enhancing Rth retardation; and when especially high Rth retardation is required, the discotic compound is preferably used. Plural types of the compounds may be used as a retardation enhancer.

The retardation enhancer preferably has a maximum absorption within the wavelength range of from 250 to 400 nm, and preferably has no absorption within the visible-light range substantially.

Examples of the retardation enhancer include compound (1)-(3) as follows.

(1) Discotic Compound

The discotic compound is described in detail. As the discotic compound, compounds having at least two aromatic rings may be used.

In the description, the term "aromatic ring" means not only an aromatic hydrocarbon ring but also an aromatic hetero ring. Examples of the discotic compound which can be used in the invention include those described in JP-A 2008-181105, [0038]-[0046].

Examples of the discotic compound which can be used as a material of the retardation film constituting the retardation region include the compounds represented by formula (I) below.

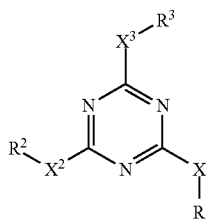

(I)

In the formula, $X^1$ represents a single bond, —$NR^4$—, —O— or —S—; $X^2$ represents a single bond, —$NR^5$—, —O— or —S—; $X^3$ represents a single bond, —$NR^6$—, —O— or —S—. And, $R^1$, $R^2$, and $R^3$ independently represent an alkyl group, an alkenyl group, an aromatic ring group or a hetero-ring residue; $R^4$, $R^5$ and $R^6$ independently represent a hydrogen atom, an alkyl group, an alkenyl group, an aryl group or a hetero-ring group.

Preferred examples, I-(1) to IV-(10), of the compound represented by formula (I) include, but are not limited to, those shown below.

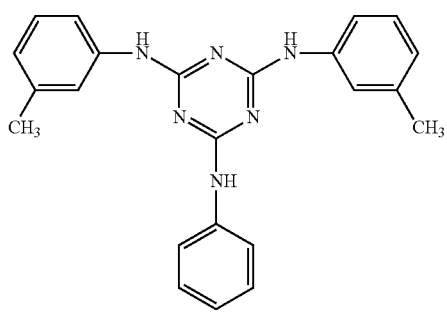

I-(1)

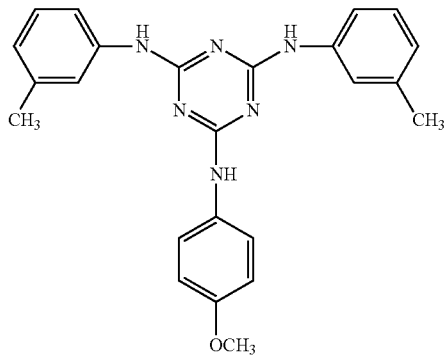

I-(2)

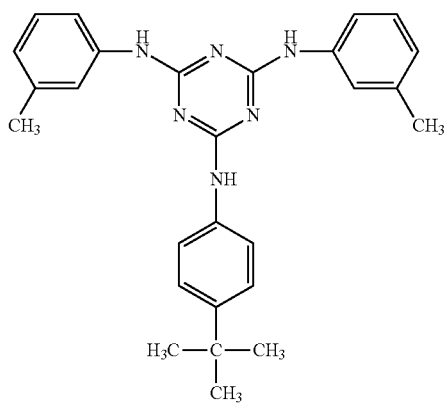

I-(3)

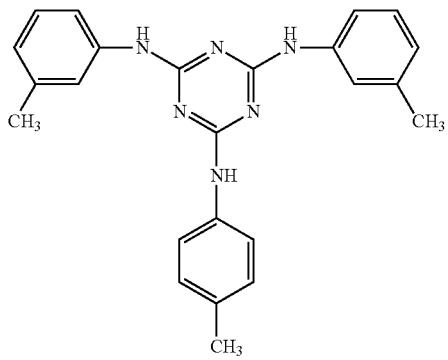

I-(4)

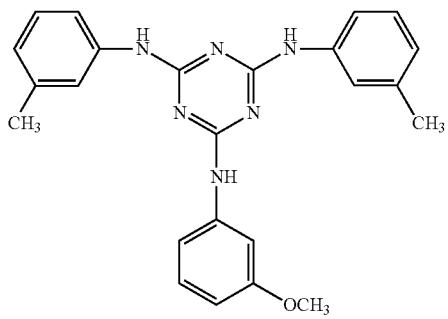

I-(5)

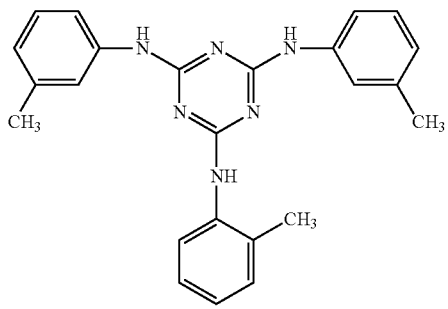

I-(6)

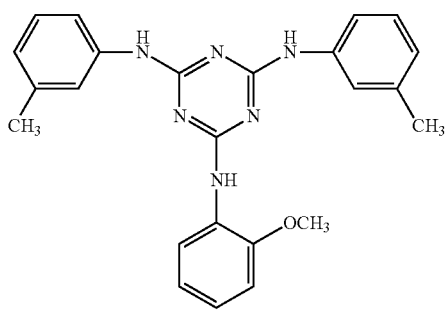

I-(7)

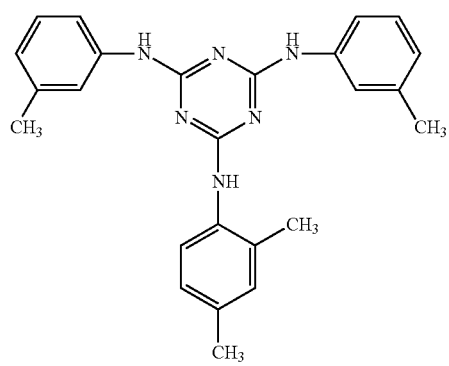
I-(8)
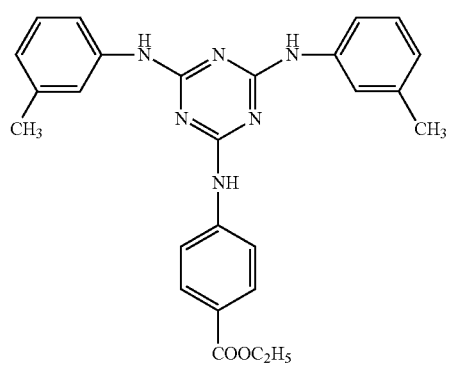
I-(9)
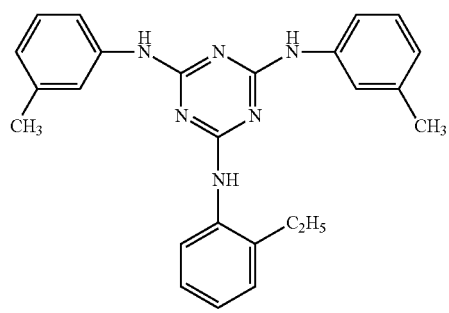
I-(10)
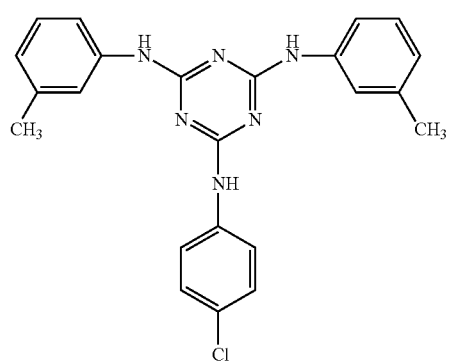
I-(11)
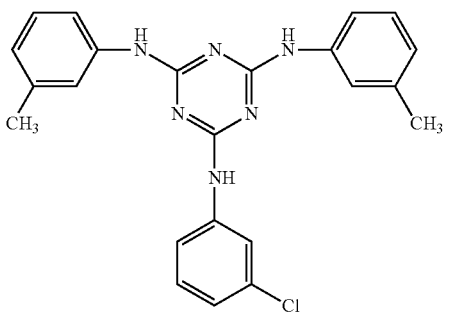
I-(12)
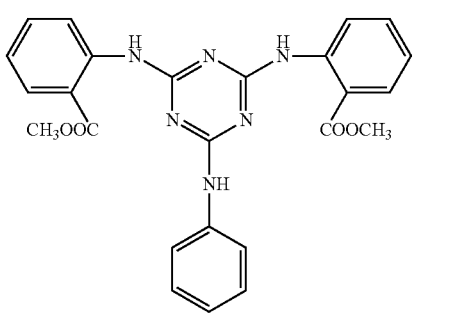
I-(13)
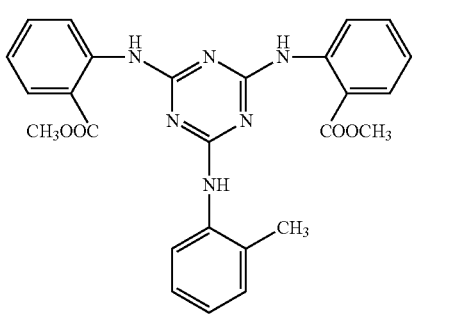
I-(14)
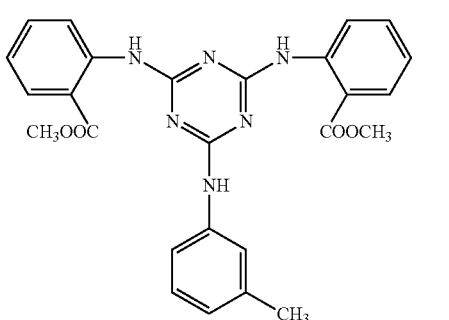
I-(15)
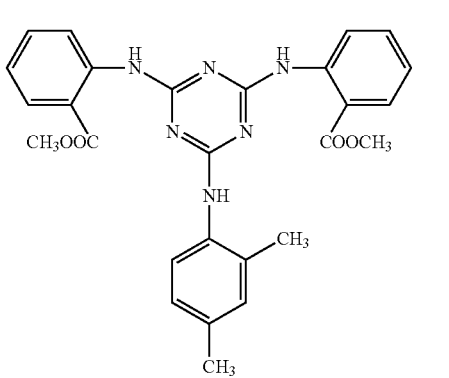
I-(16)

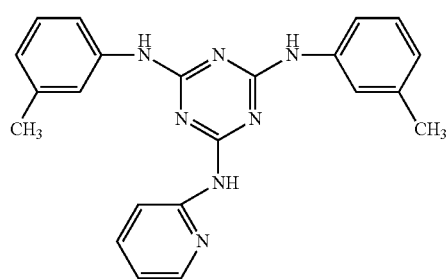 I-(17)
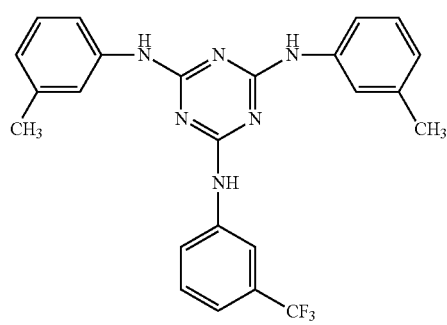 I-(18)
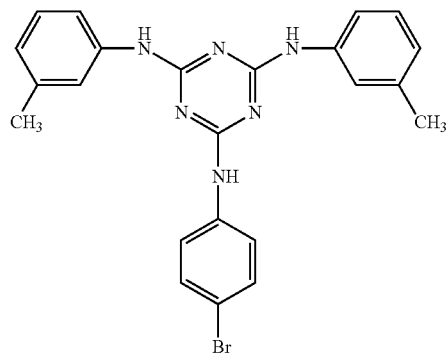 I-(19)
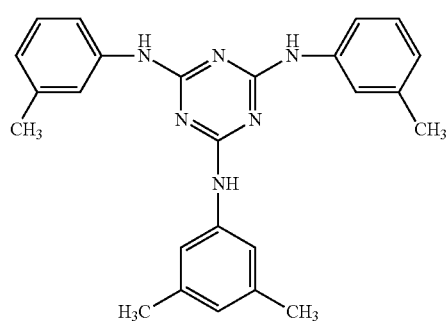 I-(20)
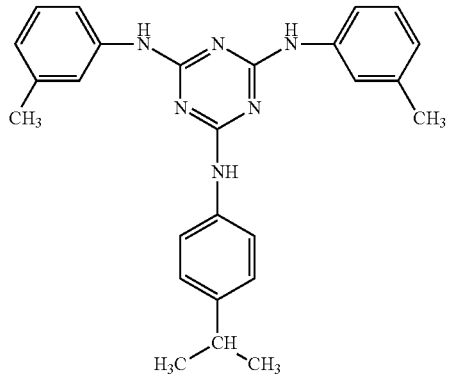 I-(21)
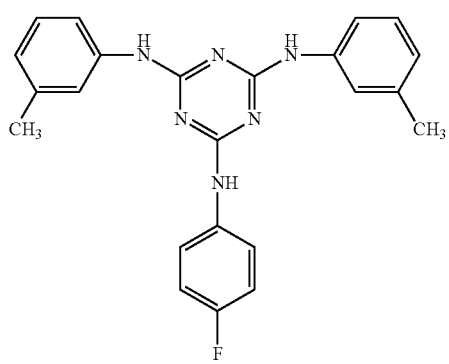 I-(22)
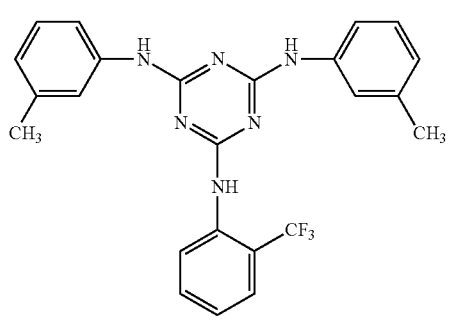 I-(23)
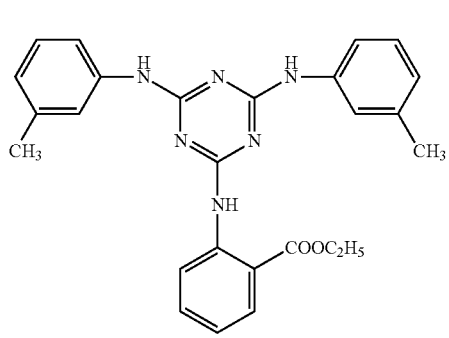 I-(24)

-continued
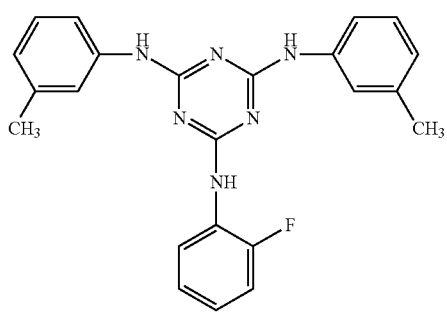
I-(25)
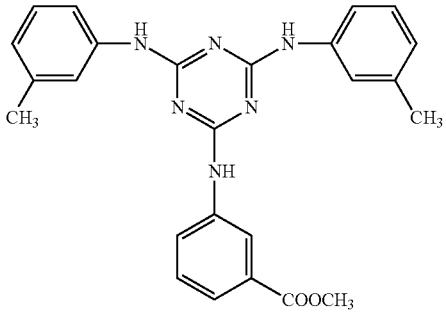
I-(29)
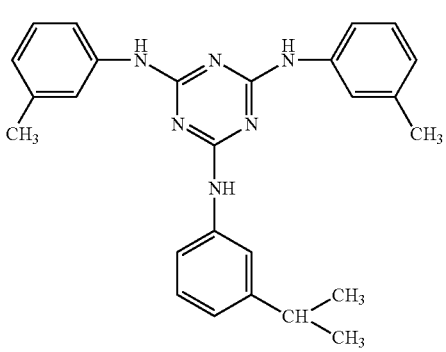
I-(30)
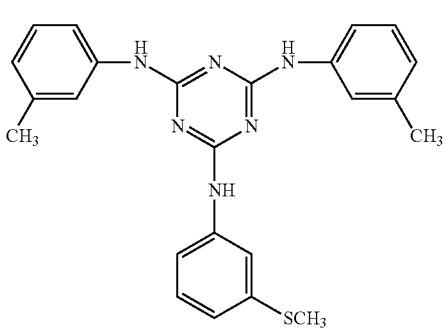
I-(31)
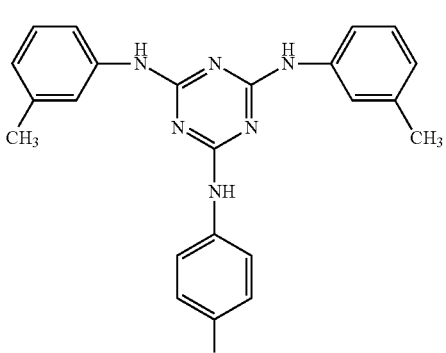
I-(32)
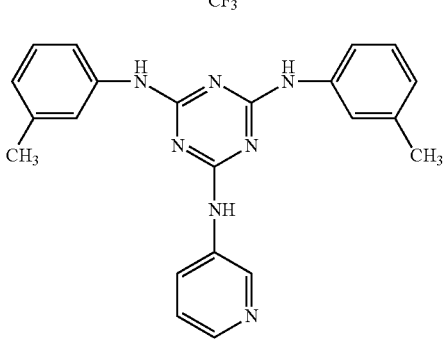
I-(33)

-continued
I-(34)
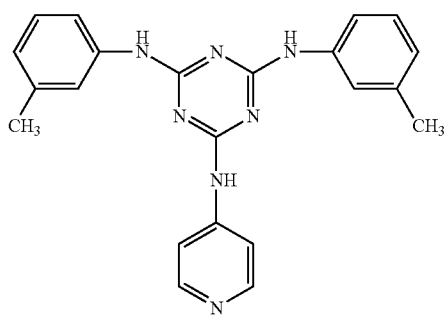
I-(35)
I-(36)
I-(37)
I-(38)
-continued
I-(39)
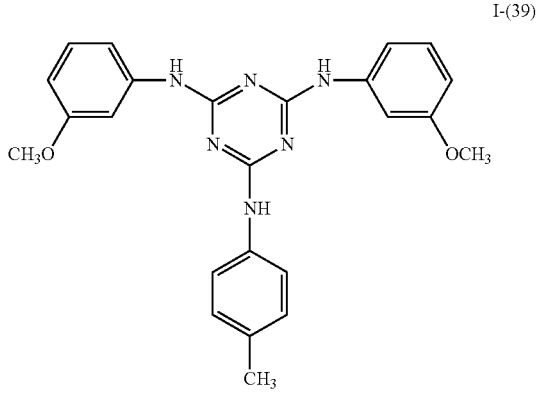
I-(40)
I-(41)
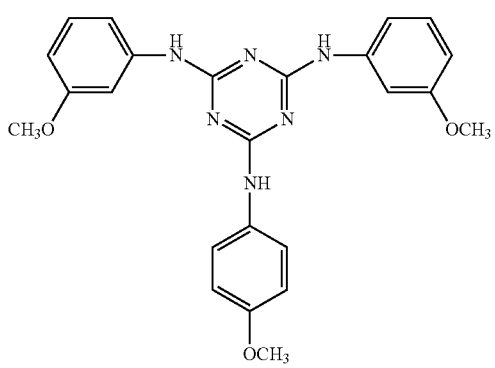
I-(42)
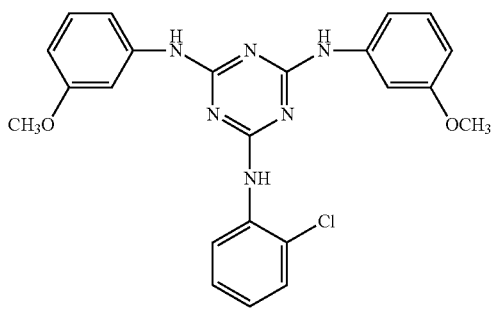

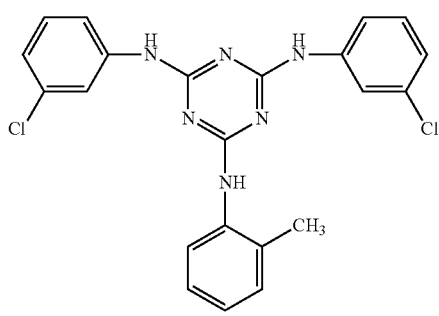
I-(43)
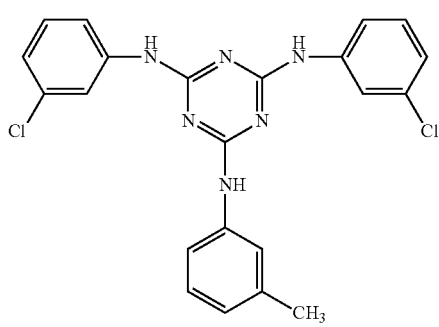
I-(44)
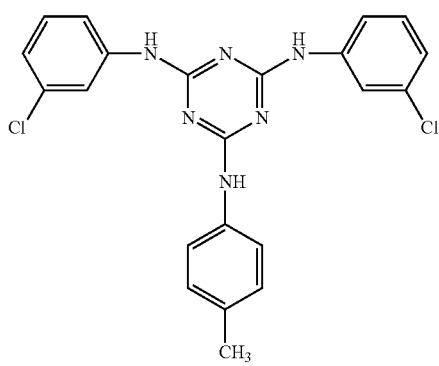
I-(45)
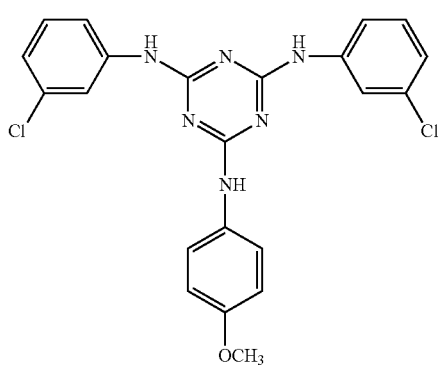
I-(46)
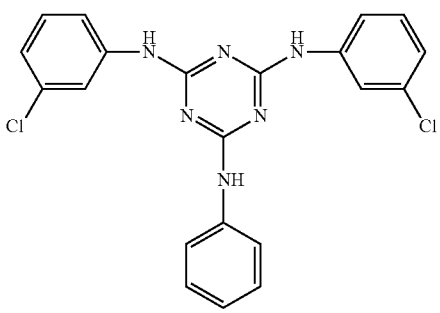
I-(47)
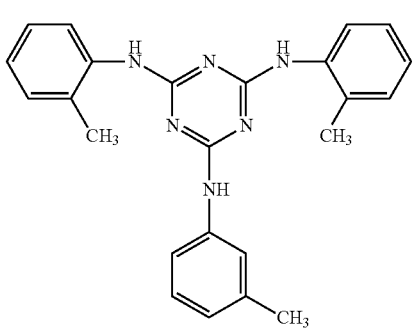
I-(48)
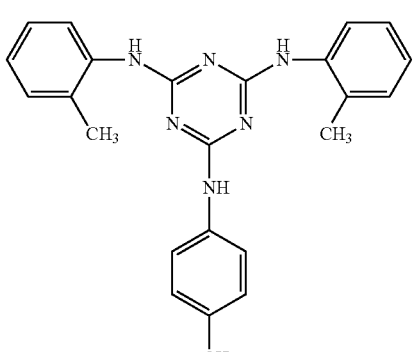
I-(49)
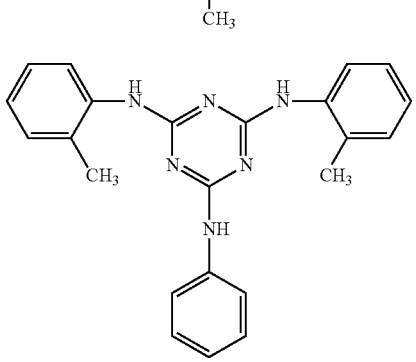
I-(50)
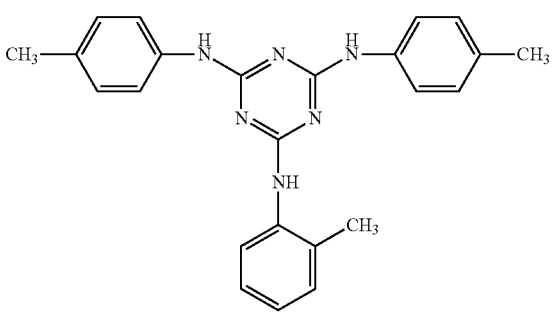
II-(1)

II-(2)
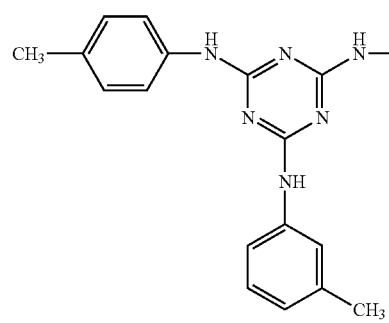
II-(3)
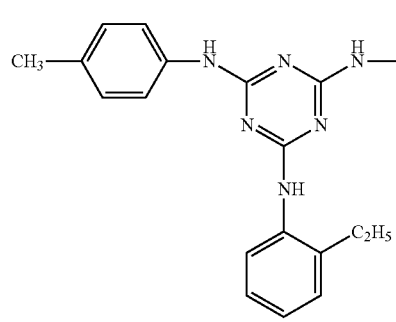
II-(4)
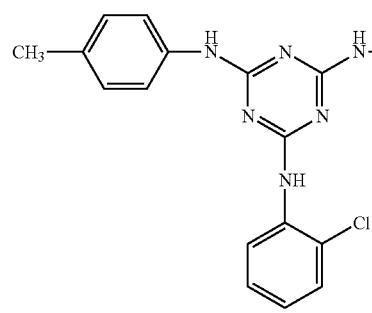
II-(5)
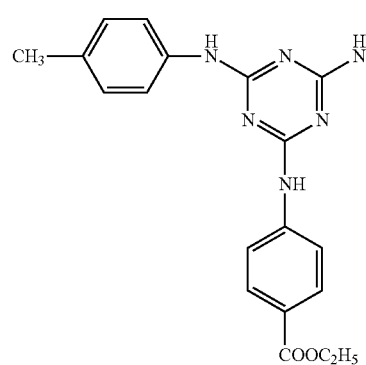
II-(6)
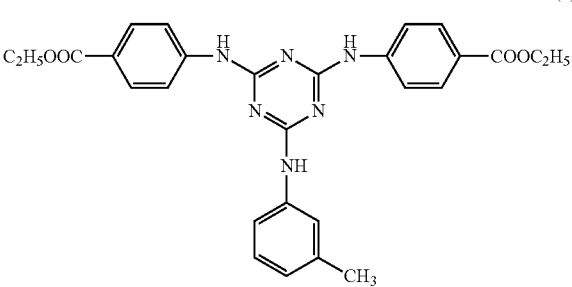
II-(7)
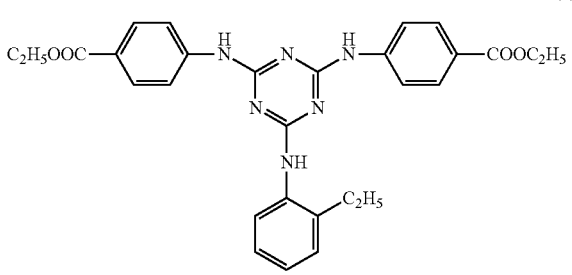
II-(8)
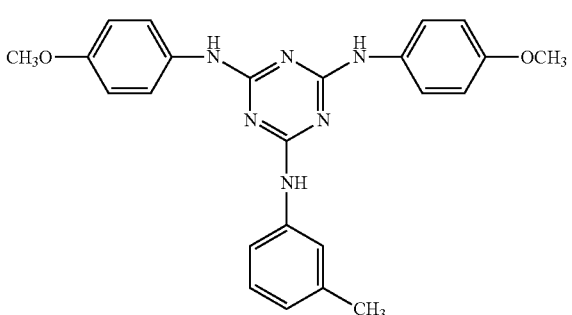
II-(9)
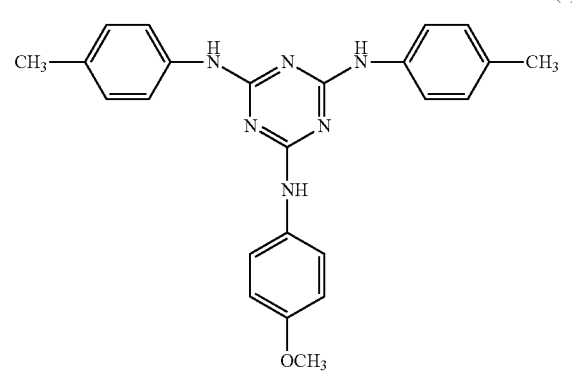
III-(1)
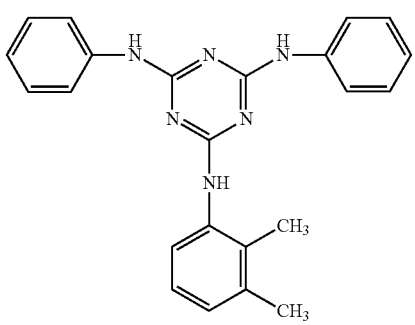

III-(2) 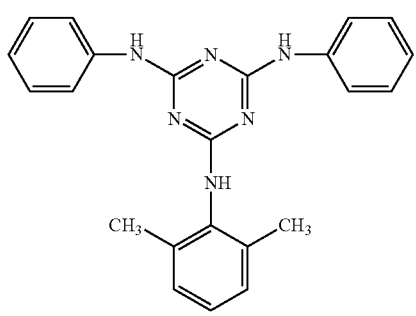
III-(3) 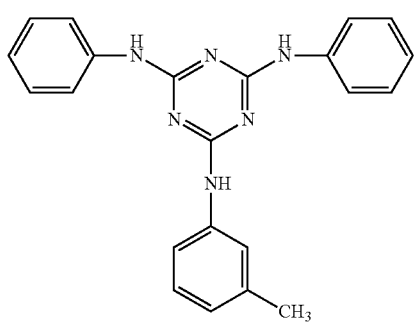
III-(4) 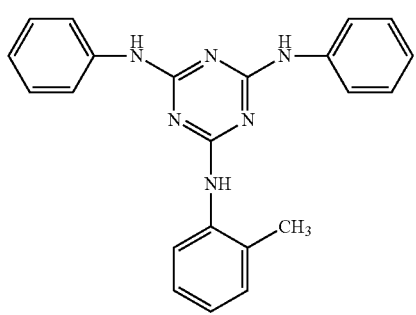
III-(5) 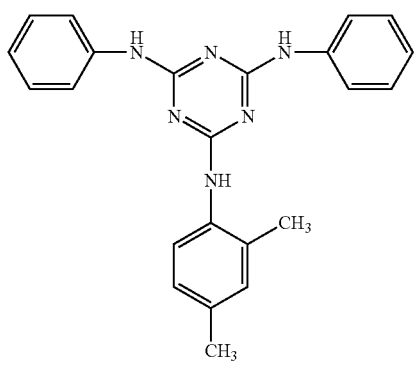
III-(6) 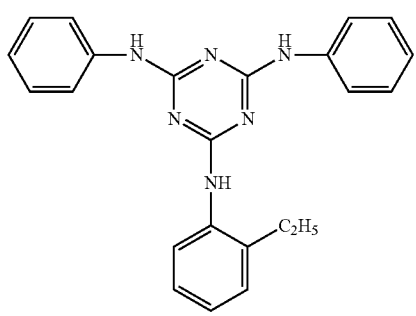
III-(7) 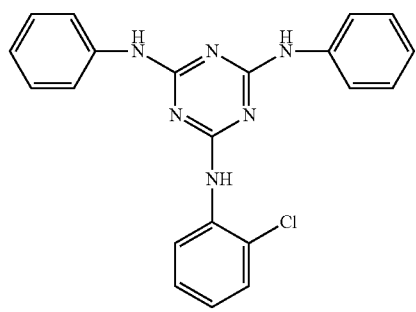
III-(8) 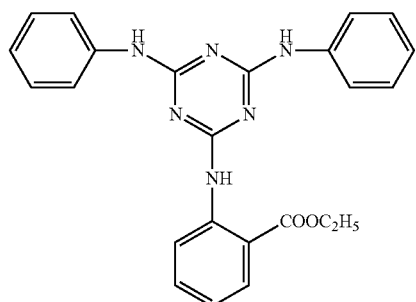
III-(9) 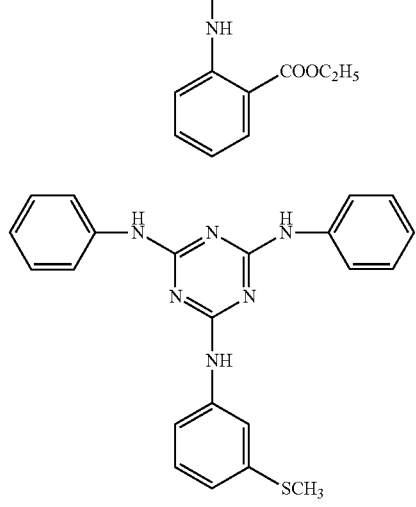
III-(10) 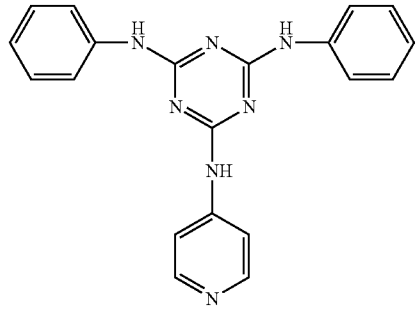
III-(11) 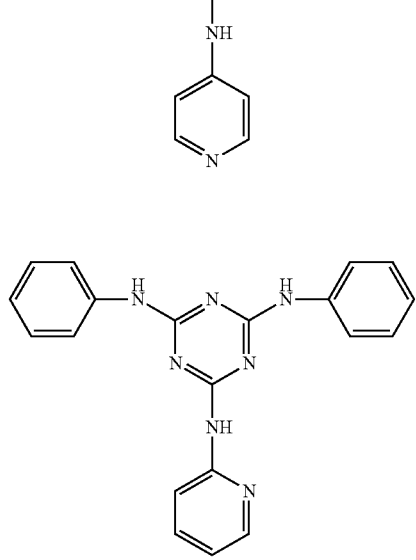

III-(12)
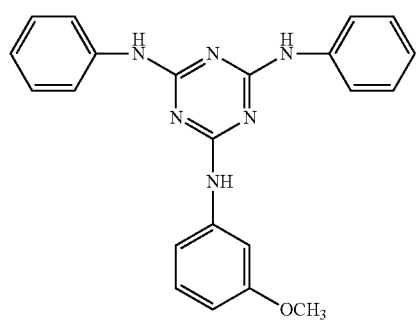
IV-(1)
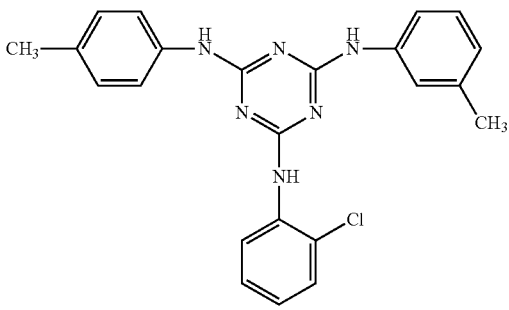
IV-(2)
IV-(3)
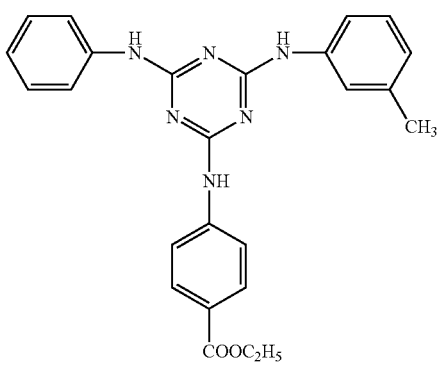
IV-(4)
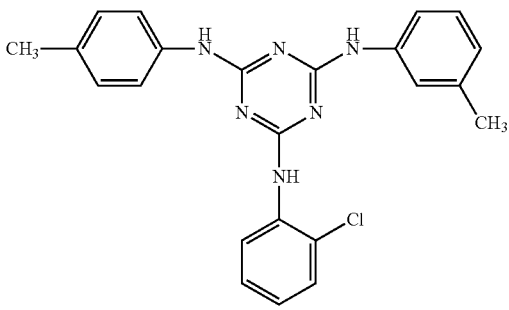
IV-(5)
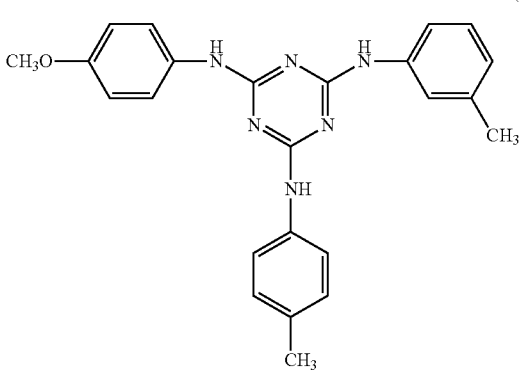
IV-(6)
IV-(7)
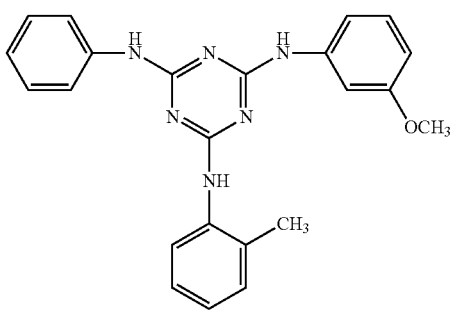

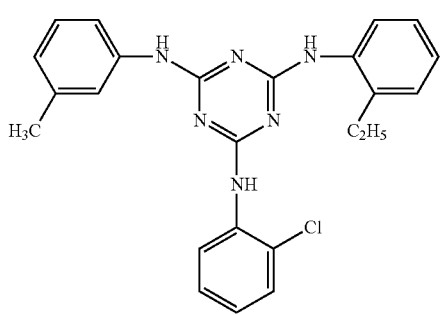

IV-(8)

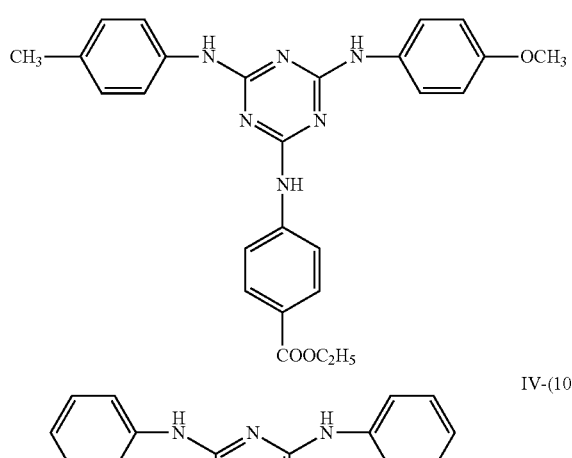

IV-(9)

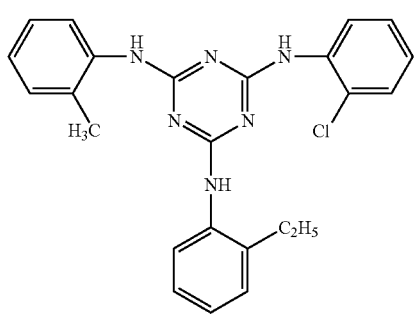

IV-(10)

(2) Rod-Like Compound

In the invention, the rod-like compound, that is, the compound having a straight line-like molecular structure is preferably used other than the discotic compound. Examples of the rod-like compound which can be used in the invention include those described in JP-A 2007-268898, [0053]-[0095].

(3) Positive-Birefringent Compound

A positive-birefringent compound is a polymer as follows: a layer formed of uniaxially oriented molecules of a polymer exhibits a larger refractive index relative to the light coming along the orientation direction and a smaller refractive index relative to the light coming along the perpendicular direction to the orientation direction, and in such a case, the polymer is a positive-birefringent polymer.

Such a positive-birefringent compound is not limited, and examples of the positive-birefringent compound include polymers having intrinsic positive birefringence such as polyamides, polyimides, polyesters, polyetherletones, polyamideimides and polyesterimides; polyetherketones and polyester-base polymers are preferable; and polyester-base polymers are more preferable.

The polyester-base polymers are prepared by carrying out the reaction of the mixture of $C_{2-20}$ aliphatic dicarboxylic acids and $C_{8-20}$ aromatic dicarboxylic acids with at least one diol selected from $C_{2-12}$ aliphatic diols, $C_{4-20}$ alkylether diols and $C_{6-20}$ aromatic diols. If necessary, the both terminals of the products may be blocked by carrying out the reaction with mono carboxylic acid, mono alcohol or phenol. Blocking the terminal may be carried out for avoiding contamination of any free carboxylic acid, and is preferable in terms of preservation stability. The dicarboxylic acids which can be used for preparing the polyester-base polymers are preferably $C_{4-20}$ aliphatic dicarboxylic acids or $C_{8-20}$ aromatic dicarboxylic acids.

Examples of the preferable $C_{2-20}$ aliphatic dicarboxylic acids which can be used preferable include oxalic acid, malonic acid, succinic acid, maleic acid, fumaric acid, glutaric acid, adipic acid, pimelic acid, suberic acid, azelaic acid, sebacic acid, dodecanedicarboxylic acid and 1,4-cyclohexane dicarboxylic acid.

Examples of $C_{8-20}$ aromatic dicarboxylic acid include phthalic acid, terephthalic acid, isophthalic acid, 1,5-naphtharene dicarboxylic acid, 1,4-naphtharene dicarboxylic acid, 1,8-naphtharene dicarboxylic acid, 2,8-naphtharene dicarboxylic acid and 2,6-naphtharene dicarboxylic acid.

Among these aliphatic dicarboxylic acids, malonic acid, succinic acid, maleic acid, fumaric acid, glutaric acid, adipic acid, azelaic acid and 1,4-cyclohexane dicarboxylic acid are preferable; and among these aromatic dicarboxylic acids, phthalic acid, terephthalic acid, isophthalic acid, 1,5-naphtharene dicarboxylic acid and 1,4-naphtharene dicarboxylic acid are preferable. Among these aliphatic dicarboxylic acids, succinic acid, glutaric acid and adipic acid are especially preferable; and among these aromatic dicarboxylic acids, phthalic acid, terephthalic acid and isophthalic acid are especially preferable.

Any combination of the above-described aliphatic dicarboxylic acid and aromatic dicarboxylic acid may be used, and the combination is not especially limited. Plural types of them may be combined respectively.

The diol or aromatic diol which can be used in the positive birefringent compound may be, for example, selected from $C_{2-20}$ aliphatic diols, $C_{4-20}$ alkylether diols and $C_{6-20}$ aromatic diols Examples of $C_{2-20}$ aliphatic diol include alkyl diols and alicyclic diols such as ethane diol, 1,2-propanediol, 1,3-propanediol, 1,2-butanediol, 1,3-butanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethyrol pentane), 2-n-butyl-2-ethyl-1,3-propanediol (3,3-dimethyrol heptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol, and 1,12-octadecanediol. These glycols may be used alone or in combination with other(s).

Ethane diol, 1,2-propanediol, 1,3-propanediol, 1,2-butanediol, 1,3-butanediol, 2-methyl-1,3-propanediol, 1,4-butanediol, 1,5-pentanediol, 3-methyl-1,5-pentanediol, 1,6-hexanediol, 1,4-cyclohexane diol and 1,4-cyclohexane dimethanol are preferable; and ethane diol, 1,2-propanediol, 1,3-propanediol, 1,2-butanediol, 1,3-butanediol, 1,4-butanediol, 1,5-pentanediol, 1,6-hexanediol, 1,4-cyclohexane diol and 1,4-cyclohexane dimethanol are especially preferable.

Preferable examples of $C_{4-20}$ alkylether diol include polytetramethylene ether glycol, polyethylene ether glycol, polypropylene ether glycol and any combinations thereof. The averaged polymerization degree is especially not limited, and preferably from 2 to 20, more preferably from 2 to 10, much more preferably from 2 to 5 and especially preferably from 2 to 4. Examples of such a compound include useful commercially-available polyether glycols such as Carbowax resins, Pluronics resins and Niax resins.

Examples of $C_{6-20}$ aromatic diol include, however are not limited, bisphenol A, 1,2-hydroxy benzene, 1,3-hydroxy benzene, 1,4-hydroxy benzene and 1,4-benzene dimethanol. Bisphenol A, 1,4-hydroxy benzene and 1,4-benzene dimethonal are preferable.

The positive birefringent compound is preferably the compound of which terminals are blocked by any alkyl or aryl group. Protecting the terminals with any hydrophobic group is effective for preventing time degradation under a condition of a high temperature and a high humidity, and this is because it may play a role of prolonging hydrolysis of ester groups.

For avoiding terminal OH or carboxylic acid in the positive birefringent compound, the terminal is preferably blocked with a monoalcohol residue or a monocarboxylic acid residue.

As the monoalcohol, $C_{1-30}$ substituted or non-substituted monoalcohols are preferable, and examples thereof include aliphatic alcohols such as methanol, ethanol, propanol, isopropanol, butanol, isobutanol, pentanol, isopentanol, hexanol, isohexanol, cyclohexyl alcohol, octanol, isooctanol, 2-ethylhexyl alcohol, nonyl alcohol, isononyl alcohol, tert-nonyl alcohol, decanol, dodecanol, dodeca hexanol, dodeca octanol, allyl alcohol and oleyl alcohol; and substituted alcohols such as benzyl alcohol and 3-phenyl propanol.

Preferable examples of the alcohol which can be used for blocking the terminals include methanol ethanol, propanol, isopropanol, butanol, isobutanol, pentanol, isopentanol, hexanol, isohexanol, cyclohexyl alcohol, isooctanol, 2-ethylhexyl alcohol, isononyl alcohol, oleyl alcohol and benzyl alcohol: and much more preferable examples thereof include methanol ethanol, propanol, isobutanol, cyclohexyl alcohol, 2-ethylhexyl alcohol, isononyl alcohol and benzyl alcohol.

When a monocarboxylic acid residue is used for blocking the terminals, monocarboxylic acid, which is used as a monocarboxylic acid residue, is preferably $C_{1-30}$ substituted or non-substituted monocarboxylic acid. It may be an aliphatic monocarboxylic acid or aromatic monocarboxylic acid. Preferable examples of the aliphatic monocarboxylic acid include acetic acid, propionic acid, butane acid, caprylic acid, caproic acid, decane acid, dodecane acid, stearic acid and oleic acid; and preferable examples of the aromatic monocarboxylic acid include benzoic acid, p-tert-butyl benzoic acid, p-tert-amyl benzoic acid, orthotoluic acid, methatoluic acid, paratoluic acid, dimethyl benzoic acid, ethyl benzoic acid, n-propyl benzoic acid, amino benzoic acid and acetoxy benzoic acid. These compounds may be used alone or in combination with other(s).

The positive birefringent compound can be produced with ease according to any conventional method, for example, according to a polyesterification, interesterification or thermal-fusing condensation method of a dicarboxylic acid component and a diol component and/or a monocarboxylic acid or monoalcohol for blocking terminals, or an interfacial condensation method of an acid chloride of a dicarboxylic acid component and a glycol. Polycondensate esters usable in the invention are described in detail in Koichi Murai, "Plasticizers and their Theory and Applications" (by Miyuki Shobo, 1st Ed., issued on Mar. 1, 1973). In addition, also usable herein are materials described JP-A Nos. 5-155809, 5-155810, 5-197073, 2006-259494, 7-330670, 2006-342227, and 2007-3679.

Examples of the positive birefringent compound include, however are not limited to, those shown below.

|  | Dicarboxylic acid | | | Diol | | |
| --- | --- | --- | --- | --- | --- | --- |
|  | Aromatic dicarboxylic acid | Aliphatic dicarboxylic acid | Ratio of dicarboxylic acids (mol %) | Aliphatic diol | Both terminals | Number-averaged molecular weight |
| P-1 | — | AA | 100 | Ethane diol | hydroxyl | 1000 |
| P-2 | — | AA | 100 | Ethane diol | hydroxyl | 2000 |
| P-3 | — | AA | 100 | Propane diol | hydroxyl | 2000 |
| P-4 | — | AA | 100 | Butane diol | hydroxyl | 2000 |
| P-5 | — | AA | 100 | Hexane diol | hydroxyl | 2000 |
| P-6 | — | AA/SA | 60/40 | Ethane diol | hydroxyl | 900 |
| P-7 | — | AA/SA | 60/40 | Ethane diol | hydroxyl | 1500 |
| P-8 | — | AA/SA | 60/40 | Ethane diol | hydroxyl | 1800 |
| P-9 | — | SA | 100 | Ethane diol | hydroxyl | 1500 |
| P-10 | — | SA | 100 | Ethane diol | hydroxyl | 2300 |
| P-11 | — | SA | 100 | Ethane diol | hydroxyl | 6000 |
| P-12 | — | SA | 100 | Ethane diol | hydroxyl | 1000 |
| P-13 | PA | SA | 50/50 | Ethane diol | hydroxyl | 1000 |
| P-14 | PA | SA | 50/50 | Ethane diol | hydroxyl | 1800 |
| P-15 | PA | AA | 50/50 | Ethane diol | hydroxyl | 2300 |
| P16 | PA | SA/AA | 40/30/30 | Ethane diol | hydroxyl | 1000 |
| P-17 | PA | SA/AA | 50/20/30 | Ethane diol | hydroxyl | 1500 |
| P-18 | PA | SA/AA | 50/30/20 | Ethane diol | hydroxyl | 2600 |
| P-19 | TPA | SA | 50/50 | Ethane diol | hydroxyl | 1000 |
| P-20 | TPA | SA | 50/50 | Ethane diol | hydroxyl | 1200 |
| P-21 | TPA | AA | 50/50 | Ethane diol | hydroxyl | 2100 |
| P-22 | TPA | SA/AA | 40/30/30 | Ethane diol | hydroxyl | 1000 |
| P-23 | TPA | SA/AA | 50/20/30 | Ethane diol | hydroxyl | 1500 |
| P-24 | TPA | SA/AA | 50/30/20 | Ethane diol | hydroxyl | 2100 |
| P-25 | PA/TPA | AA | 15/35/50 | Ethane diol | hydroxyl | 1000 |
| P-26 | PA/TPA | AA | 20/30/50 | Ethane diol | hydroxyl | 1000 |
| P-27 | PA/TPA | SA/AA | 15/35/20/30 | Ethane diol | hydroxyl | 1000 |
| P-28 | PA/TPA | SA/AA | 20/30/20/30 | Ethane diol | hydroxyl | 1000 |
| P-29 | PA/TPA | SA/AA | 10/50/30/10 | Ethane diol | hydroxyl | 1000 |
| P-30 | PA/TPA | SA/AA | 5/45/30/20 | Ethane diol | hydroxyl | 1000 |
| P-31 | — | AA | 100 | Ethane diol | acetyl ester residue | 1000 |
| P-32 | — | AA | 100 | Ethane diol | acetyl ester residue | 2000 |

-continued

| | Dicarboxylic acid | | | Diol | | |
|---|---|---|---|---|---|---|
| | Aromatic dicarboxylic acid | Aliphatic dicarboxylic acid | Ratio of dicarboxylic acids (mol %) | Aliphatic diol | Both terminals | Number-averaged molecular weight |
| P-33 | — | AA | 100 | Propane diol | acetyl ester residue | 2000 |
| P-34 | — | AA | 100 | Butane diol | acetyl ester residue | 2000 |
| P-35 | — | AA | 100 | Hexane diol | acetyl ester residue | 2000 |
| P-36 | — | AA/SA | 60/40 | Ethane diol | acetyl ester residue | 900 |
| P-37 | — | AA/SA | 60/40 | Ethane diol | acetyl ester residue | 1000 |
| P-38 | — | AA/SA | 60/40 | Ethane diol | acetyl ester residue | 2000 |
| P-39 | — | SA | 100 | Ethane diol | acetyl ester residue | 1000 |
| P-40 | — | SA | 100 | Ethane diol | acetyl ester residue | 3000 |
| P-41 | — | SA | 100 | Ethane diol | acetyl ester residue | 5500 |
| P42 | — | SA | 100 | Ethane diol | acetyl ester residue | 1000 |
| P-43 | PA | SA | 50/50 | Ethane diol | acetyl ester residue | 1000 |
| P-44 | PA | SA | 50/50 | Ethane diol | acetyl ester residue | 1500 |
| P-45 | PA | AA | 50/50 | Ethane diol | acetyl ester residue | 2000 |
| P-46 | PA | SA/AA | 40/30/30 | Ethane diol | acetyl ester residue | 1000 |
| P-47 | PA | SA/AA | 33/33/34 | Ethane diol | benzoic acid | 1000 |
| P-48 | PA | SA/AA | 50/20/30 | Ethane diol | acetyl ester residue | 1500 |
| P-49 | PA | SA/AA | 50/30/20 | Ethane diol | acetyl ester residue | 2000 |
| P-50 | TPA | SA | 50/50 | Ethane diol | acetyl ester residue | 1000 |
| P-51 | TPA | SA | 50/50 | Ethane diol | acetyl ester residue | 1500 |
| P-52 | TPA | SA | 45/55 | Ethane diol | acetyl ester residue | 1000 |
| P-53 | TPA | AA | 50/50 | Ethane diol | acetyl ester residue | 2200 |
| P-54 | TPA | SA | 35/65 | Ethane diol | acetyl ester residue | 1000 |
| P-55 | TPA | SA/AA | 40/30/30 | Ethane diol | acetyl ester residue | 1000 |
| P-56 | TPA | SA/AA | 50/20/30 | Ethane diol | acetyl ester residue | 1500 |
| P-57 | TPA | SA/AA | 50/30/20 | Ethane diol | acetyl ester residue | 2000 |
| P-58 | TPA | SA/AA | 20/20/60 | Ethane diol | acetyl ester residue | 1000 |
| P-59 | PA/TPA | AA | 15/35/50 | Ethane diol | acetyl ester residue | 1000 |
| P-60 | PA/TPA | AA | 25/25/50 | Ethane diol | acetyl ester residue | 1000 |
| P-61 | PA/TPA | SA/AA | 15/35/20/30 | Ethane diol | acetyl ester residue | 1000 |
| P-62 | PA/TPA | SA/AA | 20/30/20/30 | Ethane diol | acetyl ester residue | 1000 |
| P-63 | PA/TPA | SA/AA | 10/50/30/10 | Ethane diol | acetyl ester residue | 1000 |
| P-64 | PA/TPA | SA/AA | 5/45/30/20 | Ethane diol | acetyl ester residue | 1000 |
| P-65 | PA/TPA | SA/AA | 5/45/20/30 | Ethane diol | acetyl ester residue | 1000 |
| P-66 | IPA | AA/SA | 20/40/40 | Ethane diol | acetyl ester residue | 1000 |
| P-67 | 2,6-NPA | AA/SA | 20/40/40 | Ethane diol | acetyl ester residue | 1200 |
| P-68 | 1,5-NPA | AA/SA | 20/40/40 | Ethane diol | acetyl ester residue | 1200 |
| P-69 | 1,4-NPA | AA/SA | 20/40/40 | Ethane diol | acetyl ester residue | 1200 |
| P-70 | 1,8-NPA | AA/SA | 20/40/40 | Ethane diol | acetyl ester residue | 1200 |
| P-71 | 2,8-NPA | AA/SA | 20/40/40 | Ethane diol | acetyl ester residue | 1200 |

In Tables 2 and 3, PA means phthalic acid; TPA means terephthalic acid; IPA means isophthalic acid; AA means adipic acid; SA means succinic acid; 2,6-NPA means 2,6-naphthalene dicarboxylic acid; 2,8-NPA means 2,8-naphthalene dicarboxylic acid; 1,5-NPA means 1,5-naphthalene dicarboxylic acid; 1,4-NPA means 1,4-naphthalene dicarboxylic acid; and 1,8-NPA means 1,8-naphthalene dicarboxylic acid.

An amount of such the positive birefringent compound is preferably from 1 to 30 parts by mass, more preferably from 4 to 25 parts by mass and much more preferably from 10 to 20 parts by mass with respect to 100 part by mass of the cellulose acylate.

The cellulose acylate solution to be used for preparing the cellulose acylate-base film may be added with any additive other than the retardation enhancer. Examples of another additive include antioxidants, UV inhibitors, peeling promoters, plasticizers, agents for controlling wavelength-dispersion, fine particles and agents for controlling optical properties. They may be selected from any known additives.

The cellulose acylate solution for the rear-side or front-side retardation region may be added with any plasticizer in order to improve the mechanical properties of the prepared film or the drying rate. Examples of the plasticizer which can be used in the invention include those described in JP-A 2008-181105, [0067].

For preparing the cellulose acylate-base film satisfying the formula (Ia), one or more additives described in JP-A 2006-184640, [0026]-[0218] may be used. The preferred range of the additive is as same as that described in the publication.

Acryl-Base Polymer Film:

The acryl-base polymer film which can be used in the invention is a film containing an acryl-base polymer having at least one repeating unit of (meth)acrylic acid ester as a major ingredient. Preferable examples of the acryl-base polymer include acryl-base polymers having at least one unit selected from the group consisting of lactone ring unit, maleic acid anhydride unit and glutaric anhydride together with at least one repeating unit of (meth)acrylic acid ester. Such acryl-base polymers are described in detail in JP-A 2008-9378, to which can be referred.

As another polymer, cellulose-base polymer is preferably added to the acryl-base polymer film; and in such an embodiment, they may be act in a complementary system, and the mixed materials may have any desired properties. An amount of the cellulose-base polymer is preferably from about 5 to about 40% by mass with respect to the total mass of all polymers. Usually, an acryl-base polymer film has a low moisture-permeability, and therefore, residual water is hardly to be removed after producing a polarizing plate. On the other hand the acryl-base polymer film containing cellulose-base polymer may have an appropriate moisture-permeability. Examples of such the acryl-base polymer film include the film containing cellulose acylate by an amount of 10% by mass, described in Table 4 hereinafter, and films containing cellulose acylate propionate ("CAP482-20" manufactured by Eastman Chemical) by an amount of 30% by mass.

Cycloolefin-Base Polymer Film:

Regarding the materials and methods employing the materials for preparing the cycloolefin-base polymer film, details are described in JP-A 2006-293342, [0098]-[0193], which can be referred to in the invention. Examples of the retardation film, constituting the second retardation region, include norbornene-base polymers such as ARTON (manufactured by JSR Corporation, and ZEONOR (manufactured by ZEON Corporation).

Various methods may be used for producing the retardation film constituting the rear-side or front-side retardation region. For example, a solution casting method, melt-extrusion method, calendar method or condensing forming method may be used. Among these, a solution casting method and melt-extrusion method are preferable. And the retardation film constituting the second retardation region may be a film prepared by being subjected to a stretching treatment after forming. Stretching the film may be carried out according to a monoaxially or biaxially stretching method. Simultaneously- or successively-biaxially stretching is preferable. For achieving high optical anisotropy, a film should be subjected to a stretching treatment by a high stretching ratio. For example, the film is preferably subjected to a stretching treatment in both of the width direction and the lengthwise direction (machine direction). The stretching ratio is preferably from 3 to 100%. The stretching treatment may be carried out by using a tenter. Or the longitudinally stretching treatment may be carried out between the rolls.

The retardation film constituting the rear-side or front-side retardation region may be a layer formed of a liquid crystal composition fixed in a desired alignment state, or a lamination containing such a layer and a polymer film supporting the layer. In the latter embodiment, the polymer film may be used as a protective film of the polarizing element. Examples of the liquid crystal which can be used for preparing the retardation film constituting the front-side retardation region include rod-like liquid crystals, discotic liquid crystals and cholesteric liquid crystals.

As a solvent cast method, solution lamination-casting method such as co-solvent cast method, solution successive-casting method and coating method may be used. Using a co-solvent cast method or successive-solvent method, plural cellulose acylate solutions (dopes) for forming the layers respectively are prepared. According to a solution co-casting method (simultaneous multilayered casting), each dope for each layer of plural layers (for example three or more layers) is extruded simultaneously from each slit on a casting-support (such as band or drum) by using a delivery valve (geeser) for casting, then peeled off from the support at an appropriate time, and then dried to form a film.

According to a solution successive-casting method, at first, a dope of the first layer is extruded from the delivery valve (geeser) for casting to be cast on a support; and, after being dried or not being dried, then a dope for the second layer is extruded from the delivery valve (geeser) for casting to be cast on the first layer. And if necessary, the three or more dopes are successively cast and laminated in this manner, then removed from the support at the appropriate time, and dried to form a film.

According to a coating method, generally, a core layer is prepared according to a solution casting method. And then, a prepared coating liquid is applied to the surfaces of the core layer respectively or simultaneously by using an appropriate apparatus and dried to form a layered film.

For reducing unevenness at the corner-side, it is necessary to reduce the deformation of the retardation film caused by external force to be applied to the film. The thickness of the retardation film disposed at the rear-side, constituting the second retardation region is preferably equal to or more than 20 micro meters and equal to or less than 200 micro meters, in terms of reducing unevenness at the corner-side and improving the productivity. Details regarding unevenness at the corner-side are described in JP-A 2009-69720.

2. Polarizing Element

The polarizing element disposed at the front-side or rear-side is not limited. Any normal linear polarizing film can be used. The linear polarizing film is preferably a coated polarizing film as represented by a product of Optiva Inc., or a polarizing film formed by a binder and iodine or a dichroic dye. In the linear polarizing film, iodine or dichroic dye is aligned in the binder to exhibit a polarizing ability. The iodine or dichroic dye is preferably aligned along the binder molecules, or by an auto-texturing as in liquid crystal. The currently available commercial polarizer is generally prepared by immersing a stretched polymer film in a solution of iodine or a dichroic dye in a bath, thereby penetrating iodine or dichroic dye into the binder.

3. Protective Film

To the both surfaces of the front-side or rear-side polarizing element, a protective film is preferably bonded. Each of the protective films disposed at the liquid crystal cell side constitutes a part of the rear-side or front-side retardation regions, and the former is required to satisfy the above formula (I). The latter constitutes a part of the front-side retardation region, and in some embodiments, it is required to exhibit the optical properties, which can contribute to improving the viewing angle CR, alone or in combination with other layer(s).

The protective film disposed on the outside of the front-side or rear-side polarizing element is especially not limited. Any polymer films may be used. Examples of the film are same as those which are exemplified above as examples of the retardation film constituting the first retardation region. For example, films containing cellulose acylate (e.g., cellulose acetate, cellulose propionate and cellulose butyrate), polyolefin (e.g., norbornene-base polymer, and polypropylene), poly (meth)acrylic acid ester (e.g., polymethylmethacrylate), polycarbonate, polyester or polysulfones as a major ingredient are exemplified. Commercially available polymer films (e.g., regarding cellulose acylate film, "TD80UL" (manufactured by FUJIFILM), and regarding norbornene-base polymer film, ARTON (manufactured by JSR) and ZEONOR (manufactured by NIPPON ZEON)) can be also used.

4. Process for Producing Liquid Crystal Display Device

The invention relates to a process for producing a liquid-crystal display device comprising a front-side polarizing element, a rear-side polarizing element, a liquid-crystal cell disposed between the front-side polarizing element and the rear-side polarizing element, a front-side retardation region composed of one or more retardation layers disposed between the liquid-crystal cell and the front-side polarizing element, and a rear-side retardation region composed of one or more retardation layers disposed between the liquid-crystal cell and the rear-side polarizing element; the process comprising:

a first step of preparing a liquid-crystal cell which comprises a liquid-crystal layer and a pair of a front-side substrate and a rear-side substrate to hold the liquid-crystal layer therebetween, and in which the scattering intensity of the front-side substrate and all the members formed on the substrate (hereinafter this may be referred to as "the front-member scattering intensity") satisfies the following formula (0):

The front-member scattering intensity 1/38000;  (0)

a second step of comparing the front-member scattering intensity of the liquid-crystal cell prepared in the first step with the scattering intensity of the rear-side substrate and all the members formed on the rear-side substrate (hereinafter this may be referred to as "the rear-member scattering intensity");

a third step of determining retardation along the thickness-direction $Rth_0(\lambda)$ at a wavelength $\lambda$, necessary for compensation of $\Delta nd(\lambda)$ in the black state of the liquid-crystal cell prepared in the first step; and a forth step of, on the basis of the magnitude relation between the rear-member scattering intensity and the front member scattering intensity attained in the second step, distributing the value of $Rth_0(\lambda)$, necessary for viewing angle compensation in the black state of the liquid-crystal cell, into retardation along the thickness-direction of the front-side retardation region and into the rear-side retardation region, $Rth_{front}(\lambda)$ and $Rth_{rear}(\lambda)$, respectively.

The computation method for the front-member scattering intensity and that for the rear-member scattering intensity are described in the above. The wavelength $\lambda$ may be any one in a visible light region, but in general, it is preferably the center wavelength 550 nm.

According to the perocess of the invention, there is provided a liquid-crystal display device that achieves a suitable viewing angle compensation and secures improved front CR. So far as the present inventor knows, heretofore, the technical idea of determining retardation of the retardation film used for viewing angle compensation on the basis of the scattering inside a liquid-crystal cell is quite unknown up to the present.

The second step may be carried out for determining as to which of following relational formulae (1) and (2) is satisfied:

the rear-member scattering intensity>the front-member scattering intensity,  (1)

the rear-member scattering intensity<the front member scattering intensity,  (2)

and in accordance with the result, in the fourth step, if relational formula (1) is satisfied, $Rth_0(\lambda)$ is distributed into $Rth_{front}(\lambda)$ and $Rth_{rear}(\lambda)$ respectively so that the relation of $Rth_{front}(\lambda) > Rth_{rear}(\lambda)$ is satisfied, and if relation formula (2) is satisfied, $Rth_0(\lambda)$ is distributed into $Rth_{front}(\lambda)$ and $Rth_{rear}(\lambda)$ respectively so that the relation of $Rth_{front}(\lambda) < Rth_{rear}(\lambda)$ is satisfied.

Concretely, in the fourth step, based on the result determined in the second step, one retardation film alone or two or more retardation films as combined are disposed to constitute the rear-side retardation region or the front-side retardation region so as to meet $Rth_{front}(\lambda) > Rth_{rear}(\lambda)$ or $Rth_{front}(\lambda) < Rth_{rear}(\lambda)$.

One or more retardation films to constitute the rear-side retardation region or the front-side retardation region may be selected from commercial products or may be produced according to the above-mentioned methods.

EXAMPLES

The invention is described in more detail with reference to the following Examples. In the following Examples, an amount of the material, reagent and substance used, their ratio, the operation with them and the like may be suitably modified or changed not overstepping the spirit and the scope of the invention. Accordingly, the scope of the invention should not be limited to the following Examples.

1. Production Methods for Films:

(1) Preparation of Film 1:

A commercially-available cellulose acylate film, "Z-TAC" (trade name by FUJIFILM) was prepared, and this was use as Film 1.

(2) Preparation of Film 2:

A stretched film (protective film A) was produced according to the description in [0223] to [0226] in JP-A 2007-127893. According to the description in [0232] in the patent publication, an easy-adhesion layer coating composition P-2 was prepared, and the composition was applied onto the surface of the stretched film, protective film A, according to the method described in [0246] in the patent publication, thereby forming an easy-adhesion layer thereon. The film was used as Film 2.

(3) Preparation of Film 3:

The surface of a commercially-available norbornene polymer film, "ZEONOR ZF14-060" (by Optes) was processed for corona discharge treatment, using a solid state corona discharger, 6 KVA (by Pillar). This was used as Film 3. The thickness of the film was 60 μm.

(4) Preparation of Film 4:

A commercially-available cycloolefin polymer film, "ARTON FLZR50" (by JSR) was processed for corona discharge treatment on the surface thereo. This was used as Film 4. The thickness of the film was 50 μm.

(5) Preparation of Film 5:

A commercially-available cellulose acylate film, "Fujitac TD80UL" (trade name by FUJIFILM) was prepared, and this was used as Film 5.

(6) Preparation of Film 6:

(Cellulose Acylate Solution for Low-Substitution Layer)

The following ingredients were put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (2) | 19.0 mas. pts. |
| Methylene chloride | 367.1 mas. pts. |
| Methanol | 54.8 mas. pts. |

The composition of the retardation enhancer (2) is shown in the following Table. In the following Table, EG means ethylene glycol, PG means propylene glycol, BG means butylene glycol, TPA means terephthalic acid, PA means phthalic acid, AA means adipic acid, SA means succinic acid. The retardation enhancer (2) is a non-phosphate compound, and is a compound functioning as a retardation enhancer. The terminal of the retardation enhancer (2) is blocked with an acetyl group.

| | Glycol unit | | | Dicarboxylic acid unit | | | |
|---|---|---|---|---|---|---|---|
| Retardation enhancer | Ratio of blocking both terminal hydroxyls (%) | EG (%) | PG (%) | Averaged number of carbon atoms | TPA (mole %) | SA (mole %) | Averaged number of carbon atoms | Molecular weight |
| (2) | 100 | 50 | 50 | 2.5 | 55 | 45 | 6.2 | 730 |

(Cellulose Acylate Solution for High-Substitution Layer)
The following ingredients were put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (2) | 19.0 mas. pts. |
| Silica particles having a mean particle size of 16 nm (Aerosil R972, by Nippon Aerosil) | 0.15 mas. pts. |
| Methylene chloride | 422.0 mas. pts. |
| Methanol | 63.0 mas. pts. |

(Production of Cellulose Acylate Sample)
The two cellulose acylate solutions were cast onto a band to form thereon a core layer having a thickness of 51 µm from the cellulose acylate solution for low-substitution layer and to form a skin layer A and a skin layer B each having a thickness of 2 µm from the cellulose acylate solution for high-substitution layer. The formed film was peeled away from the band, clipped, and stretched in the transverse direction by 8% at a temperature of 140 degrees Celsius while the residual solvent amount was 20% relative to the total mass of the film, using a tenter. Next, the film was unclipped and dried at 130 degrees Celsius for 20 minutes, and then, using a tenter, this was further stretched in the transverse direction by 24% at a stretching temperature of 180 degrees Celsius, thereby giving a film having a thickness of 55 µm. This was used as Film 6.

(7) Preparation of Film 7:
A cellulose acylate film having a thickness of 56 µm was produced according to the same method as that for Film 6, for which, however, the thickness of the core layer was changed from 51 µm to 52 µm and the stretching temperature in transverse stretching was changed from 180 degrees Celsius to 176 degrees Celsius. This was used as Film 7.

(8) Preparation of Film 8:
A cellulose acylate film having a thickness of 60 µm was produced according to the same method as that for Film 6, for which, however, the thickness of the core layer was changed from 51 µm to 56 µm and the draw ratio in transverse stretching was changed from 24% to 21%. This was used as Film 8.

(9) Preparation of Film 9:
(Cellulose Acylate Solution for Low-Substitution Layer)
The following ingredients were put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (2) | 17.0 mas. pts. |
| Methylene chloride | 361.8 mas. pts. |
| Methanol | 54.1 mas. pts. |

(Cellulose Acylate Solution for High-Substitution Layer)
The following ingredients were put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (2) | 11.0 mas. pts. |
| Silica particles having a mean particle size of 16 nm (Aerosil R972, by Nippon Aerosil) | 0.15 mas. pts. |
| Methylene chloride | 395.0 mas. pts. |
| Methanol | 59.0 mas. pts. |

(Production of Cellulose Acylate Sample)
The two cellulose acylate solutions were cast onto a band to form thereon a core layer having a thickness of 114 µm from the cellulose acylate solution for low-substitution layer and to form a skin layer A and a skin layer B each having a thickness of 2 µm from the cellulose acylate solution for high-substitution layer. The formed film was peeled away from the band, clipped, and conveyed with a tenter at a temperature of 170 degrees Celsius while the residual solvent amount was 20% relative to the total mass of the film. Afterwards, the film was unclipped, dried at 130 degrees Celsius for 20 minutes, and then, using a tenter, stretched in the transverse direction by 23% at a stretching temperature of 180 degrees Celsius. This was used as Film 9.

The production of Film 9 was free from the problems with the production of Film 12 (smoking in high-temperature treatment in the drying step, adhesion of vaporized oil to the parts of the machine to cause operation failure or adhesion thereof to film to cause surface failure of the film).

This is because the retardation enhancer (2) used in the production of Film 9 functions also as a plasticizer, and therefore, the production of Film 9 does not require existing low-molecular-weight plasticizers TPP and BDP as in the production of Film 12.

Use of the compound having a positive birefringence such as the retardation enhancer (2) solves the above-mentioned problems, and therefore, the compound having a positive birefringence is a preferred retardation enhancer for film production.

(10) Preparation of Film 10:
Cellulose acylate propionate, "CAP482-20" (by Eastman Chemical, having a degree of acetyl substitution of 0.2 and a degree of propionyl substitution of 2.4) was prepared. A plasticizer, 1,4-phenylene-tetraphenyl phosphate (8% by mass) and an antiaging agent (antioxidant), "IRGANOX-1010" (by Ciba Specialty Chemicals) (0.5% by mass) were added thereto, and mixed for 30 minutes with a tumbler mixer. The resulting mixture was dried with a moisture-removing hot air drier (Matsui Seisaku-sho's "DMZ2"), at a hot air temperature of 150 degrees Celsius and at a dew point of −36 degrees Celsius. Next, the mixture was fed into a double-screw extruder (by Technovel); and with adding thereto a mat agent, "AEROSIL 200V" (0.016-µm silica fine particles by Nippon Aerosil) through the additive hopper port provided in the intermediate part of the extruder via a continuous feeder so that its throughput flow could be 0.05%, and also thereto, a UV absorbent, "TINUVIN 360" (by Ciba Specialty Chemicals) is added through the same port to be at a throughput flow of 0.5%, the mixture was melt-extruded. Thus melt-extruded, the film formed had a thickness of 180 μm.

The film was biaxially stretched at a temperature of 142 degrees Celsius in MD by 1.1 times and in TD by 2.2 times. This was used as Film 10. The thickness of the film was 74 μm.

In this Example, the film starting from cellulose acylate propionate (CAP) was produced according to a melt extrusion method; however, the inventor confirmed that, needless-to-say, films having the same property could also be produced according a solution casting method and they exhibited the same effect (however, in consideration of the solubility of CAP in dope preparation, CAP having a degree of acetyl substitution of 1.6 and a degree of propionyl substitution of 0.9 was used as the starting material).

(11) Preparation of Film 11:

The norbornene film built in Toshiba's liquid-crystal panel "32C7000" was peeled, and an easy-adhesion layer was formed on the film. This was used as Film 11. The thickness of the film was 70 μm.

(12) Preparation of Film 12:

A cellulose acylate having an acyl group and a degree of acyl substitution shown in the following Table was prepared. Concretely, a catalyst, sulfuric acid (in an amount of 7.8 parts by mass relative to 100 parts by mass of cellulose) was added to cellulose, and then a carboxylic acid to give the acyl group was added thereto, and the cellulose was acylated at 40 degrees Celsius. In this, the type and an amount of the carboxylic acid were changed to thereby change and control the type of the acyl group and the degree of substitution with the acyl group. After the acylation, the product was aged at 40 degrees Celsius. The low-molecular component was removed from the cellulose acylate by washing with acetone. In the Table, Ac means an acetyl group, and CTA means cellulose triacetate (cellulose ester derivative in which the acyl groups are all acetate groups).

(Cellulose Acylate Solution)

The following ingredients were put into a mixing tank and stirred to dissolve the ingredients. After heated at 90 degrees Celsius for about 10 minutes, this was filtered through a paper filter having a mean pore size of 34 μm and a sintered metal filter having a mean pore size of 10 μm.

| Cellulose Acylate Solution | |
| --- | --- |
| CTA shown in the Table below | 100.0 mas. pts. |
| Triphenyl phosphate (TPP) | 7.8 mas. pts. |
| Biphenyldiphenyl phosphate (BDP) | 3.9 mas. pts. |
| Methylene chloride | 403.0 mas. pts. |
| Methanol | 60.2 mas. pts. |

(Mat Agent Dispersion)

The following composition containing the cellulose acylate solution that had been prepared according to the above method was put into a disperser and dispersed to prepare a mat agent dispersion.

| Mat Agent Dispersion | |
| --- | --- |
| Silica particles having a mean particle size of 16 nm (Aerosil R972, by Nippon Aerosil) | 2.0 mas. pts. |
| Methylene chloride | 72.4 mas. pts. |
| Methanol | 10.8 mas. pts. |
| Cellulose acylate solution | 10.3 mas. pts. |

(Additive Solution)

The following composition containing the cellulose acylate solution that had been prepared according to the above method was put into a mixing tank and dissolved by stirring under heat to prepare an additive solution.

| Additive Solution | |
| --- | --- |
| Retardation enhancer (1) | 20.0 mas. pts. |
| Methylene chloride | 58.3 mas. pts. |
| Methanol | 8.7 mas. pts. |
| Cellulose acylate solution | 12.8 mas. pts. |

100 parts by mass of the cellulose acylate solution, 1.35 parts by mass of the mat agent dispersion, and the additive solution in such an amount that an amount of the retardation enhancer (1) in the cellulose acylate film to be formed could be 10 parts by mass were mixed to prepare a dope for film formation. An amount of the additive is by mass relative to 100 parts by mass of an amount of the cellulose acylate.

The abbreviations of the additive and the plasticizer in the following Table are as follows:

CTA: triacetyl cellulose
TPP: triphenyl phosphate
BDP: biphenyldiphenyl phosphate Retardation Enhancer (1)

[Chemical structure of Retardation Enhancer (1): a triazine ring with three NH-aryl substituents — two 3-methylphenyl (m-tolyl) groups and one 4-methoxyphenyl group]

Using a band caster, the above dope was cast. The film having a residual solvent amount shown in the following Table was peeled away from the band, and in the section from the peeling to the tenter, this was stretched in the machine direction at the draw ratio shown in the following Table, and then, using a tenter, stretched in the transverse direction at the draw ratio shown in the following Table. Immediately after the transverse stretching, the film was shrunk (relaxed) in the transverse direction at the ratio shown in the following Table, and then the film was removed from the tenter. The process gave a cellulose acylate film. The residual solvent amount in the film removed from the tenter was as in the following Table. Both edges of the film were trimmed away just before the winding zone to make the film have a width of 2000 mm, and the film was wound up into a roll film having a length of 4000 m. The draw ratio in stretching is shown in the following Table.

| Cellulose acylate film | | Film 12 |
|---|---|---|
| Cellulose acylate | Cellulose Type | CTA |
| | Total degree of substitution | 2.81 |
| | Ratio of 6-positoon substitution | 0.320 |
| | Degree of 6-position substitution | 0.9 |
| | Substituent | Ac |
| Additive | Additive type | Retardation enhancer (1) |
| | Amount [parts by mass relative to 100 parts by mass of cellulose] | 6.4 |
| Plasticizer | Plasticizer type | TPP/BDP |
| | Amount [parts by mass relative to 100 parts by mass of cellulose] | 7.8/3.9 |
| Stretching condition | Ratio of longwise stretching [%] | 3 |
| | Ratio of cross stretching [%] | 35 |
| | Ratio of shrinking [%] | 7 |
| | Stretching speed [%/min] | 35 |
| | Film surface temperature [° C.] | 120 |
| | Amount of residual solvent at the time of peeling off [%] | 50 |
| | Amount of residual solvent at the time of termination of stretching [%] | 10 |

Thus produced, the cellulose acylate film was used as Film 12.

(13) Preparation of Film 13:
(Cellulose Acylate Solution for Low-Substitution Layer)

The following ingredients were put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (1) | 4.0 mas. pts. |
| Retardation enhancer (2) | 10.0 mas. pts. |
| Methylene chloride | 351.5 mas. pts. |
| Methanol | 52.5 mas. pts. |

(Cellulose Acylate Solution for High-Substitution Layer)

The following ingredients were put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (2) | 11.0 mas. pts. |
| Silica particles having a mean particle size of 16 nm (Aerosil R972, by Nippon Aerosil) | 0.15 mas. pts. |
| Methylene chloride | 395.0 mas. pts. |
| Methanol | 59.0 mas. pts. |

(Production of Cellulose Acylate Sample)

The two cellulose acylate solutions were cast onto a band to form thereon a core layer having a thickness of 82 µm from the cellulose acylate solution for low-substitution layer and to form a skin layer A and a skin layer B each having a thickness of 2 µm from the cellulose acylate solution for high-substitution layer. The formed film was peeled away from the band, clipped, and stretched in the transverse direction by 18% at a stretching temperature of 180 degrees Celsius while the residual solvent amount was 20% relative to the total mass of the film, using a tenter. Next, the film was unclipped and dried at 130 degrees Celsius for 20 minutes, thereby giving a film. And this was used as Film 13.

(14) Preparation of Film 14:
<Production of Cyclic Polyolefin Polymer P-1>

100 parts by mass of pure toluene and 100 parts by mass of methyl norbornenecarboxylate were put into a reactor. Next, 25 mmol % (relative to monomer) of Ni ethylhexanoate dissolved in toluene, 0.225 mol % (relative to monomer) of tri(pentafluorophenyl)boron, and 0.25 mol % (relative to monomer) of triethylaluminium dissolved in toluene were put into the reactor. These were reacted for 18 hours with stirring at room temperature. After the reaction, the reaction mixture was put into excessive ethanol, and the polymer precipitate was formed therein. The precipitate was purified, and the thus-obtained cyclic olefin polymer (P-1) was dried in vacuum at 65 degrees Celsius for 24 hours.

The obtained polymer was dissolved in tetrahydrofuran, and its molecular weight was measured through gel permeation chromatography. The number-average molecular weight of the polymer, in terms of polystyrene, was 79,000, and the weight-average molecular weight thereof was 205,000. Using an Abbe's refractometer, the refractive index of the obtained polymer was measured, and was 1.52.
(Polyolefin Dope D-1)

| | |
|---|---|
| Cyclic polyolefin polymer P-1 | 150 mas. pts. |
| Additive, polymethyl acrylate (Soken Chemical's "Actflow UMM1001", having a weight-average molecular weight of about 1000) | 7.5 mas. pts. |
| Antioxidant, Ciba Specialty Chemicals' "Irganox 1010" | 0.45 mas. pts. |
| Dichloromethane | 620 mas. pts. |

The above composition was put into a mixing tank and stirred to dissolve the ingredients, and the resulting solution was filtered through a paper filter having a mean pore size of 34 µm and through a sintered metal filter having a mean pore size of 10 µm, thereby preparing a cyclic polyolefin dope D-1. The dope was cast on a band caster. The film having a residual solvent amount of about 30% by mass was peeled away from the band, and using a tenter, this was dried with hot air at 140 degrees Celsius applied thereto. Afterwards, the tenter transfer was changed to roll transfer, and the film was further dried at from 120 degrees Celsius to 140 degrees Celsius, and wound up. This was used as Film 14. The film had a thickness of 80 µm.

(15) Preparation of Film 15:

Cellulose acetate benzoate 15A was produced according to the production method for comparative compound C-3 described in JP-A 2008-95027, for which, however, 4-methoxycinnamic acid chloride used as the intermediate 2 in the method was changed to benzoyl chloride.
<Preparation of Cellulose Acylate Solution>

The following ingredients were put into a mixing tank and stirred under heat to dissolve the ingredients, thereby preparing a solution containing a cellulose acylate solution.

| Cellulose Acylate Solution | |
|---|---|
| Cellulose acetate benzoate 15A | 100.0 mas. pts. |
| Methylene chloride | 403.0 mas. pts. |
| Methanol | 60.2 mas. pts. |

Thus prepared, the cellulose acylate solution was immediately cast on a band caster. The film having a residual solvent amount of about 30% by mass was peeled away, and using a tenter, this was dried with hot air at 160 degrees Celsius applied thereto.

Further, the film was monoaxially stretched by 1.5 times at a temperature of 160 degrees Celsius with its edges kept fixed. This was used as Film 15. The thickness of the film was 55 µm.

(16) Preparation of Film 16:

A film having a thickness of 34 µm was produced according to the same method as that for the film sample 201 described in JP-A 2009-63983. This was used as Film 16.

(17) Preparation of Film 17:

A commercially-available norbornene polymer film, "ZEONOR ZF14-100" (by Optes) was biaxially stretched at a temperature of 153 degrees Celsius in MD by 1.5 times and in TD by 1.5 times with its edges kept fixed, and then its surface was processed for corona discharge treatment. The film was used as Film 17. The thickness of the film was 45 µm.

(18) Preparation of Film 18:

(Cellulose Acylate Solution for Low-Substitution Layer)

The following ingredients were put into a mixing tank and stirred under heat to dissolve the ingredients, thereby preparing a cellulose acylate solution for low-substitution layer.

| | |
|---|---|
| Cellulose acetate having a degree of substitution of 2.43 | 100.0 mas. pts. |
| Retardation enhancer (2) | 18.5 mas. pts. |
| Methylene chloride | 365.5 mas. pts. |
| Methanol | 54.6 mas. pts. |

(Cellulose Acylate Solution for High-Substitution Layer)

The following ingredients were put into a mixing tank and stirred to dissolve the ingredients, thereby preparing a cellulose acylate solution for high-substitution layer.

| | |
|---|---|
| Cellulose acetate having a degree of substitution of 2.79 | 100.0 mas. pts. |
| Retardation enhancer (2) | 11.0 mas. pts. |
| Silica particles having a mean particle size of 16 nm (Aerosil R972, by Nippon Aerosil) | 0.15 mas. pts. |
| Methylene chloride | 395.0 mas. pts. |
| Methanol | 59.0 mas. pts. |

(Production of Cellulose Acylate Sample)

The two cellulose acylate solutions were cast onto a band to form thereon a core layer having a thickness of 38 µm from the cellulose acylate solution for low-substitution layer and to form a skin layer A and a skin layer B each having a thickness of 2 µm from the cellulose acylate solution for high-substitution layer. The formed film was peeled away from the band, and while the residual solvent amount was 20% relative to the total mass of the film, this was dried at a temperature of 200 degrees Celsius for 30 minutes and then at 130 degrees Celsius for 20 minutes, thereby giving a film. And this was used as Film 18.

(19) Preparation of Film 19:

A cellulose acylate film having a thickness of 63µµ was produced in the same manner as that for Film 6, for which, however, the thickness of the core layer was changed from 51 µm to 59 µm and the draw ratio in transverse stretching was changed from 24% to 21%. This was used as Film 19.

(20) Preparation of Film 20:

Film 20 was produced according to the same method as that for the film sample 225 described in JP-A 2008-138015, for which, however, the draw ration in stretching was changed to 20%.

(21) Preparation of Film 21:

Film 21 was produced by stretching the film sample 204 described in JP-A 2007-197508, to a draw ratio of 30%.

(22) Preparation of Film 22:

Film 22 was produced according to the same method as that for the film sample S-5 described in JP-A 2008-266559, for which, however, the draw ration in stretching was changed to 35%.

(23) Preparation of Film 23:

Film 23 was produced according to the same method as that for the film sample SA-3 described in JP-A 2009-298950.

(24) Preparation of Film 24:

Film 24 was produced according to the same method as that for the film sample 230 described in JP-A 2008-138015, for which, however, the draw ration in stretching was changed to 20%.

(25) Preparation of Film 25:

Film 25 was produced according to the same method as that for the film sample 009 described in JP-A 2008-189732.

(26) Preparation of Film 26:

A cellulose acylate film was produced according to the same method as that for Film 9, for which, however, the dope was so cast that the thickness of the core layer could be 110 µm and the stretching temperature was changed to 175 degrees Celsius and the draw ratio in stretching was to 26%. This was used as Film 26.

(27) Preparation of Film 27:

A cellulose acylate film was produced according to the same method as that for Film 9, for which, however, the dope was so cast that the thickness of the core layer could be 170 µm and the stretching temperature was changed to 165 degrees Celsius. This was used as Film 27.

(28) Preparation of Film 28:

Film 28 was produced according to the same method as that for the film sample S-32 described in JP-A 2008-266559.

(29) Preparation of Film 29:

A cellulose acylate film was produced according to the same method as that for Film 9, for which, however, the dope was so cast that the thickness of the core layer could be 165 µm and the stretching temperature was changed to 160 degrees Celsius and the draw ratio in stretching was to 26%. This was used as Film 29.

(30) Preparation of Film 30:

Film 30 was produced in the same manner as that for Film 14, for which, however, the film was stretched in the traveling direction by 6% and in the transverse direction by 12%.

2. Properties of Films:

The properties of Films 1 to 30 are shown in the following Table. Re(550) and Rth(550) of each film were measured as follows: A sample having a size of 30 mm×40 mm of each film was conditioned at 25 degrees Celsius and 60% RH for 2 hours, and analyzed with KOBRA 21ADH (by Oji Scientific Instruments) at a wavelength of 550 nm. For Films 1, 5 to 10, 12, 13, 15, 16 and 18 to 30, an assumed mean refractive index of 1.48 and the film thickness were inputted and the data were computed. For the other films, the assumed refractive index was 1.50 for Film 2, 1.53 for Films 3, 11 and 17, and 1.52 for Films 4 and 14.

| Film | Thickness (µm) | Re (550) (nm) | Rth (550) (nm) |
|---|---|---|---|
| Film 1 | 60 | 1.0 | −1.1 |
| Film 2 | 30 | 0.8 | 1.4 |
| Film 3 | 60 | 1.8 | 3.2 |
| Film 4 | 50 | 1.8 | 3.1 |
| Film 5 | 80 | 0.8 | 43 |
| Film 6 | 55 | 50 | 110 |
| Film 7 | 56 | 55 | 115 |
| Film 8 | 60 | 55 | 120 |
| Film 9 | 118 | 61 | 208 |
| Film 10 | 74 | 61 | 208 |
| Film 11 | 70 | 61 | 208 |
| Film 12 | 82 | 61 | 208 |
| Film 13 | 86 | 60 | 250 |
| Film 14 | 80 | 30 | 250 |

-continued

| Film | Thickness (μm) | Re (550) (nm) | Rth (550) (nm) |
|---|---|---|---|
| Film 15 | 55 | 275 | −69 |
| Film 16 | 34 | 2.1 | 43 |
| Film 17 | 45 | 0.2 | 43 |
| Film 18 | 42 | 0.5 | 43 |
| Film 19 | 63 | 50 | 125 |
| Film 20 | 78 | 50 | 22.5 |
| Film 21 | 40 | 50 | −22.5 |
| Film 22 | 90 | 50 | −125 |
| Film 23 | 70 | 140 | −22.5 |
| Film 24 | 78 | 50 | 25 |
| Film 25 | 65 | 25 | 86 |
| Film 26 | 114 | 70 | 211 |
| Film 27 | 174 | 100 | 348 |
| Film 28 | 84 | 40 | 200 |
| Film 29 | 169 | 105 | 348 |
| Film 30 | 75 | 32 | 287 |

In the same manner, Re and Rth of the films in the following Table were measured at a wavelength of 450 nm, 550 nm and 630 nm.

| | Re(nm) | | | Wavelength-dispersion | Rth(nm) | | | Wavelength-dispersion |
|---|---|---|---|---|---|---|---|---|
| | 450 nm | 550 nm | 630 nm | *1 | 450 nm | 550 nm | 630 nm | *1 |
| Film 5 | −3.3 | 0.8 | 3.2 | Reversed | 32 | 43 | 47 | Reversed |
| Film 18 | −0.2 | 0.5 | 1.0 | Reversed | 37 | 43 | 45 | Reversed |
| Film 17 | 0.2 | 0.2 | 0.2 | Flat | 43 | 43 | 43 | Flat |
| Film 16 | 2.6 | 2.1 | 1.7 | Normal | 54 | 43 | 40 | Normal |
| Film 9 | 58.5 | 61.0 | 62.0 | Reversed | 201.0 | 208.0 | 211.0 | Reversed |
| Film 10 | 52.0 | 61.0 | 65.5 | Reversed | 195.0 | 208.0 | 221.0 | Reversed |
| Film 11 | 61.0 | 61.0 | 61.0 | Flat | 208.0 | 208.0 | 208.0 | Flat |
| Film 12 | 64.5 | 61.0 | 60.0 | Normal | 214.0 | 208.0 | 207.5 | Normal |

*1 "reversed": Re or Rth shows the reversed wavelength-dispersion; "flat": Re or Rth is constant with wavelength variation; "normal": Re or Rth shows the normal wavelength-dispersion 3. Production of Polarizing Plate:

A polyvinyl alcohol (PVA) film having a thickness of 80 μm was dyed by dipping it in an aqueous iodine solution having an iodine concentration of 0.05% by mass at 30 degrees Celsius for 60 seconds, then stretched in the machine direction by 5 times the original length while dipped in an aqueous boric acid solution having a boric acid concentration of 4% by mass for 60 seconds, and thereafter dried at 50 degrees Celsius for 4 minutes to give a polarizing film having a thickness of 20 μm.

Of the films shown in the above Table, the films containing a cellulose acylate were saponified as follows: Each film was dipped in an aqueous sodium hydroxide solution (1.5 mol/liter) at 55 degrees Celsius, and then fully rinsed with water to remove sodium hydroxide. Next, this was dipped in an aqueous diluted sulfuric acid solution (0.005 mol/liter) at 35 degrees Celsius for 1 minute, and then dipped in water to fully remove the aqueous diluted sulfuric acid solution. Finally, the sample was fully dried at 120 degrees Celsius.

Any two sheets of the films (Films 1 to 18) were stuck, using an adhesive, with the polarizing film sandwiched therebetween to thereby produce a polarizing plate having a protective film on both surfaces. For the cellulose acylate films, a polyvinyl alcohol adhesive was used, and for the other films, an acrylic adhesive was used to stick them to the polarizing element. The combination is shown in Table below.

In the following Table, the film marked with "*1" means a retardation film serving as a protective film for polarizing plate, as disposed further outside toward the panel side than the polarizing film; the film marked with "*2" means a retardation film serving as a protective film for polarizing plate, as disposed between the liquid-crystal cell and the polarizing film; and the film marked with "*3" means a retardation film serving as a protective film for polarizing plate, as disposed further outside toward the backlight side than the polarizing film. The same shall apply to all the following Tables.

Films 6 to 15 were so stuck that the in-plane slow axis thereof could be in parallel to the transmission axis of the polarizing element; and Films 1 to 5 and 6 to 18 were so stuck that the in-plane slow axis thereof could be orthogonal to the transmission axis of the polarizing element. The films having an easy-adhesion layer were so stuck that the easy-adhesion layer therein could face the surface side of the polarizing element.

The polarizing plate having two laminated films as the polarizer-protective film was produced by sticking two sheets of any of Films 1 to 30 with an adhesive to prepare a laminate and further sticking the laminate with another one sheet of the film via a polarizing film sandwiched therebetween, all using an adhesive. The adhesive used is as described in the above.

The combination, and the relation between the slow axis of the film and the transmission axis of the polarizing element are shown in the following Table.

4. Production and Evaluation of VA-Mode Liquid-Crystal Display Device:

(1) Preparation of VA-Mode Liquid-Crystal Cells 1 to 6:

In this Example, in case where a color filter is formed on a TFT, an organic developer CD2000 (by FUJIFILM Electronic Materials) was used.

(1)-1 Preparation of VA-Mode Liquid-Crystal Cell 1:

According to Example 20 described in JP-A 2009-141341, a TFT element was formed on a glass substrate, and a protective film was further formed on the TFT element. Subsequently, a contact hole was formed in the protective film, and a transparent electrode of ITO electrically connected to the TFT element was formed on the protective film, thereby producing an array substrate.

As a color photographic material, the composition prepared according to Examples 14, 22 and 25 described in JP-A 2009-203462 was used, and a color filter substrate was prepared according to the process described in Example 9a in [0099] to [0103] in JP-T 2008-516262.

A transparent electrode of ITO was formed through sputtering on the color filter substrate formed in the above, and then according to Example 1 in JP-A 2006-64921, a spacer was formed in the part corresponding to the upper part of the partition wall (black matrix).

The transparent electrode on the array substrate and that on the color filter substrate formed in the above were patterned for PVA-mode, and a vertical alignment film of polyimide was formed thereon.

Subsequently, a UV-curable resin sealant was applied, using a dispenser, to the position corresponding to the black matrix frame provided around the RGB pixel group of the color filter, then a PVA-mode liquid crystal was dropwise applied thereto, and stuck to the array substrate. Thus stuck together, the substrates were exposed to UV rays, and then heat-treated to cure the sealant, thereby producing a liquid-crystal cell.

Subsequently, $\Delta$nd(550) of the formed liquid-crystal cell was measured with AXOMETRICS' AXOSCAN using the associated software. One having $\Delta$nd(550) of 300 nm was selected, and this was used as Liquid-crystal Cell 1.

As the light source of Liquid-crystal Cell 1, used was the backlight in the above-mentioned LC-32 GH5, and the light source was disposed on the side of the array substrate.

(1)-2 Preparation of VA-Mode Liquid-Crystal Cell 2:

Sharp's liquid-crystal panel "LC-32DE5" was prepared. As a result of the present inventor's investigations, the liquid-crystal cell is a VA-mode liquid-crystal cell having the highest front contrast ratio performance of all products. This is a liquid-crystal cell 2.

$\Delta$nd of Liquid-crystal Cell 2 was measured with AXOMETRICS' AXOSCAN using the associated software, and $\Delta$nd(550) thereof was 300 nm.

As the light source of Liquid-crystal Cell 2, used was the backlight in the above-mentioned LC-32 GH5, and the light source was disposed on the side of the substrate with the TFT array formed thereon.

(1)-3 Preparation of VA-Mode Liquid-Crystal Cell 3:

A TFT element was formed on a glass substrate according to Example 20 described in JP-A 2009-141341, and further, a protective film was formed on the TFT element. Subsequently, a contact hole was formed in the protective film, and a transparent electrode of ITO electrically connected to the TFT element was formed on the protective film, thereby producing an array substrate.

As a color photographic material, the composition prepared according to Examples 14, 22 and 27 described in JP-A 2009-203462 was used, and a color filter substrate was prepared according to the process described in Example 9a in [0099] to [0103] in JP-T 2008-516262.

A transparent electrode of ITO was formed through sputtering on the color filter substrate formed in the above, and then according to Example 1 in JP-A 2006-64921, a spacer was formed in the part corresponding to the upper part of the partition wall (black matrix).

The transparent electrode on the array substrate and that on the color filter substrate formed in the above were patterned for PVA-mode, and a vertical alignment film of polyimide was formed thereon.

Subsequently, a UV-curable resin sealant was applied, using a dispenser, to the position corresponding to the black matrix frame provided around the RGB pixel group of the color filter, then a PVA-mode liquid crystal was dropwise applied thereto, and stuck to the array substrate. Thus stuck together, the substrates were exposed to UV rays, and then heat-treated to cure the sealant, thereby producing a liquid-crystal cell.

Subsequently, $\Delta$nd(550) of the formed liquid-crystal cell was measured with AXOMETRICS' AXOSCAN using the associated software. One having $\Delta$nd(550) of 300 nm was selected, and this is a liquid-crystal cell 3.

As the light source of Liquid-crystal Cell 3, used was the backlight in the above-mentioned LC-32 GH5, and the light source was disposed on the side of the array substrate.

(1)-4 Preparation of VA-Mode Liquid-Crystal Cell 4:

A liquid-crystal cell 4 was prepared according to the same method as that for Liquid-crystal Cell 1, except that the TFT element structure of the array substrate was changed.

$\Delta$nd(550) of the formed liquid-crystal cell was measured with AXOMETRICS' AXOSCAN using the associated software. One having $\Delta$nd(550) of 300 nm was selected, and this is a liquid-crystal cell 4.

As the light source of Liquid-crystal Cell 4, used was the backlight in the above-mentioned LC-32 GH5, and the light source was disposed on the side of the array substrate.

(1)-5 Preparation of VA-Mode Liquid-Crystal Cell 5:

According to Example 20 described in JP-A 2009-141341, a TFT element was formed on a glass substrate, and a protective film was further formed on the TFT element.

Subsequently, using the composition prepared according to the description in Examples 14, 22 and 25 in JP-A 2009-203462 as a color photographic composition, and according to the process described in Example 9a in [0099] to in JP-A 2008-516262, a color filter-on-array (CAO) substrate was formed on the protective film. In this, however, the concentration of the pigment in the color photographic resin composition for each pixel was halved, and the coating amount was controlled so that the black pixel could be 4.2 μm and the red, green and blue pixels could be 3.5 μm each. Further, a contact hole was formed in the color filter, and a transparent pixel electrode of ITO (indium tin oxide) electrically connected to the TFT element was formed on the color filter. Next, according to Example 1 in JP-A 2006-64921, a spacer was formed in the part corresponding to the upper part of the partition wall (black matrix) on the ITO film.

Separately, a glass substrate with a transparent electrode of ITO formed thereon was prepared as a counter substrate, and the transparent electrode on the COA substrate and that on the counter electrode were patterned for PVA-mode, and a vertical alignment film of polyimide was formed thereon.

Subsequently, a UV-curable resin sealant was applied, using a dispenser, to the position corresponding to the black matrix frame provided around the RGB pixel group of the color filter, then a PVA-mode liquid crystal was dropwise applied thereto, and stuck to the counter substrate. Thus stuck together, the substrates were exposed to UV rays, and then heat-treated to cure the sealant, thereby producing a liquid-crystal cell.

Subsequently, $\Delta$nd(550) of the formed liquid-crystal cell was measured with AXOMETRICS' AXOSCAN using the associated software. One having $\Delta$nd(550) of 300 nm was selected, and this is a liquid-crystal cell 5.

As the light source of Liquid-crystal Cell 5, used was the backlight in the above-mentioned LC-32 GH5, and the light source was disposed on the side of the array substrate.

(1)-6 Preparation of VA-Mode Liquid-Crystal Cell 6:

According to Example 20 described in JP-A 2009-141341, a TFT element was formed on a glass substrate, and a protective film was further formed on the TFT element. Subsequently, a contact hole was formed in the protective film, and a transparent electrode of ITO electrically connected to the TFT element was formed on the protective film. Next, a transparent pillar-like spacer pattern having a diameter of 16 μm and a mean height of 3.7 μm was formed on the ITO film, thereby producing an array substrate.

Separately, a glass substrate with a transparent electrode of ITO formed thereon was prepared as a counter substrate, and the transparent electrode on the array substrate and that on the counter substrate were patterned for PVA-mode, and a vertical alignment film of polyimide was formed thereon.

A UV-curable resin sealant was applied, using a dispenser, above the pillar-like spacer of the array substrate like the pattern as in Liquid-crystal Cell 5, then a PVA-mode liquid crystal was dropwise applied thereto, and stuck to the counter substrate. Thus stuck together, the substrates were exposed to UV rays, and then heat-treated to cure the sealant, thereby producing a liquid-crystal cell.

Subsequently, $\Delta nd(550)$ of the formed liquid-crystal cell was measured with AXOMETRICS' AXOSCAN using the associated software. One having $\Delta nd(550)$ of 300 nm was selected, and this is a liquid-crystal cell 6.

As the light source of Liquid-crystal Cell 6, prepared was a backlight unit of which the drive system was so controlled that the LEDs of three colors BGR could alternately emit at 180 Hz, and the light source was disposed on the side of the array substrate.

(2) Measurement of Rear-Member Scattering Intensity and Front-Member Scattering Intensity of Each Liquid-Crystal Cell:

For the measurement, the following polarizing plates 1 and 2 were prepared. The polarizing plate 1 was produced by putting a polarizing film between Film 1 and Film 5, like in the above-mentioned method. The polarizing plate 2 was produced by putting a polarizing film between Film 5 and Film 12, like in the above-mentioned method.

As the light source for the measurement, used was the backlight of Sharp's liquid-crystal panel "LC-32 GH5". The backlight of "LC-32 GH5" has a brightness of from 0.55 to 0.65 in three directions at a polar angle of 40 degrees and at an azimuth angle of 0 degree, 45 degrees or 90 degrees, based on the front brightness of 1.

The liquid-crystal cell produced in the above was disassembled to separate the rear-side and front-side substrates to be analyzed. In case where the substrate surface has, as formed thereon, members such as a color filer, a black matrix, an array member (TFT array, etc.), projections on the substrate, a common electrode, a slit and the like, the members were, not removed, used for measurement.

Any of Polarizing Plate 1 or 2 was disposed on the light source, and the front-side substrate or the rear-side substrate of each liquid-crystal cell, prepared as in the above, was fitted to a rotary stage (SGSP-120YAW, by Sigma Koki) was disposed in parallel to each other at a distance of 2 mm from the polarizing plate. Briefly, these were so disposed that the TFT array wiring and the lattice pattern of the black matrix on the substrate could correspond to the polarization axis of the polarizing plate. Further on this, a polarizing plate, HLC2-2518 (by Sanritz) fitted to a rotary stage was disposed so that the distance between the polarizing plates could be 52 mm. Using a tester BM5A (by TOPCON) in a dark room, the brightness in the black and white states of display in the normal direction was measured, and the front contrast ratio A (white brightness/black brightness) was computed. In this, the polarizing plate was rotated, and the lowest brightness was the brightness in the black state. Then, the polarizing plate was rotated by 90 degrees, and the brightness in this state was the brightness in the white state.

Next, under the above-mentioned condition, the front-side substrate or the rear-side substrate was removed, and the brightness in the black or white state of display with the polarizing plate alone was measured, and the front contrast ratio B was computed.

To remove the influence of the front contrast ratio B with the polarizing plate on the front contrast ratio A, the member contrast ratio was computed according to the following formula:

The member Contrast ratio={1/1/the front contrast ratio A}−{1/the front contrast ratio B}.

In this, the front-side and rear-side substrate contrast ratio measured with Polarizing Plate 1 is the member CR(front 1) and the member CR(rear 1), and the front-side and rear-side substrate contrast ratio measured with the polarizing plate 2 is the member CR(front 2) and the member CR(rear 2); and the front member scattering intensity and the rear-member scattering intensity were computed according to the following formulae:

The front-member scattering intensity={1/The member CR(front 2)}−{1/The member CR(front 1)}, The rear-member scattering intensity={1/The member CR(rear 2)}−{1/The member CR(rear 1)}.

The found data are shown in the following Table.

|  | $\Delta nd$ (nm) | Front-member Scattering Intensity (F) | Rear-member Scattering Intensity (R) | R/F | R/F ≥ 1.4 *1 | F ≤ 1/38000 *1 |
| --- | --- | --- | --- | --- | --- | --- |
| Liquid Crystal Cell 1 | 300 | 2.6E−05 | 3.7E−05 | 1.40 | ○ | ○ |
| Liquid Crystal Cell 2 | 300 | 2.7E−05 | 3.4E−05 | 1.26 | X | X |
| Liquid Crystal Cell 3 | 300 | 3.2E−05 | 5.0E−05 | 1.55 | ○ | X |
| Liquid Crystal Cell 4 | 300 | 2.6E−05 | 2.2E−05 | 0.84 | X | ○ |
| Liquid Crystal Cell 5 | 300 | 3.2E−06 | 5.1E−05 | 16.15 | ○ | ○ |
| Liquid Crystal Cell 6 | 300 | 3.2E−06 | 3.4E−05 | 10.68 | ○ | ○ |

*1: "○" means the cell satisfying the relation formula; and "X" means the cell not satisfying the relation.

(3) Production of VA-Mode Liquid-Crystal Display Device:

Any of the liquid-crystal cells formed in the above was combined with any two of the polarizing plates formed in the above, as in the manner shown in the following Table thereby constructing a liquid-crystal display device.

(4) Evaluation of VA-Mode Liquid-Crystal Display Device:

Thus constructed, the liquid-crystal display devices were evaluated as follows:

(4)-1 Measurement of Front Contrast Ratio Ratio:

Using a tester BM5A (by TOPCON) in a dark room, the brightness in the black and white states of display in the normal direction to the panel was measured, and from the data, the front contrast ratio (white brightness/black brightness) was computed.

In this, the distance between the tester and the panel was 700 mm.

Subsequently, on the basis of the front contrast ratio in the standard state, the front contrast ratio was computed according to the following formula:

Front Contrast Ratio=front contrast in practical state/front contrast in standard state.

The standard state is a liquid-crystal display device that comprises one sheet of Film 7 on both the front side and the rear side. In the liquid-crystal cell used in this Example in which Δnd(550) is 300 nm and which is a two-sheet compensation system where one and the same film is disposed on both the front side and the rear side, when Re(550) of the retardation film is 55 nm and Rth(550) thereof is 115 nm or so, then the device enables good optical compensation and the viewing angle contrast ratio is the largest. Accordingly, this is taken as the standard state here.

Regarding the standard state of each liquid-crystal cell, the liquid-crystal display device comprising Liquid-crystal Cell 1 is based on the liquid-crystal display device 13; the liquid-crystal display device comprising t Liquid-crystal Cell 2 is based on the liquid-crystal display device 19; the liquid-crystal display device comprising Liquid-crystal Cell 3 is based on the liquid-crystal display device 23; the liquid-crystal display device comprising Liquid-crystal Cell 4 is based on the liquid-crystal display device 27; the liquid-crystal display device comprising Liquid-crystal Cell 5 is based on the liquid-crystal display device 42; and the liquid-crystal display device comprising Liquid-crystal Cell 6 is based on the liquid-crystal display device 49. The front contrast ratio of the liquid-crystal display device 13 was 4830; that of the liquid-crystal display device 19 was 4790; that of the liquid-crystal display device 23 was 4070; that of the liquid-crystal display device 27 was 6430; that of the liquid-crystal display device 42 was 3660; and that of the liquid-crystal display device 49 was 5420.

(4)-2 Viewing Angle Contrast Ratio (Contrast Ratio in Oblique Direction):

Using a tester BMSA (by TOPCON) in a dark room, the brightness in the black and white states of display was measured in three directions from the front of the device at a polar angle of 60 degrees and at an azimuth angle of 0 degree, 45 degrees or 90 degrees. From the data, the viewing angle contrast ratio (white brightness/black brightness) was computed, and the viewing angle characteristics of the liquid-crystal display devices were evaluated as follows:

A: The viewing angle contrast ratio is equal to or more than 60 in every direction, and no light leakage is recognized.

B: The minimum value of the viewing angle contrast ratio is equal to or more than 30 and less than 60, and slight light leakage is recognized but on an acceptable level.

C: The minimum value of the viewing angle contrast ratio is less than 30, and significant light leakage is recognized on an unacceptable level.

The column of the evaluation result of the viewing angle contrast ratio in the following Table shows the mean value of the data of each sample as evaluated in the above-mentioned three directions based on the above-mentioned standards. The parenthesized numerical value with the mark "*6" is the contrast ratio value measured in the direction defined with a polar angle of 60 degrees and an azimuth angle of 45 degrees; and the parenthesized numerical value with the mark "*13" is the mean value of the contrast ratio data measured in three directions (polar angle of 30 degrees, 45 degrees and 60 degrees) at an azimuth angle of 45 degrees.

(4)-3 Circular Unevenness:

The produced liquid-crystal display devices were left in an environment at a temperature of 40 degrees Celsius and a relative humidity of 90% for 3 days. After thus aged, the devices were transferred into an environment at a temperature of 36 degrees Celsius and a relative humidity of 30%.

Afterwards, the panel was put on a light table, observed in a dark room, and evaluated for the circular unevenness according to the criteria mentioned below.

AA: Within 60 hours after the panel was put on the lighted light table, no light leakage was seen.

A: Some light leakage was seen, but disappeared within 30 hours after the panel was put on the lighted light table, and thereafter no light leakage was seen.

B: Light leakage was seen, and did not disappear within 30 hours after the panel was put on the lighted light table, but thereafter disappeared within 60 hours.

C: Light leakage was seen, and did not disappear within 60 hours after the panel was put on the lighted light table (unacceptable).

(4)-4 Front Blackness:

Using a tester BMSA (by TOPCON) in a dark room, the panels were checked for the color shift in the black state in panel normal direction, and color shift in blue was seen. The panels were evaluated for the front blackness based on the value v' indicating blue. In this, the distance between the tester and the panel was 700 mm.

A: v' is equal to or more than 0.38, and no color shift in blue in the front is recognized.

B: v' is from 0.375 to less than 0.38, and slight color shift in blue in the front is recognized but on an acceptable level.

C: v' is less than 0.375, and color shift in blue is recognized on an unacceptable level.

The results are shown in the following Table.

| LCD | Front-side Film*1 | Front-sideFilm*2 (Rth) | Liquid Crystal Cell | Rear-sideFilm*2 (Rth) | Rear-side Film*3 | R > F (R/F)*4 | 1/F ≤ 1/38000*5 | Front CR | Viewing Angle CR (CR value)*6 | Front Blackness (v' value) | Circular Unevenness |
|---|---|---|---|---|---|---|---|---|---|---|---|
| 1 | 5 | 13 (250 nm) | 1 | 1 (−1.1 nm) | 5 | ○ (1.40) | ○ | 98% | A | — | A |
| 2 | 5 | 13 (250 nm) | 1 | 2 (1.4 nm) | 5 | | | 98% | A | — | A |
| 3 | 5 | 13 (250 nm) | 1 | 3 (3.2 nm) | 5 | | | 98% | A | — | A |
| 4 | 5 | 13 (250 nm) | 1 | 4 (3.1 nm) | 5 | | | 98% | A | — | A |
| 5 | 5 | 9 (208 nm, R*7) | 1 | 5 (43 nm, R*7) | 5 | | | 99% | A (78) | A (0.382) | B |
| 6 | 5 | 12 (208 n, N*7) | 1 | 5 (43 nm) | 5 | | | 99% | A (77) | — | — |
| 7 | 5 | 10 (208 nm, R*7) | 1 | 5 (43 nm) | 5 | | | 99% | A (79) | — | — |
| 8 | 5 | 11 (208 n, F*7) | 1 | 5 (43 nm) | 5 | | | 99% | A (76) | — | — |

-continued

| # | | | | | | | | | | | |
|---|---|---|---|---|---|---|---|---|---|---|---|
| 9 | 5 | 9 (208 nm) | 1 | 18 (43 nm, R*7) | 5 | | | 99% | A | A (0.382) | — |
| 10 | 5 | 9 (208 nm) | 1 | 16 (43 nm, N*7) | 5 | | | 99% | A | B (0.376) | — |
| 11 | 5 | 9 (208 nm) | 1 | 17 (43 nm, F*7) | 5 | | | 99% | A | A (0.380) | A |
| 12 | 5 | 8 (120 nm) | 1 | 6 (110 nm) | 5 | | | 101% | A | — | C |
| 13 | 5 | 7 (115 nm) | 1 | 7 (115 nm) | 5 | | | 100% | A | — | — |
| 14 | 5 | 6 (110 nm) | 1 | 8 (120 nm) | 5 | | | 100% | A | — | C |
| 15 | 5 | 5 (43 nm 逆 *7) | 1 | 9 (208 nm) | 5 | | | 97% | A (75) | — | C |
| 16 | 5 | 1 (−1.1 nm) | 1 | 13 (250 nm) | 5 | | | 95% | A | — | — |
| 17 | 5 | 9 (208 nm) | 2 | 5 (43 nm) | 5 | ○ (1.26) | X | 97% | A | — | — |
| 18 | 5 | 8 (120 nm) | 2 | 6 (110 nm) | 5 | | | 100% | A | — | — |
| 19 | 5 | 7 (115 nm) | 2 | 7 (115 nm) | 5 | | | 100% | A | — | — |
| 20 | 5 | 6 (110 nm) | 2 | 8 (120 nm) | 5 | | | 100% | A | — | — |
| 21 | 5 | 5 (43 nm) | 2 | 9 (208 nm) | 5 | | | 98% | A | — | — |
| 22 | 5 | 8 (120 nm) | 3 | 6 (110 nm) | 5 | ○ (1.55) | X | 100% | A | — | — |
| 23 | 5 | 7 (115 nm) | 3 | 7 (115 nm) | 5 | | | 100% | A | — | — |
| 24 | 5 | 6 (110 nm) | 3 | 8 (120 nm) | 5 | | | 100% | A | — | — |
| 25 | 5 | 9 (208 nm, R*7) | 4 | 5 (43 nm) | 5 | X (0.84) | ○ | 95% | A (66) | C | C |
| 26 | 5 | 8 (120 nm) | 4 | 6 (110 nm) | 5 | | | 99% | A | — | — |
| 27 | 5 | 7 (115 nm) | 4 | 7 (115 nm) | 5 | | | 100% | A | — | — |
| 28 | 5 | 6 (110 nm) | 4 | 8 (120 nm) | 5 | | | 100% | A | — | — |
| 29 | 5 | 5 (43 nm, R*7) | 4 | 9 (208 nm) | 5 | | | 102% | A (68) | — | — |
| 30 | 5 | 13 (250 nm) | 5 | 1 (−1.1 nm) | 5 | ○ (16.2) | ○ | 123% | A | — | AA |
| 31 | 5 | 13 (250 nm) | 5 | 2 (1.4 nm) | 5 | | | 123% | A | — | AA |
| 32 | 5 | 13 (250 nm) | 5 | 3 (3.2 nm) | 5 | | | 123% | A | — | AA |
| 33 | 5 | 13 (250 nm) | 5 | 4 (3.1 nm) | 5 | | | 123% | A | — | AA |
| 34 | 5 | 9 (208 nm, R*7) | 5 | 5 (43 nm, R*7) | 5 | | | 118% | A (71) | A (0.383) | A |
| 35 | 5 | 12 (208 nm, N*7) | 5 | 5 (43 nm) | 5 | | | 118% | A (69) | — | — |
| 36 | 5 | 10 (208 nm, R*7) | 5 | 5 (43 nm) | 5 | | | 118% | A (72) | — | — |
| 37 | 5 | 11 (208 nm, F*7) | 5 | 5 (43 nm) | 5 | | | 118% | A (70) | — | — |
| 38 | 5 | 9 (208 nm) | 5 | 18 (43 nm, R*7) | 5 | | | 118% | A | A (0.384) | — |
| 39 | 5 | 9 (208 nm) | 5 | 16 (43 nm, N*7) | 5 | | | 118% | A | B (0.376) | — |
| 40 | 5 | 9 (208 nm) | 5 | 17 (43 nm, F*7) | 5 | | | 118% | A | A (0.380) | A |
| 41 | 5 | 8 (120 nm) | 5 | 6 (110 nm) | 5 | | | 102% | A | — | C |
| 42 | 5 | 7 (115 nm) | 5 | 7 (115 nm) | 5 | | | 100% | A | — | — |
| 43 | 5 | 6 (110 nm) | 5 | 8 (120 nm) | 5 | | | 99% | A | — | C |
| 44 | 5 | 5 (43 nm, R*7) | 5 | 9 (208 nm) | 5 | | | 88% | A (66) | — | C |
| 45 | 5 | 1 (−1.1 nm) | 5 | 13 (250 nm) | 5 | | | 84% | A | — | — |
| 46 | 5 | 14 (250 nm) | 5 | 15 (−69 nm) | 5 | | | 124% | A | — | — |

-continued

| | | | | | | | | | | | |
|---|---|---|---|---|---|---|---|---|---|---|---|
| 47 | 5 | 13 (250 nm) | 6 | 1 (−1.1 nm) | 5 | ○ (10.7) | ○ | 123% | A | — | — |
| 48 | 5 | 9 (208 nm) | 6 | 5 (43 nm) | 5 | | | 118% | A | — | — |
| 49 | 5 | 7 (115 nm) | 6 | 7 (115 nm) | 5 | | | 100% | A | — | — |
| 50 | 5 | 5 (43 nm) | 6 | 9 (208 nm) | 5 | | | 87% | A | — | — |
| 51 | 5 | 1 (−1.1 nm) | 6 | 13 (250 nm) | 5 | | | 83% | A | — | — |
| 52 | 5 | 5 (43 nm) | 1 | 1 (−1.1 nm) | 5 | ○ (1.40) | ○ | 98% | C | — | A |
| 53 | 5 | 5 (43 nm) | 5 | 1 (−1.1 nm) | 5 | ○ (16.2) | ○ | 123% | C | — | AA |

*4"○" means the cell satisfying the relation of the rear-member scattering intensity > the front-member scattering intensity; and "X" means the cell satisfying the relation of the rear-member scattering intensity < the front-member scattering intensity.
*5"1/F" means the value of "1/the front-member scattering intensity"; "○" means the cell satisfying formula (0); and "X" means the cell not satisfying formula (o).
*6The parenthesized numerical value with the mark "*6" is the contrast ratio value measured in the direction defined with a polar angle of 60 degrees and an azimuth angle of 45 degrees.
*7for indicating the wavelength dispersion characteristics of Re and Rth, and "R" means the reversed wavelength dispersion characteristics, "F" means that Re or Rth is constant with wavelength variation, and "N" means the normal wavelength dispersion characteristics.

| LCD | Front-side Film*1 | Front-side retardation region*8 Film B*2 (Re/Rth)*9 | Front-side retardation region*8 Film A*2 (Re/Rth)*9 | Liquid Crystal Cell | Rear-side Film*2 (Rth) | Rear-side Film*3 | R > F (R/F)*4 | 1/F ≤ 1/38000*5 | Film B (5)*10 | Film B (6)*11 | Film A (4)*12 | Front CR | Viewing Angle CR (Averaged CR in Three Directions)*13 |
|---|---|---|---|---|---|---|---|---|---|---|---|---|---|
| 54 | 5 | 19 (50/25) | 25 (25/86) | 5 | 5 (43 nm) | 5 | ○ (16.2) | ○ | ○ | ○ (3) | ○ | 118% | A (66) |
| 55 | 5 | 20 (−50/22.5) | 26 (70/211) | 5 | 5 (43 nm) | 5 | | | ○ | ○ (0.05) | ○ | 118% | A (72) |
| 56 | 5 | 21 (50/−22.5) | 26 (70/211) | 5 | 5 (43 nm) | 5 | | | ○ | ○ (0.05) | ○ | 118% | A (68) |
| 57 | 5 | 22 (−50/−125) | 27 (100/348) | 5 | 5 (43 nm) | 5 | | | ○ | ○ (3) | ○ | 118% | A (67) |
| 58 | 5 | 23 (−140/−22.5) | 30 (32/287) | 5 | 5 (43 nm) | 5 | | | ○ | ○ (0.66) | ○ | 118% | A (97) |
| 59 | 5 | 15 (−275/−69) | 28 (−40/200) | 5 | 5 (43 nm) | 5 | | | ○ | ○ (0.75) | ○ | 118% | A (93) |
| 60 | 5 | 2 (0.8/1.4) | 9 (61/208) | 5 | 5 (43 nm) | 5 | | | ○ | ○ (2.25) | ○ | 118% | A (65) |
| 61 | 5 | 24 (−50/25) | 26 (70/211) | 5 | 5 (43 nm) | 5 | | | ○ | X (0) | ○ | 118% | A (63) |
| 62 | 5 | 22 (−50/−125) | 29 (105/348) | 5 | 5 (43 nm) | 5 | | | ○ | ○ (3) | X | 118% | A (64) |

*4"○" means the cell satisfying the relation of the rear-member scattering intensity > the front-member scattering intensity; and "X" means the cell satisfying the relation of the rear-member scattering intensity < the front-member scattering intensity.
*5"1/F" means the value of "1/the front-member scattering intensity"; "○" means the cell satisfying formula (0); and "X" means the cell not satisfying formula (o).
*8Films A and B constituted the retardation region; and Film A was disposed closer to the liquid crystal cell than Film B in the retardation region.
*9Positive or negative sign added to Re of the film constituting the retardation region is for indicating the relation between the slow axis of the film and the transmissive axis of the polarizing film, and the positive sign was added to Re when the slow axis was along with the transmissive axis of the polarizing film.
*10"○" means that the film satisfied formula (5), |Re$_{film B}$(550)| ≥ 50 nm; and "X" means that the film didn't satisfy formula (5).
*11"○" means that the film satisfied formula (6), 0.05 ≤ Nz ≤ 3; and "X" means that the film didn't satisfy formula (6).
*12"○" means that the film satisfied formula (4), |Re$_{film A}$(550)| ≤ 100 nm; and "X" means that the film didn't satisfy formula (4).
*13The parenthesized numerical value is the averaged contrast ratio value measured in the three directions defined with an azimuth angle of 45 degrees and polar angles of 30, 45 and 60 degrees.

From the above results, it is known that, in the samples comprising any of Liquid-crystal Cells 1, 5 and 6 satisfying the formula (0) and satisfying rear part scattering intensity>front part scattering intensity (liquid-crystal display devices Nos. 1 to 16 and Nos. 30 to 51 and 54 to 62), when Rth$_{rear}$(550) of the retardation film disposed on the rear side and Rth$_{front}$(550) of the retardation film disposed on the front side are in a relation of Rth$_{rear}$(550)<Rth$_{front}$(550), then the front CR is high; but on the other hand, when Rth$_{rear}$(550) >Rth$_{front}$(550), then the front CR lowers. This tendency applies to the viewing angle CR.

In addition, it is also known that in the samples comprising any of Liquid-crystal Cells 1, 5 and 6 satisfying the formula (0) and satisfying rear part scattering intensity>front part scattering intensity, the front blackness was improved as compared with that in the sample comprising Liquid-crystal Cell 4 satisfying the formula (0) but front part scattering intensity>rear part scattering intensity, and that, when Rth$_{rear}$(550) of the retardation film disposed on the rear side has reversed wavelength dispersion characteristics, v' increases and therefore the front color shift in blue can be relieved.

Of the liquid-crystal display devices where the front-side retardation region comprises two films, the liquid-crystal display devices Nos. 54 to 59 in which the front-side retardation region comprises two films A and B satisfying the formulae (4) to (6) are more excellent in the viewing angle CR than the liquid-crystal display devices Nos. 60 to 62 where the front-side retardation region comprises two films but does not satisfy any of the formulae (4) to (6).

The following is for further clarifying the effect of the invention. Concretely, in the liquid-crystal display devices comprising a liquid-crystal cell 1, 5 or 6, the rear-side retardation region and the front-side retardation region were replaced with each other, and the corresponding examples (A where $Rth_{rear}(550)<Rth_{front}(550)$; and B where $Rth_{rear}(550)>Rth_{front}(550)$ are shown in the following Table.

| Example No. | Liquid Crystal Cell | R > F (R/F) *4 | 1/F ≤ 1/38000 *5 | LCD No. Employing Same Film | | Comparison of Front CR | Comparison of Viewing angle CR |
|---|---|---|---|---|---|---|---|
| | | | | $Rth_{rear}(550) < Rth_{front}(550)$ A | $Rth_{rear}(550) > Rth_{front}(550)$ B | | |
| 1 | 1 | ○ | ○ | 1 | 16 | A > B | — |
| 2 | | (1.40) | | 5 | 15 | A > B | A > B |
| 3 | | | | 12 | 14 | A > B | — |
| 4 | 5 | ○ | ○ | 30 | 45 | A > B | — |
| 5 | | (16.2) | | 34 | 44 | A > B | A > B |
| 6 | | | | 41 | 43 | A > B | — |
| 7 | 6 | ○ | ○ | 47 | 51 | A > B | — |
| 8 | | (10.7) | | 48 | 50 | A > B | — |

*4: "○" means the cell satisfying the relation of the rear-member scattering intensity > the front-member scattering intensity; and "X" means the cell satisfying the relation of the rear-member scattering intensity < the front-member scattering intensity.
*5: "1/F" means the value of "1/the front-member scattering intensity"; "○" means the cell satisfying formula (0); and "X" means the cell not satisfying formula (o).

The liquid-crystal display devices Nos. 52 and 53 comprising Liquid-crystal Cell 1 or 5, respectively, satisfying the formula (0), satisfying rear part scattering intensity>front part scattering intensity and satisfying $Rth_{rear}(550)<Rth_{front}(550)$ have a high front CR, in which, however, the total of $Rth_{rear}(550)$ and $Rth_{front}(550)$ could not reach a value enough to compensate Δnd of the liquid-crystal layer in the black state; and therefore, these display devices were inferior to other liquid-crystal display devices in point of the viewing angle CR thereof.

On the other hand, it is known that, in the samples comprising Liquid-crystal Cell 4 satisfying the formula (0) but front part scattering intensity>rear part scattering intensity, when $Rth_{rear}(550)$ of the retardation film disposed on the rear side and $Rth_{front}(550)$ of the retardation film disposed on the front side are in a relation of $Rth_{rear}(550)>Rth_{front}(550)$, then the front CR increases, while on the other hand, when $Rth_{rear}(550)<Rth_{front}(550)$, then the front CR lowers. This tendency also applies to the viewing angle CR.

This is further clarified by the following. Concretely, in the liquid-crystal display device comprising a liquid-crystal cell 4, the rear-side retardation region and the front-side retardation region were replaced with each other, and the corresponding examples (A where $Rth_{rear}<Rth_{front}$; and B where $Rth_{rear}>Rth_{front}$ are shown in the following Table.

It is known that, in Liquid-crystal Cells 2 and 3 satisfying rear part scattering intensity>front part scattering intensity but not satisfying the formula (0), the magnitude relation between $Rth_{rear}(550)$ of the retardation film disposed on the rear side and $Rth_{front}(550)$ of the retardation film disposed on the front side has little influence on the front CR. In other words, it is understood that, in the liquid-crystal display device with the ordinary liquid-crystal cell, the front CR is low, and the influence of the magnitude relation between $Rth_{rear}(550)$ of the retardation film disposed on the rear side and $Rth_{front}(550)$ of the retardation film disposed on the front side, side, on the front CR is on an ignorable level; however, in the liquid-crystal display device with the liquid-crystal cell satisfying the formula (0), the front CR is originally high, and the magnitude relation between $Rth_{rear}$ of the retardation film disposed on the rear side and $Rth_{front}$ of the retardation film disposed on the front side has a significant influence on the front CR.

(4)-5 Evaluation of Front Contrast Ratio in Change of Light Source:

Subsequently, the front contrast ratio in change of a light source was evaluated. As the light source, herein used were the backlights attached to the following three types of liquid-crystal panels:

(i) Sharp's liquid-crystal panel "LC-32 GH5",
(ii) Sharp's liquid-crystal panel "LC-37GX3W",
(iii) Sharp's liquid-crystal panel "LC-32DE5".

The light source (i) does not have a prism sheet but has two diffusive sheets. The light source (iii) has two prism sheets. The light source (ii) has one lens array sheet stuck to a diffuser, in which the flat surface on the opposite side of the lens array sheet has a light-reflective layer to reflect light in the non-light-collecting region of the lens as formed thereon.

In the evaluation test, the two liquid-crystal display devices of Example 2 and Example 5 as shown below were tried, and the front contrast ratio improvement ratio was determined according to the following formula:

| Example No. | Liquid Crystal Cell | R > F (R/F) *4 | 1/F ≤ 1/38000 *5 | LCD No. Employing Same Film | | Comparison of Front CR | Viewing angle CR |
|---|---|---|---|---|---|---|---|
| | | | | $Rth_{rear}(550) < Rth_{front}(550)$ A | $Rth_{rear}(550) > Rth_{front}(550)$ B | | |
| 9 | 4 | X | ○ | 25 | 29 | A < B | A < B |
| 10 | | (0.84) | | 26 | 28 | A < B | — |

*4: "○" means the cell satisfying the relation of the rear-member scattering intensity > the front-member scattering intensity; and "X" means the cell satisfying the relation of the rear-member scattering intensity < the front-member cattering intensity.
*5: "1/F" means the value of "1/the front-member scattering intensity"; "○" means the cell satisfying formula (0); and "X" means the cell not satisfying formula (o).

Front Contrast ratio Improvement Ratio (%) in Example 2=(the front contrast ratio of liquid-crystal display device 5)−(the front contrast ratio of liquid-crystal display device 15).

Front Contrast ratio Improvement Ratio (%) in Example 5=(the front contrast ratio of liquid-crystal display device 34)−(the front contrast ratio of liquid-crystal display device 44).

| | Light Source | Directionality | Directionality of Light Source (Ratio when assuming front brightness is 1) Polar angle of 45 degrees | | | Improvement Ratio (%) of Front Contrast ratio |
| --- | --- | --- | --- | --- | --- | --- |
| | | | Azimuth Angle 0 degree | Azimuth Angle 45 degrees | Azimuth Angle 90 degrees | |
| Two LCDs in Example 2 | (i) | Weak | 0.53 | 0.54 | 0.54 | 2% |
| | (ii) | ↓ | 0.63 | 0.38 | 0.32 | 3% |
| | (iii) | Strong | 0.28 | 0.32 | 0.32 | 5% |
| Two LCDs in Example 5 | (i) | Weak | 0.53 | 0.54 | 0.54 | 30% |
| | (ii) | ↓ | 0.63 | 0.38 | 0.32 | 35% |
| | (iii) | Strong | 0.28 | 0.32 | 0.32 | 38% |

From the above results, it is known that use of the light source with higher directionality intensifies the effect of the invention more remarkably.

The invention claimed is:

1. A liquid-crystal display device comprising:
a front-side polarizing element,
a rear-side polarizing element,
a liquid-crystal cell disposed between the front-side polarizing element and the rear-side polarizing element,
a front-side retardation region composed of one or more retardation layers disposed between the liquid-crystal cell and the front-side polarizing element, and
a rear-side retardation region composed of one or more retardation layers disposed between the liquid-crystal cell and the rear-side polarizing element,
wherein:
the liquid-crystal cell comprises a liquid-crystal layer, and a pair of a front-side substrate and a rear-side substrate sandwiching the liquid-crystal layer therebetween;
the total of retardation along the thickness-direction of the rear-side retardation region at a wavelength λ nm in a visible light region, $Rth_{rear}(\lambda)$, and retardation along the thickness-direction of the front-side retardation region at the wavelength λ, $Rth_{front}(\lambda)$ is within a range capable of compensating $\Delta nd(\lambda)$ in a black state of the liquid-crystal layer (wherein d means the thickness (nm) of the liquid-crystal layer, $\Delta n(\lambda)$ means the refractivity anisotropy at a wavelength λ nm of the liquid-crystal layer, and $\Delta nd(\lambda)$ means the product of $\Delta n(\lambda)$ and d);
the total scattering intensity of the front-side substrate and all the members formed on the front-side substrate (hereinafter this is referred to as "the front-member scattering intensity") satisfies the following formula (0); and
the front-member scattering intensity, and the total scattering intensity of the rear-side substrate and all the members formed on the rear-side substrate (hereinafter this is referred to as "the rear-member scattering intensity"), and $Rth_{front}(\lambda)$ and $Rth_{rear}(\lambda)$ satisfy following relationship (1) or (2):

The front-member scattering intensity ≤ 1/38000,　(0)

The rear-member scattering intensity > The front-member scattering intensity, and $Rth_{front}(\lambda) > Rth_{rear}(\lambda)$,　(1)

The rear-member scattering intensity < The front-member scattering intensity, and $Rth_{front}(\lambda) < Rth_{rear}(\lambda)$;　(2)

in the formulae (0) to (2), the front-member scattering intensity and the rear-member scattering intensity are defined as follows, respectively:

The front-member scattering intensity = {1/the member CR(front 2)} − {1/the member CR(front 1)}, The rear-member scattering intensity = {1/the member CR(rear 2)} − {1/the member CR(rear 1)}, wherein "the member CR(front 2)" is the value to express the contrast property of the front substrate with all components formed thereon, which is measured with the use of the structure that the front substrate is sandwiched by two polarizing plates called polarizing plate 2, and "the member CR(front 1)" is the value to express the contrast property of the front substrate with all components formed thereon, which is measured with the use of the structure that the front substrate is sandwiched by two polarizing plates called polarizing plate 1, and "the member CR(rear 2)" is the value to express the contrast property of the rear substrate with all components formed thereon, which is measured with the use of the structure that the rear substrate is sandwiched by two polarizing plates called polarizing plate 2, and "the member CR(rear 1)" is the value to express the contrast property of the rear substrate with all components formed thereon, which is measured with the use of the structure that the rear substrate is sandwiched by two polarizing plates called polarizing plate 1, and
wherein the polarizing plate 2 is comprised of a polarizing element and a high-retardation film having Rth(550) of 210 nm and Re(550) of 60 nm whose in-plane slow axis is in parallel to the transmission axis of the polarizing element, and the polarizing plate 1 is comprised of a polarizing element and a low-retardation film having Rth(550) of 0 nm and Re(550) of 0 nm.

2. The liquid-crystal display device of claim 1, satisfying formula (1).

3. The liquid-crystal display device of claim 2, further satisfying following relational formula (3):

{The rear-member scattering intensity}/{The front-member scattering intensity} ≥ 1.4.　(3)

4. The liquid-crystal display device of claim 2, wherein the rear-side substrate has a color filter layer thereon.

5. The liquid-crystal display device of claim 2, wherein the rear-side substrate is an array substrate having a black matrix to partition pixels provided with a color filter layer; and the front-side substrate is a counter substrate disposed to face the array substrate.

6. The liquid-crystal display device of claim 2, wherein retardation along the thickness-direction at a wavelength of 550 nm of the rear-side retardation region, Rth(550) satisfies:

0 nm ≤ |Rth(550)| ≤ 300 nm.

7. The liquid-crystal display device of claim 2, wherein retardation in plane at a wavelength of 550 nm of the rear-side retardation region, Re(550) satisfies:

$$0 \text{ nm} \leq Re(550) \leq 100 \text{ nm}.$$

8. The liquid-crystal display device of claim 2, wherein retardation along the thickness-direction at a wavelength of 550 nm of the front-side retardation region, Rth(550) satisfies:

$$0 \text{ nm} \leq |Rth(550)| \leq 300 \text{ nm}.$$

9. The liquid-crystal display device of claim 2, wherein retardation in-plane at a wavelength of 550 nm of the front-side retardation region, Re(550) satisfies:

$$0 \text{ nm} \leq Re(550) \leq 100 \text{ nm}.$$

10. The liquid-crystal display device of claim 2, wherein the front-side retardation region is composed of two films, the two films are film A and film B from the side of the liquid-crystal cell, the film A satisfies following formula (4), the film B satisfies following formulae (5) and (6), and the transmission axis of the front-side polarizing element and the slow axis of the film B are orthogonal or parallel to each other:

$$|Re_{film\ A}(550)| \leq 100 \text{ nm}, \quad (4)$$

$$|Re_{film\ B}(550)| \geq 50 \text{ nm}, \quad (5)$$

$$0.05 \leq Nz \leq 3, \quad (6)$$

in formula (4), $Re_{film\ A}(550)$ means retardation in-plane of the film A at a wavelength of 550 nm; in formula (5), $Re_{film\ B}(550)$ means retardation in-plane of the film B at a wavelength of 550 nm; in formula (6), $Re_{film\ B}(550)$ means retardation in-plane of the film B at a wavelength of 550 nm, $Rth_{film\ B}(550)$ means retardation along the thickness-direction of the film B at a wavelength of 550 nm, and $Nz = Rth_{film\ B}(550)/Re_{film\ B}(550) + 0.5$.

11. The liquid-crystal display device of claim 2, wherein Rth of the rear-side retardation region and/or the front-side retardation region has the reversed wavelength characteristics in a visible light region or is constant without any dependency on the wavelength in a visible light region.

12. The liquid-crystal display device of claim 4, wherein the color filter has Rth, and Rth of the color filter has the reversed wavelength characteristics in a visible light region or is constant without any dependency on the wavelength in a visible light region.

13. The liquid-crystal display device of claim 1, wherein the rear-side retardation region and/or the front-side retardation region is formed of a cellulose acylate film or comprises a cellulose acylate film.

14. The liquid-crystal display device of claim 1, wherein the rear-side retardation region and/or the front-side retardation region is formed of an acryl-base polymer film or comprises an acryl-base polymer film.

15. The liquid-crystal display device of claim 13, wherein the rear-side retardation region and/or the front-side retardation region is formed of an acryl-base polymer film comprising an acryl-base polymer having at least one unit selected from lactone ring units, maleic anhydride units and glutaric anhydride units, or comprises the acryl-base polymer film.

16. The liquid-crystal display device of claim 1, wherein the rear-side retardation region and/or the front-side retardation region is formed of a cyclic olefin-base polymer film or comprises a cyclic olefin-base polymer film.

17. The liquid-crystal display device of claim 1, wherein the rear-side retardation region and/or the front-side retardation region is formed of one biaxial polymer film or comprises one biaxial polymer film.

18. The liquid-crystal display device of claim 1, wherein the rear-side retardation region and/or the front-side retardation region comprises one uniaxial polymer film.

19. The liquid-crystal display device of claim 4, wherein retardation along the thickness-direction of the color filter, $Rth_{CF}(550)$, and retardation along the thickness-direction of the rear-side retardation region, $Rth_{rear}(550)$ satisfy the following formula:

$$|Rth_{CF}(550) + Rth_{rear}(550)| \leq 90 \text{ nm}.$$

20. The liquid-crystal display device of claim 1, which is a VA-mode liquid-crystal display device.

21. The liquid-crystal display device of claim 1, which comprises a backlight unit sequentially emitting independent three primary colors and which is driven according to a field sequential driving system.

22. A process for producing a liquid-crystal display device comprising a front-side polarizing element, a rear-side polarizing element, a liquid-crystal cell disposed between the front-side polarizing element and the rear-side polarizing element, a front-side retardation region composed of one or more retardation layers disposed between the liquid-crystal cell and the front-side polarizing element, and a rear-side retardation region composed of one or more retardation layers disposed between the liquid-crystal cell and the rear-side polarizing element; the method comprising:

a first step of preparing a liquid-crystal cell which comprises a liquid-crystal layer and a pair of a front-side substrate and a rear-side substrate sandwiching the liquid-crystal layer therebetween, and in which the scattering intensity of the front-side substrate and all the members formed on the substrate (hereinafter this is referred to as "the front-member scattering intensity") satisfies the following formula (0):

$$\text{The front-member scattering intensity} \leq 1/38000; \quad (0)$$

a second step of comparing the front-member scattering intensity of the liquid-crystal cell prepared in the first step with the scattering intensity of the rear-side substrate and all the parts formed on the rear-side substrate (hereinafter this is referred to as "the rear-member scattering intensity");

a third step of determining retardation $Rth_0(\lambda)$ along the thickness-direction at a wavelength $\lambda$, necessary for compensation of $\Delta nd(\lambda)$ in the black state of the liquid-crystal cell prepared in the first step (wherein d means the thickness of the liquid-crystal layer (nm), $\Delta n(\lambda)$ means the refractivity anisotropy at a visible light wavelength $\lambda$ nm of the liquid-crystal layer, and $\Delta nd(\lambda)$ means the product of $\Delta n(\lambda)$ and d); and a forth step of, on the basis of the magnitude relation between the rear-member scattering intensity and the front-member scattering intensity obtained in the second step, distributing the value of $Rth_0(\lambda)$, necessary for viewing angle compensation in the black state of the liquid-crystal cell, into retardation along the thickness-direction at a wavelength $\lambda$ of the front-side retardation region and into the rear-side retardation region, $Rth_{front}(\lambda)$ and $Rth_{rear}(\lambda)$, respectively;

wherein the front-member scattering intensity and the rear-member scattering intensity each are defined as follows, respectively:

The front-member scattering intensity=$\{1/\text{The member CR(front 2)}\}-\{1/\text{The member CR(front 1)}\}$, The rear-member scattering intensity=$\{1/\text{The member CR(rear 2)}\}-\{1/\text{The member CR(rear 1)}\}$, wherein "the member CR(front 2)" is the value to express the contrast property of the front substrate with all components formed thereon, which is measured with the use of the structure that the front substrate is sandwiched by two polarizing plates called polarizing plate 2, and "the member CR(front 1)" is the value to express the contrast property of the front substrate with all components formed thereon, which is measured with the use of the structure that the front substrate is sandwiched by two polarizing plates called polarizing plate 1, and "the member CR(rear 2)" is the value to express the contrast property of the rear substrate with all components formed thereon, which is measured with the use of the structure that the rear substrate is sandwiched by two polarizing plates called polarizing plate 2, and "the member CR(rear 1)" is the value to express the contrast property of the rear substrate with all components formed thereon, which is measured with the use of the structure that the rear substrate is sandwiched by two polarizing plates called polarizing plate 1, and wherein the polarizing plate 2 is comprised of a polarizing element and a high-retardation film having Rth(550) of 210 nm and Re(550) of 60 nm whose in-plane slow axis is in parallel to the transmission axis of the polarizing element, and the polarizing plate 1 is comprised of a polarizing element and a low-retardation film having Rth(550) of 0 nm and Re(550) of 0 nm.

23. The process of claim 22, wherein, the second step is carried out for determining as to which of following relational formulae (1) and (2) is satisfied:

(1) the rear-member scattering intensity>the front-member scattering intensity, (2) the rear-member scattering intensity<the front member scattering intensity, and in accordance with the result, in the fourth step, if relational formula (1) is satisfied, $Rth_0(\lambda)$ is distributed into $Rth_{front}(\lambda)$ and $Rth_{rear}(\lambda)$ respectively so that the relation of $Rth_{front}(\lambda) > Rth_{rear}(\lambda)$ is satisfied, and if relation formula (2) is satisfied, $Rth_0(\lambda)$ is distributed into $Rth_{front}(\lambda)$ and $Rth_{rear}(\lambda)$ respectively so that the relation of $Rth_{front}(\lambda) < Rth_{rear}(\lambda)$ is satisfied.

* * * * *